(12) United States Patent
Liu et al.

(10) Patent No.: US 12,441,973 B2
(45) Date of Patent: Oct. 14, 2025

(54) CELL SCAFFOLD COMPRISING AN ELECTRONIC CIRCUIT

(71) Applicant: President and Fellows of Harvard College, Cambridge, MA (US)

(72) Inventors: Jia Liu, Cambridge, MA (US); Kewang Nan, Cambridge, MA (US); Qiang Li, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 698 days.

(21) Appl. No.: 17/612,187

(22) PCT Filed: Jun. 23, 2020

(86) PCT No.: PCT/US2020/039050
§ 371 (c)(1),
(2) Date: Nov. 17, 2021

(87) PCT Pub. No.: WO2020/263772
PCT Pub. Date: Dec. 30, 2020

(65) Prior Publication Data
US 2022/0213425 A1    Jul. 7, 2022

Related U.S. Application Data

(60) Provisional application No. 62/872,031, filed on Jul. 9, 2019, provisional application No. 62/865,648, filed on Jun. 24, 2019.

(51) Int. Cl.
*C12M 1/12*    (2006.01)
*C12M 1/00*    (2006.01)
*C12M 1/42*    (2006.01)

(52) U.S. Cl.
CPC .......... *C12M 25/14* (2013.01); *C12M 23/26* (2013.01); *C12M 35/02* (2013.01)

(58) Field of Classification Search
None
See application file for complete search history.

(56) References Cited

U.S. PATENT DOCUMENTS

| 7,129,554 B2 | 10/2006 | Lieber et al. |
| 7,211,464 B2 | 5/2007 | Lieber et al. |

(Continued)

FOREIGN PATENT DOCUMENTS

| CN | 108136174 | 6/2018 |
| CN | 108384717 | 8/2018 |

(Continued)

OTHER PUBLICATIONS

Martins et al., Electrically Conductive Chitosan/Carbon Scaffolds for Cardiac Tissue Engineering, 2014, Biomacromolecules, 15, 635-643 (Year: 2014).*

(Continued)

*Primary Examiner* — Teresa E Knight
(74) *Attorney, Agent, or Firm* — Wolf, Greenfield & Sacks, P.C.

(57) ABSTRACT

The present invention generally relates to nanoscale wires and nanoelectronics, which in some aspects may be embedded in biological structures, such as tissues, organoids, organs, organisms, and the like. For example, one aspect is generally directed to stretchable cell scaffolds, which may be connected to electrical circuits. In some cases, a biological structure may form around the scaffold and deform the cell scaffold as it forms, thereby causing the cell scaffold to become embedded within the biological structure. The scaffold may be connectable in certain embodiments to an external device, e.g., to determine a property of the cell scaffold (e.g., an electrical property), and/or to apply a stimulus (e.g., an electrical stimulus) to the biological structure. Other aspects of the invention are generally directed to methods of making or using such cell scaffolds, kits includ- (Continued)

ing such cell scaffolds, biological structures containing such cell scaffolds, or the like.

26 Claims, 27 Drawing Sheets

(56) References Cited

U.S. PATENT DOCUMENTS

| | | | |
|---|---|---|---|
| 7,301,199 | B2 | 11/2007 | Lieber et al. |
| 9,457,128 | B2 | 10/2016 | Lieber et al. |
| 9,786,850 | B2 | 10/2017 | Lieber et al. |
| 2014/0073063 | A1 | 3/2014 | Lieber et al. |
| 2014/0074253 | A1 | 3/2014 | Lieber et al. |
| 2016/0270729 | A1 | 9/2016 | Dvir et al. |
| 2016/0282338 | A1 | 9/2016 | Miklas et al. |
| 2017/0069858 | A1 | 3/2017 | Lieber et al. |
| 2017/0072109 | A1 | 3/2017 | Lieber et al. |
| 2017/0172438 | A1 | 6/2017 | Lieber et al. |
| 2018/0223238 | A1 | 8/2018 | Shen et al. |
| 2018/0328884 | A1 | 11/2018 | Lieber et al. |

FOREIGN PATENT DOCUMENTS

| | | |
|---|---|---|
| WO | WO 2011/013067 A2 | 2/2011 |
| WO | WO 2011/038228 A1 | 3/2011 |
| WO | WO 2014/031709 A1 | 2/2014 |
| WO | WO 2015/061907 A1 | 5/2015 |
| WO | WO 2019/084498 A2 | 5/2019 |

OTHER PUBLICATIONS

Li et al. "Helical nanofiber yarn enabling highly stetchable engineered microtissue", Mar. 25, 2019, PNAS, vol. 116, No. 19: 9245-9250. (Year: 2019).*
Williams "Nanopatterning with PFPE Elastomers: Materials and Photovoltaic Applications" 2010, UNC, (Year: 2010).*
International Search Report and Written Opinion mailed Oct. 2, 2020 for Application No. PCT/US2020/039050.
International Preliminary Report on Patentability mailed Jan. 6, 2022 for Application No. PCT/US2020/039050.
Le Floch et al., Limits to the Electrochemical Impedance Stability of Dielectric Elastomers in Bioelectronics. Nano Lett. Jan. 8, 2020;20(1):224-233. doi: 10.1021/acs.nanolett.9b03705. Epub Dec. 10, 2019.
Liu et al., Soft and elastic hydrogel-based microelectronics for localized low-voltage neuromodulation. Nat Biomed Eng. Jan. 2019;3(1):58-68. doi: 10.1038/s41551-018-0335-6. Epub Jan. 8, 2019.
Chinese Office Action mailed Aug. 26, 2024 for Application No. 202080046017.4.
Chinese Office Action mailed Jun. 20, 2023 for Application No. 202080046017.4.
Chinese Office Action mailed Mar. 8, 2024 for Application No. 202080046017.4.
Cho, ed., Biofabrication and 3D Tissue Modeling. Biomaterials Science Series. Jan. 2, 2019:225.
Feiner et al., Multifunctional degradable electronic scaffolds for cardiac tissue engineering. J Control Release. Jul. 10, 2018:281:189-195. doi: 10.1016/j.jconrel.2018.05.023. Epub May 19, 2018.

* cited by examiner

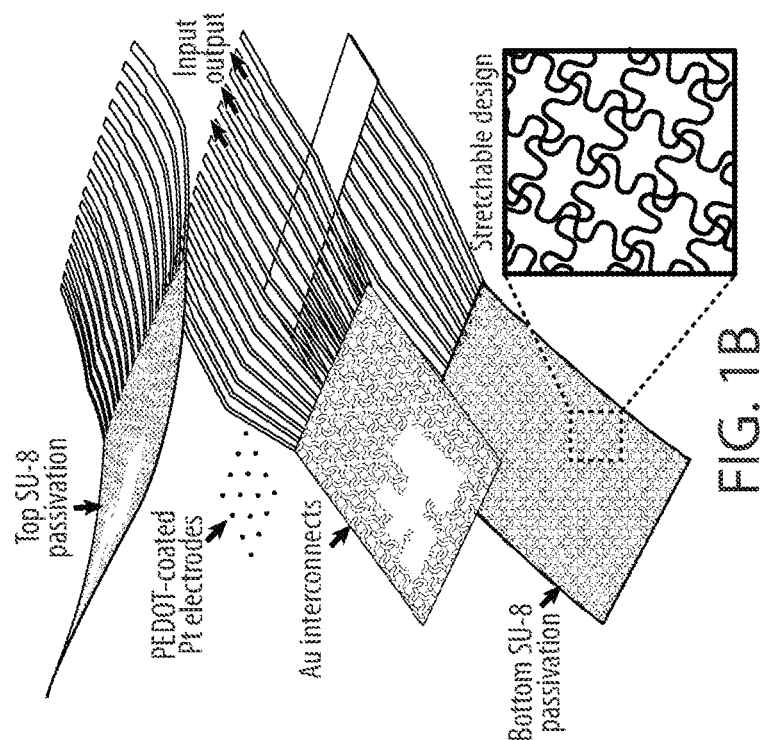

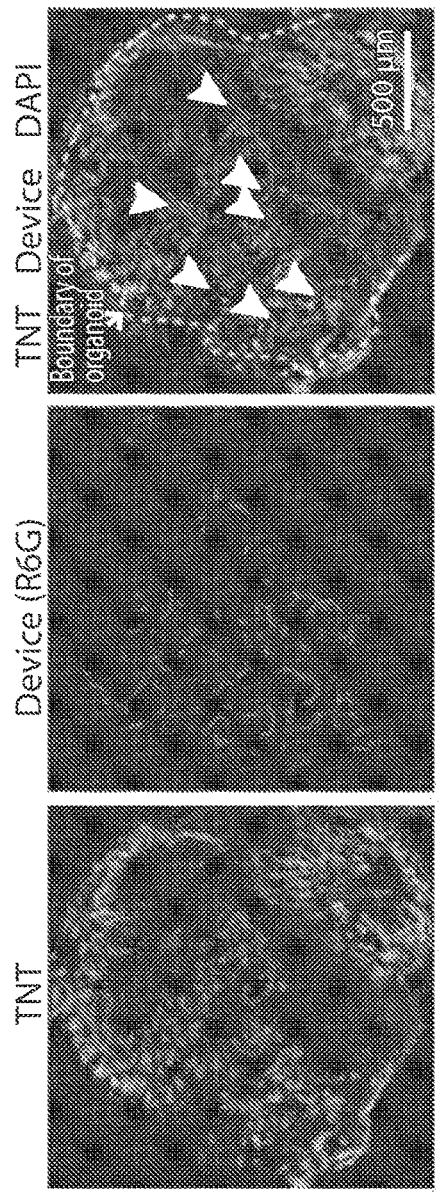
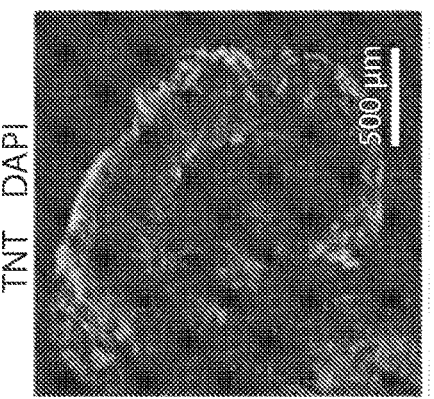
FIG. 3E
FIG. 3F

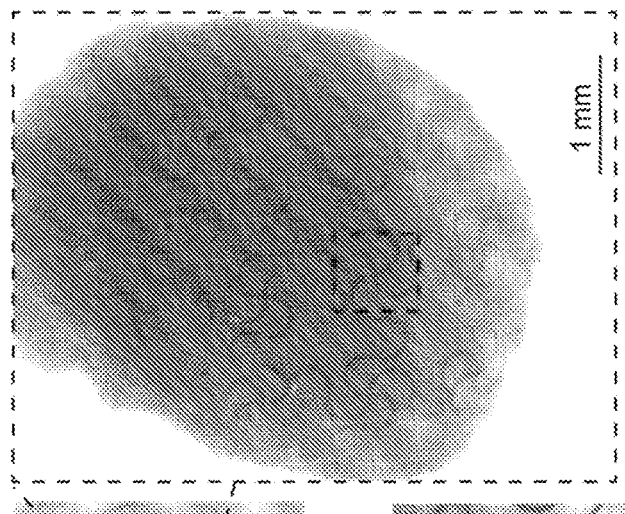
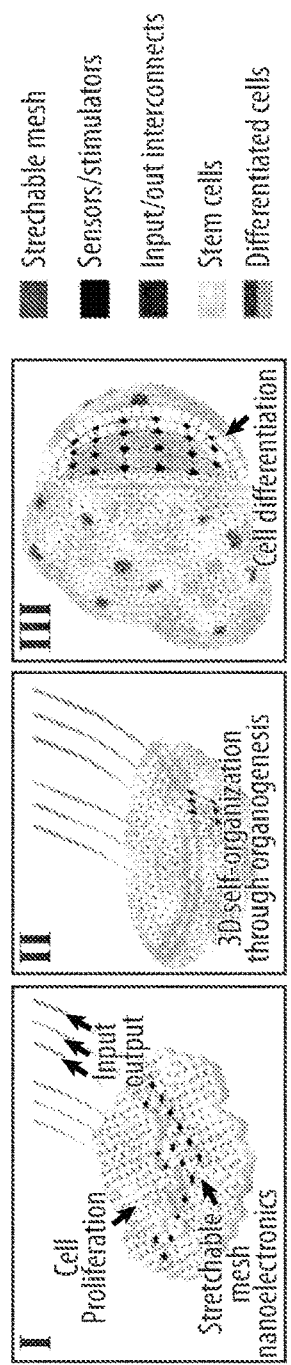
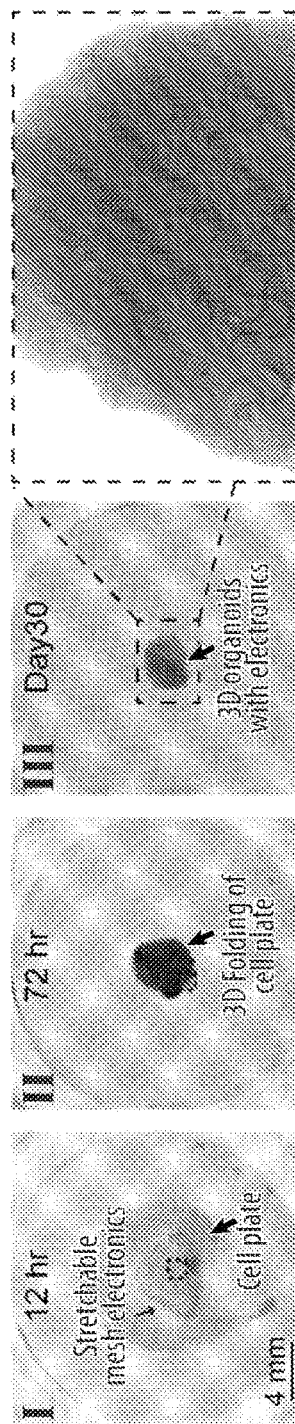
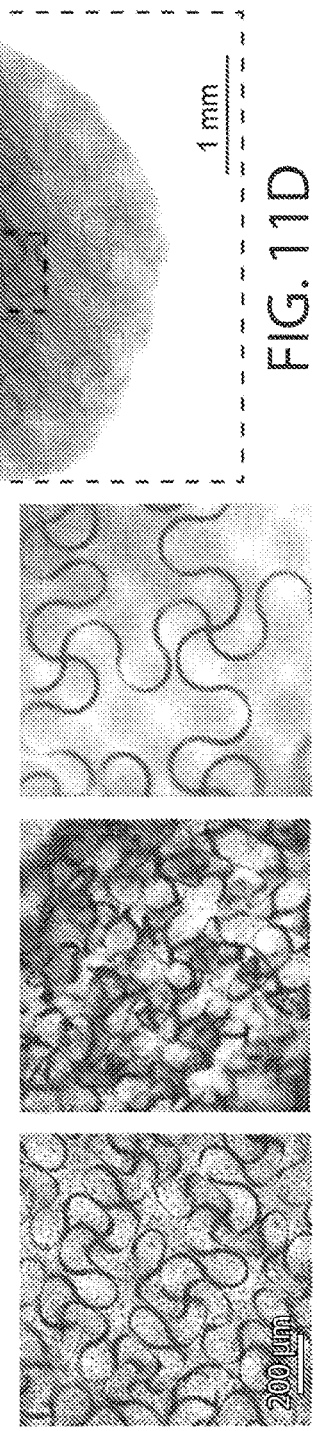
FIG. 11A
FIG. 11B
FIG. 11C
FIG. 11D

CELL SCAFFOLD COMPRISING AN ELECTRONIC CIRCUIT

RELATED APPLICATIONS

This application is a U.S. National Stage Application claiming the benefit of International Application No.: PCT/US2020/039050, filed Jun. 23, 2020, entitled "Cell Scaffold Comprising an Electronic Circuit," by Liu, et al., which claims the benefit of U.S. Provisional Patent Application Ser. No. 62/865,648, filed Jun. 24, 2019, entitled "Organoids Containing Electronics, and Methods Thereof," by Liu, et al., and of U.S. Provisional Patent Application Ser. No. 62/872,031, filed Jul. 9, 2019, entitled "Organoids, Embryos, and Other Tissues Containing Electronics, and Methods Thereof," by Liu, et al. Each of the above is incorporated herein by reference in its entirety.

FIELD

The present invention generally relates to nanoscale wires and nanoelectronics, which in some aspects may be embedded in biological structures, such as tissues, organoids, organs, organisms, and the like.

BACKGROUND

Complex organs (e.g., the heart and the brain) rely on spatiotemporally orchestrated communication of heterogeneous cells to generate whole-organ functions. Thus, understanding development, mechanism, and diseases of these organs requires system-level mapping of the cellular activities with high spatiotemporal resolutions across their entire 3D volumes over a substantial time window. Recently, tremendous progresses have miniaturized state-of-the-art electrophysiological tools into micro/nanoscales with soft and multiplexed electronic units, which have significantly reduced tissue disruptions while maintaining the unmatched spatiotemporal resolution for recording and manipulating. However, most of these devices either contact organs at the surface or penetrate locally and invasively through microneedle injections. It remains a key challenge to uniformly implant and distribute a large number of interconnected and individually addressable sensors/stimulators throughout the 3D organs with minimal damage for chronic recording.

It is noteworthy that 3D organs originate from 2D embryonic germ layers during in vivo organogenesis. For instance, both neural and heart tubes originate from 2D cell layers in embryo via a series of cell proliferation and folding process and finally develop into brain, spinal cord and heart. Also, such a 2D-to-3D transition in in vivo organogenesis has recently been reproduced in vitro for human organoids culture, in which cell condensation from human mesenchymal stem cells (hMSCs) drives human induced pluripotent stems cells (hiPSCs) to fold into 3D organoids for transplantations and drug screening.

SUMMARY

The present invention generally relates to nanoscale wires and nanoelectronics, which in some aspects may be embedded in biological structures, such as tissues, organoids, organs, organisms, and the like. The subject matter of the present disclosure involves, in some cases, interrelated products, alternative solutions to a particular problem, and/or a plurality of different uses of one or more systems and/or articles.

In one aspect, the present invention is generally directed to an article comprising a flexible cell scaffold comprising a mesh of one or more nanoelectronic pathways. In another aspect, the present invention is generally directed to an article comprising a stretchable cell scaffold, the scaffold forming an electrical circuit able to extend externally of the cell scaffold. In yet another aspect, the present invention is generally directed to an article comprising a stretchable cell scaffold defining at least a portion of an electrical circuit.

In one aspect, the present invention is generally directed to a method comprising determining an electrical property of an organoid at a resolution of at least 1 mm using a stretchable cell scaffold disposed internally of the organoid. In some embodiments, the present invention is generally directed to a method comprising determining a property of a biological structure at a resolution of at least 1 mm using a stretchable cell scaffold disposed internally of the biological structure. The property, may be, for example, electrical, chemical, mechanical, or any other kind of property, including those discussed herein. The biological structure may be, for example, a tissue, an organoid, an organ, an organism, or the like, including those discussed herein.

In another aspect, the present invention is generally directed to a method comprising determining an electrical property of an organism at a resolution of at least 1 mm using a stretchable cell scaffold disposed internally of the organism. In some embodiments, the present invention is generally directed to a method comprising determining a property of a biological structure at a resolution of at least 1 mm using a stretchable cell scaffold disposed internally of the biological structure. The property, may be, for example, electrical, chemical, mechanical, or any other kind of property, including those discussed herein. The biological structure may be, for example, a tissue, an organoid, an organ, an organism, or the like, including those discussed herein.

In one aspect, the present invention is generally directed to an article. In one set of embodiments, the article comprises a biological structure at least partially embedding a stretchable cell scaffold therein. In some cases, the cell scaffold defines at least a portion of an electrical circuit.

The article, in another set of embodiments, comprises a cell scaffold defining at least a portion of an electrical circuit. In certain instances, the cell scaffold is stretchable by at least 20% in a linear direction under a force of no more than 1 micronewton.

The present invention, in another aspect, is generally directed to a method. In one set of embodiments, the method comprises exposing cells to a stretchable cell scaffold defining at least a portion of an electrical circuit, and growing the cells to form a biological structure at least partially embedding the cell scaffold therein.

In another set of embodiments, the method comprises exposing an embryo to a stretchable cell scaffold defining at least a portion of an electrical circuit, and growing the embryo to form an organism embedding the cell scaffold.

The method, in still another set of embodiments, comprises determining an electrical property of a biological structure at a resolution of at least 1 mm using a stretchable cell scaffold embedded within the biological structure.

According to yet another set of embodiments, the method comprises applying an electrical signal to at least a portion of a biological structure using a stretchable cell scaffold embedded within the biological structure.

In another set of embodiments, the method comprises patterning a first layer comprising a first photoresist to a sacrificial layer, patterning metal pathways to the first layer, depositing a second layer comprising a second photoresist to the first layer, and removing at least a portion of the sacrificial layer to produce a cell scaffold comprising the first layer, the metal pathways, and the second layer, wherein the cell scaffold is stretchable.

In another aspect, the present invention encompasses methods of making one or more of the embodiments described herein, for example, a biological structure embedding a flexible cell scaffold containing electronics, such as a nanoelectronic mesh. In still another aspect, the present invention encompasses methods of using one or more of the embodiments described herein, for example, a biological structure embedding a flexible cell scaffold containing electronics, such as a nanoelectronic mesh.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 1A-1H illustrate cell scaffolds embedded within organoids (e.g., "cyborg organoids"), in accordance with certain embodiments of the invention;

FIGS. 11A-11D illustrate embedding of a cell scaffold in a brain organoid, in yet another embodiment of the invention.

DETAILED DESCRIPTION

The present invention generally relates to nanoscale wires and nanoelectronics, which in some aspects may be embedded in biological structures, such as tissues, organoids, organs, organisms, and the like. For example, one aspect is generally directed to stretchable cell scaffolds, which may be connected to electrical circuits. In some cases, a biological structure may form around the scaffold and deform the cell scaffold as it forms, thereby causing the cell scaffold to become embedded within the biological structure. The scaffold may be connectable in certain embodiments to an external device, e.g., to determine a property of the cell scaffold (e.g., an electrical property, a chemical property, a mechanical property, etc.), and/or to apply a stimulus (e.g., an electrical stimulus) to the biological structure. Other aspects of the invention are generally directed to methods of making or using such cell scaffolds, kits including such cell scaffolds, biological structures containing such cell scaffolds, or the like.

Figure 1A:
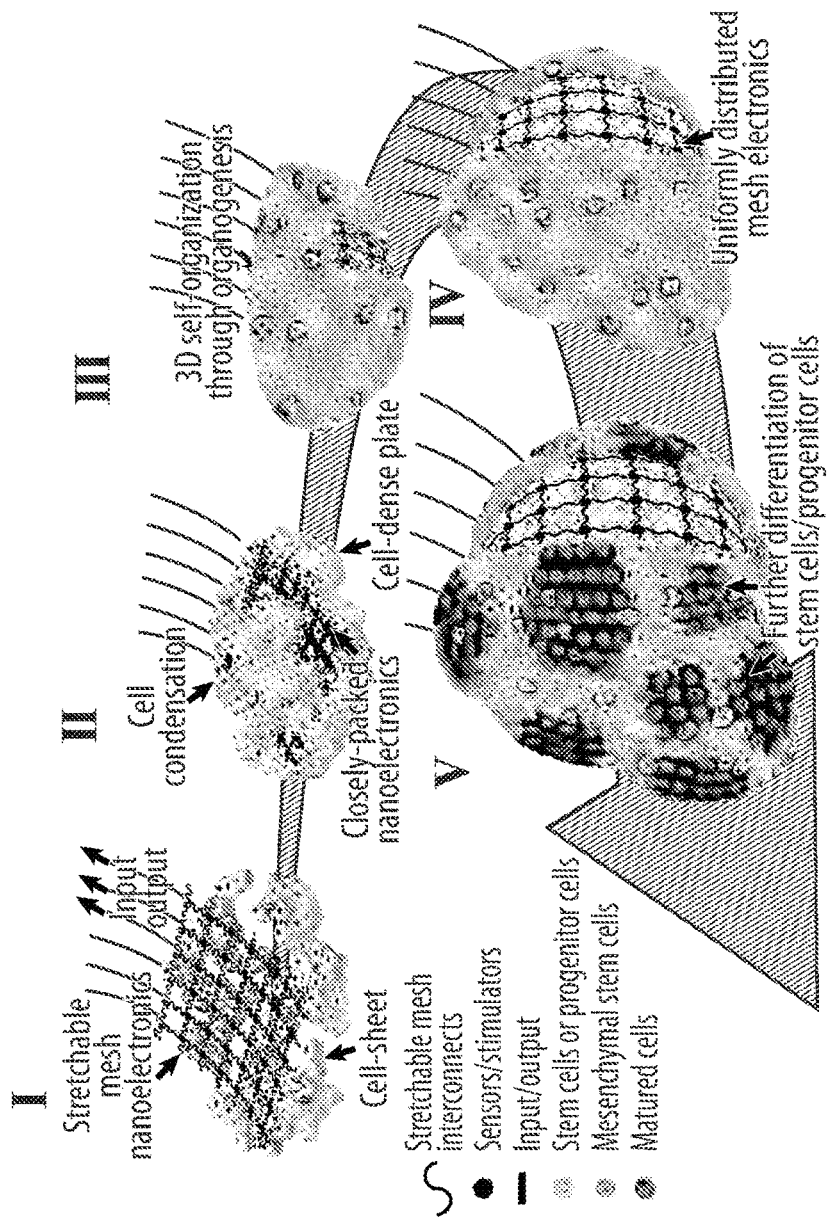

One aspect of the present invention is now described with reference to FIG. 1A. In this figure, a cell scaffold is shown, some or all of which may be stretchable. The cell scaffold, for example, may comprise a plurality of nodes connected by various interconnects, e.g., forming a mesh structure, where the interconnects have a shape and/or are formed from materials that allow the interconnects to be manipulated or distorted without disrupting their connections, e.g., during stretching, compression, folding, or the like. For example, the interconnects may have an "S" or a serpentine shape. In some cases, the interconnects may be formed from materials that can be manipulated by the cells within the scaffold. For instance, the cells, when organizing into larger biological structures, may cause the cell scaffold to form a bowl or a ball structure, such as is shown in FIG. 1A.

In some cases the cells may form a biological structure containing the cell scaffold, which may be partially or completely embedded within the structure. For example, the biological structure may be a tissue, an organoid, an organ, or an entire organism in some cases. Thus, the biological structure may form around the cell scaffold, in contrast to techniques in which the cell scaffold is implanted into a biological structure (i.e., a pre-existing biological structure). In some cases, the biological structure is able to manipulate or distort the cell scaffold as part of the growth process, e.g., to cause the cell scaffold to form a more suitable embedded shape within the biological structure. For example, as is shown in FIG. 1A, a cell scaffold may initially be substantially planar and seeded with cells that form a substantially spherical organoid; as the organoid forms, the cells cause the cell scaffold to adopt more of a spherical configuration, thereby resulting in an organoid embedding the cell scaffold. As another non-limiting example, the cell scaffold may be introduced to an embryo, which may develop into an organism embedding the cell scaffold. The biological structure may also be a tissue, e.g., a 3-D tissue, or other structures such as those discussed herein.

In certain embodiments, the cell scaffold may also contain components, including nanoelectric components, that may form electrical circuits, or portions thereof. For instance, some or all of the interconnects may contain metal or other conductive pathways, and/or there may be sensors, stimulators, nanoscale wires, or the like within the cell scaffold. In some cases, the cell scaffold may define a self-contained electrical circuit, and/or a portion of the cell scaffold may be interfaceable or connectable with an external electrical device, such as a computer, using a suitable connector, such as a cable.

In various embodiments, the cell scaffold within the biological structure can be connected to electronic circuits extending externally of the cell scaffold. The nanoscale wires may form an integral part of the biological structure, and can be determined or controlled, e.g., using an external electrical device. This allows for the creation of fundamentally new types of functionalized biological structure, due to the high degree of electronic control. Accordingly, such cell scaffolds can be determined and/or controlled at high resolutions. In some cases, such cell scaffolds can be used in a wide variety of novel applications, including applications in tissue engineering, prosthetics, pacemakers, implants, or the like.

The above discussion is a non-limiting example of one embodiment of the present invention that are directed to cell scaffolds, including those embedded (partially or completely) within biological structures, such as tissues, organoids, organs, organisms, and the like. However, other embodiments are also possible. Accordingly, more generally, various aspects of the invention are directed to various cell scaffolds and other devices.

Thus, certain aspects of the invention are generally directed to flexible or stretchable meshes or networks that can be used as cell scaffolds to grow structures such as organoids, tissues, or even organisms. In general, cell scaffolds are structures that cells can attach to and grow on, e.g., to form biological tissues and other biological structures. The cell scaffold may comprise biocompatible and/or biodegradable materials, and may in some embodiments also contain growth factors such as growth hormones, extracellular matrix proteins, specific metabolites or nutrients, or the like. The cell scaffold typically is porous, e.g., to facilitate cell seeding therein, and/or diffusion into and out of the cell scaffold, for example, of nutrients, waste products, etc.

In one set of embodiments, the scaffold may have a shape and/or may be formed from one or more materials that allow the scaffold to be flexible or stretchable. For example, the scaffold may be formed of shapes, such as serpentine shapes, that can be extended. In some cases, the cell scaffold can be formed of components that are not straight, and can be extended, e.g., when pulled on. For instance, the cell scaffold may comprise one or more nodes that are connected by various interconnects, e.g., forming a mesh or a network. The nodes may be evenly or nonevenly distributed within the cell scaffold, and the interconnects may connect them in a regular pattern (for example, in rectangular or triangular arrays of nodes), or in an irregular pattern. As a non-limiting example, FIG. 1A, panel I shows a mesh of nodes (dots) in a square array connected by a plurality of interconnects between pairs of nodes (shown as wiggly lines). The nodes may represent points of connectivity, or there may be one or more electronic components at some or all of the nodes, such as conductive pathways, nanoscale wires, sensors, or the like. The same or different electronic components may independently be present at different nodes within a mesh or network. The interconnects connecting two (or more) nodes together may have the same or different shapes or structure within a mesh or network, and different interconnects within the mesh may independently have the same or different shapes. In some cases, an interconnect may have a shape that is extendible. For example, an interconnect may have a straight-line or linear shape, or have shapes that are non-linear, such as S shapes, serpentine shapes (e.g., having two, three, four, or more bends or inflection points), zigzag shapes (e.g., having two, three, four, or more vertices), coiled shapes, or the like. Such interconnect shapes may allow various manipulations to occur without disrupting the connection of the interconnect to the nodes, e.g., during stretching, compression, folding, etc.

In one set of embodiments, an interconnect may comprise one or metal leads and one or more polymers, such as those discussed below. The polymers can include photoresist polymers (such as SU-8), and/or biocompatible polymers (such as Matrigel™). Other examples of photoresist polymers include, but are not limited to, those described below.

In some cases, the cell scaffold may have an overall filling ratio or area of less than 50%, less than 40%, less than 30%, less than 25%, less than 20%, less than 15%, less than 13%, less than 12%, less than 11%, less than 10%, less than 9%, less than 8%, less than 7%, less than 6%, less than 5%, etc. The filling ratio or area is the area of the physical components of the cell scaffold, compared to the overall area of the cell scaffold (including void spaces). Thus, this is a measure of the "porosity" in two dimensions of the cell scaffold. For example, in some cases, the cell scaffold may have a mesh structure or layout as described above, where the mesh is relatively open. Cell scaffolds with smaller filling ratios thus would have greater "open space," for example, to allow cells to penetrate.

In some cases, the cell scaffold can be defined by one or more pores. Pores that are too small can hinder or restrict cell access. Thus, in some embodiments, the cell scaffold may have an average pore size of at least about 100 micrometers, at least about 200 micrometers, at least about 300 micrometers, at least about 400 micrometers, at least about 500 micrometers, at least about 600 micrometers, at least about 700 micrometers, at least about 800 micrometers, at least about 900 micrometers, or at least about 1 mm. However, in other embodiments, pores that are too big may prevent cells from being able to satisfactorily use or even access the pore volume. Thus, in some cases, the cell scaffold may have an average pore size of no more than about 1.5 mm, no more than about 1.4 mm, no more than about 1.3 mm, no more than about 1.2 mm, no more than about 1.1 mm, no more than about 1 mm, no more than about 900 micrometers, no more than about 800 micrometers, no more than about 700 micrometers, no more than about 600 micrometers, or no more than about 500 micrometers. Combinations of these are also possible, e.g., in one embodiment, the average pore size is at least about 100 micrometers and no more than about 1.5 mm. In addition, larger or smaller pores than these can also be used in a cell scaffold in certain cases. Pore sizes may be determined using any suitable technique, e.g., through visual inspection, BET measurements, or the like. In some cases, an interconnect may have a smallest dimension or a maximum cross-sectional dimension of less than about 100 micrometers, less than about 50 micrometers, less than about 40 micrometers, less than about 30 micrometers, less than about 20 micrometers, less than about 10 micrometers, less than about 5 micrometers, less than about 4 micrometers, less than about 3 micrometers, less than about 2 micrometers, less than about 1 micrometer, less than about 700 nm, less than about 600 nm, less than about 500 nm, less than about 300 nm, less than about 200 nm, less than about 100 nm, less than about 80 nm, less than about 50 nm, less than about 30 nm, less than about 10 nm, less than about 5 nm, less than about 2 nm, etc. An interconnect may also have any suitable cross-sectional shape, e.g., circular, square, rectangular, polygonal, elliptical, regular, irregular, etc.

In addition, in one set of embodiments, one or more materials within the cell scaffold are stretchable or flexible. For example, in some cases, a cell scaffold may comprise a mesh or portions thereof (e.g., interconnects) that can be stretchable or flexible, or can be manipulated or distorted in some fashion. It should be understood that the flexibility of a material is not purely an intrinsic material propriety; a thinner piece of material may offer more flexibility than a comparably thicker piece of the same material. In addition, in some cases, the flexibility of the material may also be a function of its shape, e.g., as discussed above.

In certain instances, a cell scaffold may have components, such as interconnects, that are sufficiently flexible or stretchable such that the cell scaffold (or a component thereof, such as an interconnect) may be stretchable in a linear direction by at least 10%, at least 20%, at least 30%, at least 50%, at least 75%, at least 100%, at least 150%, at least 200%, at least 250%, at least 300%, at least 350%, at least 400%, at least 450%, at least 500%, etc., for example, before catastrophic failure of the cell scaffold, breakage, disruption of the connection of the interconnect to the nodes, loss of electrical connections, or the like.

In addition, in certain cases, the cell scaffold may also exhibit some degree of elasticity, e.g., such that the cell scaffold may return (at least partially) to its original structure prior to stretching. For instance, the cell scaffold (or a component thereof, such as an interconnect) may return at least 10%, at least 20%, at least 30%, at least 40%, at least 50%, at least 60%, at least 70%, at least 80%, at least 90%, or 100% (perfectly elastic) back to its original structure, measured from when stretching of the material is stopped. Thus, for example, a 1 cm material stretched to 2 cm experiences a 100% stretch in a linear direction, and if it afterwards contracts to 1.5 cm, it exhibits a 50% recovery to its original structure (returning 0.5 cm from its stretch of 1 cm). However, it should be understood that in some embodiments, the cell scaffold is not elastic.

In some embodiments, the scaffold may have components, such as interconnects, that are sufficiently flexible or stretchable such that the cell scaffold (or a component thereof, such as an interconnect) may have an effective bending stiffness of at least 0.01 n·Nm, at least 0.02 n·Nm, at least 0.03 n·Nm, at least 0.04 n·Nm, at least 0.05 n·Nm, at least 0.06 n·Nm, at least 0.07 n·Nm, at least 0.08 n·Nm, at least 0.09 n·Nm, at least 0.1 n·Nm, at least 0.2 n·Nm, at least 0.3 n·Nm, at least 0.4 n·Nm, at least 0.5 n·Nm, at least 0.7 n·Nm, at least 1 n·Nm, at least 1.5 n·Nm, at least 2 n·Nm, at least 2.5 n·Nm, at least 3 n·Nm, at least 3.5 n·Nm, at least 4 n·Nm, at least 4.5 n·Nm, at least 5 n·Nm, etc. In some embodiments, the interconnects may have an effective bending stiffness of less than 5 n·Nm, less than 4.5 n·Nm, less than 4 n·Nm, less than 3.5 n·Nm, less than 3 n·Nm, less than 2.5 n·Nm, less than 2 n·Nm, less than 1.9 n·Nm, less than 1.8 n·Nm, less than 1.5 n·Nm, less than 1.3 n·Nm, less than 1 n·Nm, less than 0.9 n·Nm, less than 0.8 n·Nm, less than 0.5 n·Nm, less than 0.3 n·Nm, etc. Combinations of any of these are also possible; for example, the cell scaffold or interconnect may exhibit an effective bending stiffness of between 0.090 n·Nm and 1.9 n·Nm. See the examples below for an example of determining effective bending stiffness of a material.

In certain embodiments, the cell scaffold may have components, such as interconnects, that are sufficiently flexible or stretchable such that the cell scaffold (or a component thereof, such as an interconnect) can be compressed in a linear direction by at least 10%, at least 20%, at least 30%, at least 40%, at least 50%, at least 60%, at least 70%, at least 80%, at least 90%, etc., without catastrophic failure of the cell scaffold, breakage, disruption of the connection of the interconnect to the nodes, loss of electrical connections, or the like.

In addition, in certain embodiments, the cell scaffold may have components, such as interconnects, that are sufficiently flexible or stretchable such that the cell scaffold (or a component thereof, such as an interconnect) is foldable by at least 30°, at least 45°, at least 90°, at least 135°, at least 150°, at least 180°, etc. from an initial planar structure.

Cell scaffolds may comprise a variety of materials in different embodiments. For example, the cell scaffold may comprise one or more polymers, such as photoresists, that define interconnects or other components within the cell scaffold. In some cases, one or more portions of the cell scaffold may comprise components, such as nanoelectric components, that may form electrical circuits within the cell scaffold. For example, the cell scaffold may contain metal or other conductive pathways, e.g., which define an electrical circuit, and/or can be connected to an external electrical device.

Thus, in certain embodiments, the cell scaffold contains one or more polymers, e.g., photoresists, biocompatible polymers, biodegradable polymers, etc., as is discussed herein. For example, in various embodiments, one or more of the polymers may be a photoresist. While not commonly used in cell scaffolds, photoresists are typically used in lithographic techniques, which can be used as discussed herein. For example, the photoresist may be chosen for its ability to react to light to become substantially insoluble (or substantially soluble, in some cases) to a photoresist developer.

Photoresists that can be used include, but are not limited to, SU-8, S1805, LOR 3A, poly(methyl methacrylate), poly(methyl glutarimide), phenol formaldehyde resin (diazonaphthoquinone/novolac), diazonaphthoquinone (DNQ), Hoechst AZ 4620, Hoechst AZ 4562, Shipley 1400-17, Shipley 1400-27, Shipley 1400-37, or the like. These and many other photoresists are available commercially. Other examples of photoresist polymers include, but are not limited to, those described below, and those described in Int. Pat. Apl. Pub. No. WO 2019/084498, incorporated herein by reference. In some cases, the photoresist may be a soft material, for example, a hydrogel. In some embodiments, the photoresist comprises a polymer formed by photo-curing a fluorinated monomer including cross-linkable function groups using a photoinitiator. One example of such a polymer is perfluoropolyether dimethacrylate (PFPE-DMA). Other examples are discussed in more detail below.

In some cases, one or more of the polymers may be biocompatible and/or biodegradable. Examples of such biocompatible and/or biodegradable polymers include, but are not limited to, poly(lactic-co-glycolic acid), polylactic acid, polyglycolic acid, poly(methyl methacrylate), poly(trimethylene carbonate), collagen, fibrin, polysaccharidic materials such as chitosan or glycosaminoglycans, hyaluronic acid, polycaprolactone, and the like. Certain photoresists are also biocompatible and/or biodegradable in some cases.

Typically, a biocompatible material is one that does not illicit an immune response, or elicits a relatively low immune response, e.g., one that does not impair the cell scaffold or the cells therein from continuing to function for its intended use. In some embodiments, the biocompatible material is able to perform its desired function without eliciting any undesirable local or systemic effects in a subject, e.g., when present within a subject. In some cases, the material is present without eliciting any undesirable local or systemic effects, or such that any biological response by the subject does not substantially affect the ability of the material from continuing to function for its intended use. For example, in a cell scaffold, the cell scaffold may be able to support appropriate cellular or tissue activity when implanted within a subject, e.g., including the facilitation of molecular and/or mechanical signaling systems, without substantially eliciting undesirable effects in those cells, or undesirable local or systemic responses, or without eliciting a response that causes the cell scaffold to cease functioning for its intended use.

A biodegradable material typically degrades over time when exposed to a biological system, e.g., through oxidation, hydrolysis, enzymatic attack, phagocytosis, or the like. For example, a biodegradable material can degrade over time when exposed to water (e.g., hydrolysis) or enzymes. In some cases, a biodegradable material is one that exhibits degradation (e.g., loss of mass and/or structure) when exposed to physiological conditions for at least about a month, at least about 6 months, or at least about a year. For example, the biodegradable material may exhibit a loss of mass of at least about 10%, at least about 20%, at least about 30%, at least about 40%, at least about 50%, at least about 60%, at least about 70%, at least about 80%, or at least about 90%. In certain cases, some or all of the degradation products may be resorbed or metabolized, e.g., into cells or tissues. For example, certain biodegradable materials, during degradation, release substances that can be metabolized by cells or tissues.

In some embodiments, the cell scaffold may also contain other materials in addition to the polymers described herein. Non-limiting examples include other polymers, growth hormones, extracellular matrix protein, specific metabolites or nutrients, or the like. For example, in one of embodiments, one or more agents able to promote cell growth can be added to the cell scaffold, e.g., hormones such as growth hormones, extracellular matrix protein, pharmaceutical agents, vitamins, or the like. Many such growth hormones are commercially available, and may be readily selected by those of ordinary skill in the art based on the specific type of cell or tissue used or desired. Similarly, non-limiting examples of extracellular matrix proteins include gelatin, laminin, fibronectin, heparan sulfate, proteoglycans, entactin, hyaluronic acid, collagen, elastin, chondroitin sulfate, keratan sulfate, Matrigel™, or the like. Many such extracellular matrix proteins are available commercially, and also can be readily identified by those of ordinary skill in the art based on the specific type of cell or tissue used or desired.

As another example, in some embodiments, additional scaffold materials can be added to the cell scaffold, e.g., to control the size of pores within the cell scaffold, to promote cell adhesion or growth within the cell scaffold, to increase the structural stability of the cell scaffold, to control the flexibility of the cell scaffold, etc. For instance, additional fibers or other suitable polymers may be added to the cell scaffold, e.g., electrospun fibers can be used as a secondary scaffold. The additional scaffold materials can be formed from any of the materials described herein in reference to cell scaffolds, e.g., photoresists or biocompatible and/or biodegradable polymers, or other polymers described herein. As another non-limiting example, a glue such as a silicone elastomer glue can be used to control the shape of the cell scaffold.

In one set of embodiments, the cell scaffold may contain metal or other conductive pathways, e.g., within interconnects or nodes within the cell scaffold. Examples of metals for metal leads or pathways that can be used include, but are not limited to platinum, aluminum, gold, silver, copper, molybdenum, tantalum, titanium, nickel, tungsten, chromium, palladium, or the like, as well as any combinations of these and/or other metals. Other examples include conductive polymers such as poly(3,4-ethylenedioxythiophene) (PEDOT), polyacetylene, polyphenylene vinylene, polypyrrole, polythiophene (for example poly(3,4-ethylenedioxythiophene)), polyphenylene sulfide, etc.

In some cases, the material can be chosen to be one that is readily introduced into the cell scaffold, e.g., using techniques compatible with lithographic techniques. For example, in one set of embodiments, lithographic techniques such as e-beam lithography, photolithography, X-ray lithography, extreme ultraviolet lithography, ion projection lithography, etc. may be used to layer or deposit one or more metals on a substrate. Additional processing steps can also be used to define or register the pathways in some cases.

In some embodiments, more than one metal can be used within a pathway. For example, two, three, or more metals may be used within a pathway. The metals may be deposited in different regions or alloyed together, or in some cases, the metals may be layered on top of each other, e.g., layered on top of each other using various lithographic techniques. If dissimilar metals are layered on top of each other, they may be layered in some embodiments in a "stressed" configuration (although in other embodiments, they may not necessarily be stressed). For example, a chromium/palladium/chromium deposition process, in some embodiments, may form a pre-stressed arrangement that is able to spontaneously form a 3-dimensional structure after release from the substrate. See, e.g., U.S. Pat. Nos. 9,457,128 or 9,786,850, each incorporated herein by reference in its entirety.

In some embodiments, the conductive pathway may be relatively narrow. For example, the conductive pathway may have a smallest dimension or a largest cross-sectional dimension of less than about 5 micrometers, less than about 4 micrometers, less than about 3 micrometers, less than about 2 micrometers, less than about 1 micrometer, less than about 700 nm, less than about 600 nm, less than about 500 nm, less than about 300 nm, less than about 200 nm, less than about 100 nm, less than about 80 nm, less than about 50 nm, less than about 30 nm, less than about 10 nm, less than about 5 nm, less than about 2 nm, etc. The conductive pathway may have any suitable cross-sectional shape, e.g., circular, square, rectangular, polygonal, elliptical, regular, irregular, etc. As is discussed in detail below, such conductive pathways may be achieved using lithographic or other techniques.

In some cases, the conductive pathways may define an electrical circuit that is internally contained within the cell scaffold, and/or that extends externally of the cell scaffold, e.g., such that the electrical circuit is in electrical communication with an external electrical system, such as a computer or a transmitter (for instance, a radio transmitter, a wireless transmitter, an Internet connection, etc.). The cell scaffold, in some embodiments, may contain components such as nanoelectric components. Non-limiting examples of such components include nanoscale wires, sensors such as nanosensors, transistors such as field effect transistors, resistors, capacitors, inductors, diodes, integrated circuits, batteries, power sources, RFID tags, antennae, transmitter, or the like, which may be present in one or more electrical circuit within the cell scaffold.

In addition, in certain cases, a component within the cell scaffold may comprise an electrode. The electrode may comprise any suitable material, for example, carbon, or metals such as gold, platinum, silver, or the like. In some cases, the electrode may be used to determine a property of the cell scaffold (e.g., an electrical property, a chemical property, a mechanical property, etc.), and/or to apply a stimulus (e.g., an electrical stimulus) to the biological structure. In some cases, a conductive polymer may also be used with the electrode. Non-limiting examples of conductive polymers include poly(3,4-ethylenedioxythiophene) (PEDOT), polyacetylene, polyphenylene vinylene, polypyrrole, polythiophene (for example poly(3,4-ethylenedioxythiophene)), polyphenylene sulfide, or other conductive polymers such as those described herein.

In some cases, the components may be used to determine a property of the cell scaffold, e.g., when it is embedded within a biological structure, such as discussed herein. For example, one or more locations within a cell scaffold (for example, an electrode or a nanoscale wire, etc.) may be determined to determine a property, such as a chemical property, an electrical property, a mechanical property, or the like. Other examples include sensing $Ca^{2+}$ spikes, voltage changes, cell signaling pathways, ion concentrations, pH changes, sensing of biomolecules or reaction entities, etc. In some cases, the locations are defined as one or more nodes within the cell scaffold, some or all of which may be individually addressable. For example, a node within a cell scaffold may comprise a nanoscale wire, such as those discussed in more detail below.

In certain embodiments, the conductive pathways may define an electrical circuit that is interfaceable or connectable with an external electrical device, such as a computer, using a suitable connector. For example, the cell scaffold may be directly connected to an external device (for instance, using an interface such as described in U.S. Pat. Apl. Pub. No. 2018/0328884, incorporated herein by reference in its entirety). In some cases, a suitable connector, such as a cable, may be used to make such a connection between an electrical circuit within a cell scaffold and the external device. Non-limiting examples of cables include those commercially available, such as ribbon cables, flexible flat cable, 8-pin cables, 16-pin cables, etc., or other electrical cables. However, an external connection is not always required, and in some cases, the scaffold may be a self-contained electrical circuit. For example, the circuit may be able to transmit information wirelessly to an external device, store information for later access (e.g., after sacrificing the organoids, organs, or organisms), or the like.

In addition, in certain embodiments, the cell scaffold may be able to communicate with an external device using wireless communications, e.g., in addition to and/or instead of an electrical connection. For example, the cell scaffold may contain a transmitter (for instance, a radio transmitter, a wireless transmitter, an Internet connection, etc.) and/or a receiver, e.g., which may be in communication with a transmitter and/or a receiver on an external device.

In some embodiments, more than one electrical circuit and/or more than one conductive pathway may be used within a cell scaffold. For example, multiple conductive pathways or circuits can be used such that some or all of the nodes may be individually electronically addressable within the cell scaffold. However, in other embodiments, more than one node may be addressable by a particular conductive pathway.

In various aspects, cells may be cultured on a cell scaffold and allowed to grow to become a biological structure, such as an organoid or a tissue, or the cell scaffold may be exposed to a pre-existing biological structure, such as an embryo. The cell scaffold can become partially or completely embedded within the structure, e.g., during growth of structure. The biological structure may be, for example, tissues, organoids, organs, organisms, and the like.

A variety of cells may be used with the scaffold. The cell may be an isolated cell, a cell aggregate, in a tissue construct containing cells, or the like. Examples of cells include, but are not limited to, a bacterium or other single-cell organism, or a eukaryotic cell, such as a plant cell, or an animal cell. If the cell is from a multicellular organism, the cell may be from any part of the organism. For instance, if the cell is from an animal, the cell may be a cardiac cell, a fibroblast, a keratinocyte, a hepatocyte, a chondrocyte, a neural cell, an osteocyte, an osteoblast, a muscle cell, a blood cell, an endothelial cell, an immune cell (e.g., a T-cell, a B-cell, a macrophage, a neutrophil, a basophil, a mast cell, an eosinophil), etc. In some cases, the cells may be cancer cells.

Examples of cells able to form suitable organoid or organs include, but are not limited to brain cells, cardiac (heart) cells, nephron (kidney) cells, or the like. In some cases, the cells are cancer cells, e.g., that can grow to form a tumor. In certain embodiments, the cells are stem cells, e.g., pluripotent stem cells. In some cases, the cells may also be exposed to other compounds, such as drugs, to determine their effects on the growth of the cells into organoids, organs, or organisms. This may be useful, for example, for drug testing.

For example, in one set of embodiments, cells such as stem cells may be seeded on a cell scaffold, and allowed to grow or self-assemble into a biological structure, such as an organoid, an organ, or even an organism. In some cases, the cells may form a "ball" shape as it forms a biological structure, and the flexibility of the scaffold may be such that the cells are able to cause the cell scaffold to stay embedded within the biological structure, thereby resulting in a cell scaffold embedded within the biological structure. For example, the cell scaffold may be sufficiently flexible such that the cells within the biological structure are able to manipulate or distort the cell scaffold as it forms a biological structure. For instance, the cells may be able to distort the cell scaffold by at least 20% in a linear direction, or other distortions as described herein. In contrast, many other scaffolds lack this flexibility, and thus cannot become embedded within the biological structure as it forms. Accordingly, in certain embodiments, the cell scaffold may be embedded within a biological structure without being inserting or injected into the biological structure, e.g., after it has been formed.

In some cases, the cell scaffold may contain at least part of the biological structure. For example, the cell scaffold may be manipulated or distorted, e.g., by the cells, to form a 3-dimensional structure defining an internal volume (e.g., such that the cell scaffold is not a 2-dimensional planar structure), where the cell scaffold is embedded at least partially within the biological structure.

The cell scaffold may be partially or completely embedded within the biological structure. For example, the cell scaffold may be completely embedded inside of the biological structure, such that no portion of the cell scaffold is exposed externally of the biological structure. In another set of embodiments, the cell scaffold is only partially embedded within the biological structure, and at least a portion of the cell scaffold is exposed externally of the biological structure. For instance, an external portion of the cell scaffold may be used to electrically connect the cell scaffold to an external electrical device, such as a computer. For instance, a suitable connector may be connected to the exposed portion of the cell scaffold, e.g., to form a connection between an electrical circuit within a cell scaffold, and the external device.

In some cases, the cell scaffold contains a relatively large part of the biological structure. For instance, the cell scaffold may contain at least 30 vol %, at least 40 vol %, at least 50 vol %, at least 60 vol %, at least 70 vol %, at least 80 vol %, at least 90 vol %, or at least 95 vol % of the biological structure. In addition, in some cases, the cell scaffold may be distributed within a relatively large part of the biological structure. For example, the cell scaffold may be manipulated or distorted such that at least 10 vol % of the biological structure is no more than 5, 10, or 30 micrometers from the cell scaffold embedded therein, and in some cases, at least 20 vol %, at least 30 vol %, at least 40 vol %, at least 50 vol %, at least 60 vol %, at least 70 vol %, at least 80 vol %, at least 90 vol %, or at least 95 vol % of the biological structure is no more than 5, 10, or 30 micrometers from the cell scaffold.

In some cases, the cell scaffold may be manipulated or distorted, e.g., by the cells, to stretch the cell scaffold. For example, the biological structure may grow and or expand, and the embedded cell scaffold may be stretched along with the biological structure as it expands. In certain embodiments, the cell scaffold may exhibit a lower filling ratio as it is expanded by the biological structure. For instance, the cell scaffold may have an first, initial filling ratio (e.g., prior to adding cells) of less than 50%, less than 40%, less than 30%, less than 25%, less than 20%, less than 15%, less than 13%, less than 12%, less than 11%, less than 10%, less than 9%, less than 8%, less than 7%, less than 6%, less than 5%, etc., and a second filling ratio, after expansion, that is less than the initial filling ratio. For example, the second filling ratio may be less than 90%, less than 80%, less than 70%, less than 60%, less than 50%, less than 40%, less than 30%, less than 20%, or less than 10% of the initial filing ratio. In some cases, the second filing ratio may be less than 10%, less than 9%, less than 8%, less than 7%, less than 6%, less than 5%, etc. In addition, in some cases, the cells may case strain to the cell scaffold during expansion. For example, at least a portion of the cell scaffold may exhibit a tensile strain of at least 10% or at least 20%.

A variety of biological structures are contemplated, such as tissues, organoids, organs, whole organisms, or the like. Non-limiting examples of tissues or organs include brain, heart, a kidney, etc. In some cases, the tissue or organ may also arise from cancerous or tumor cells.

Figure 10A:
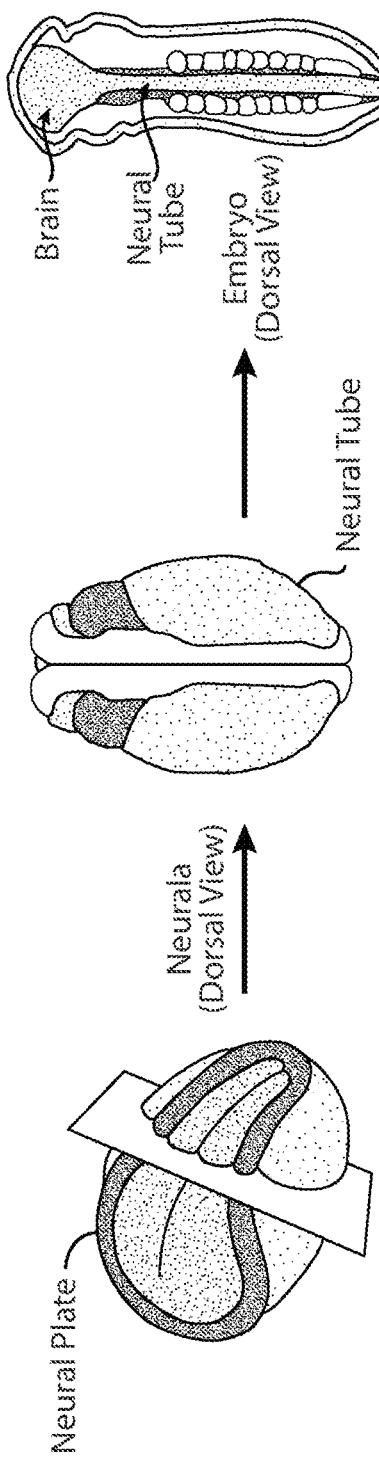
FIGS. 10A-10C illustrates embedding of a cell scaffold in an organism, according to still another embodiment of the invention.
Figure 10B:
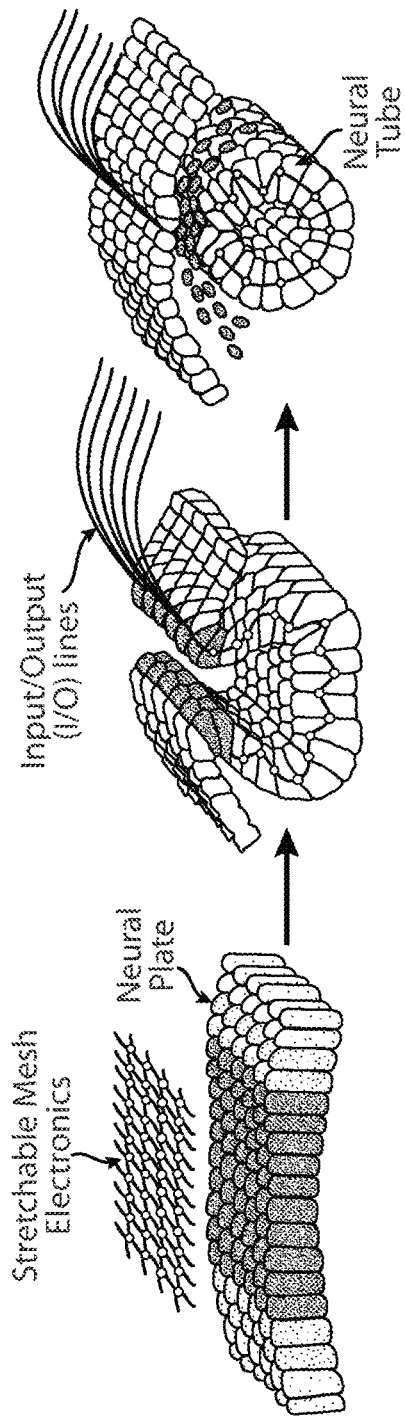
Figure 10C:
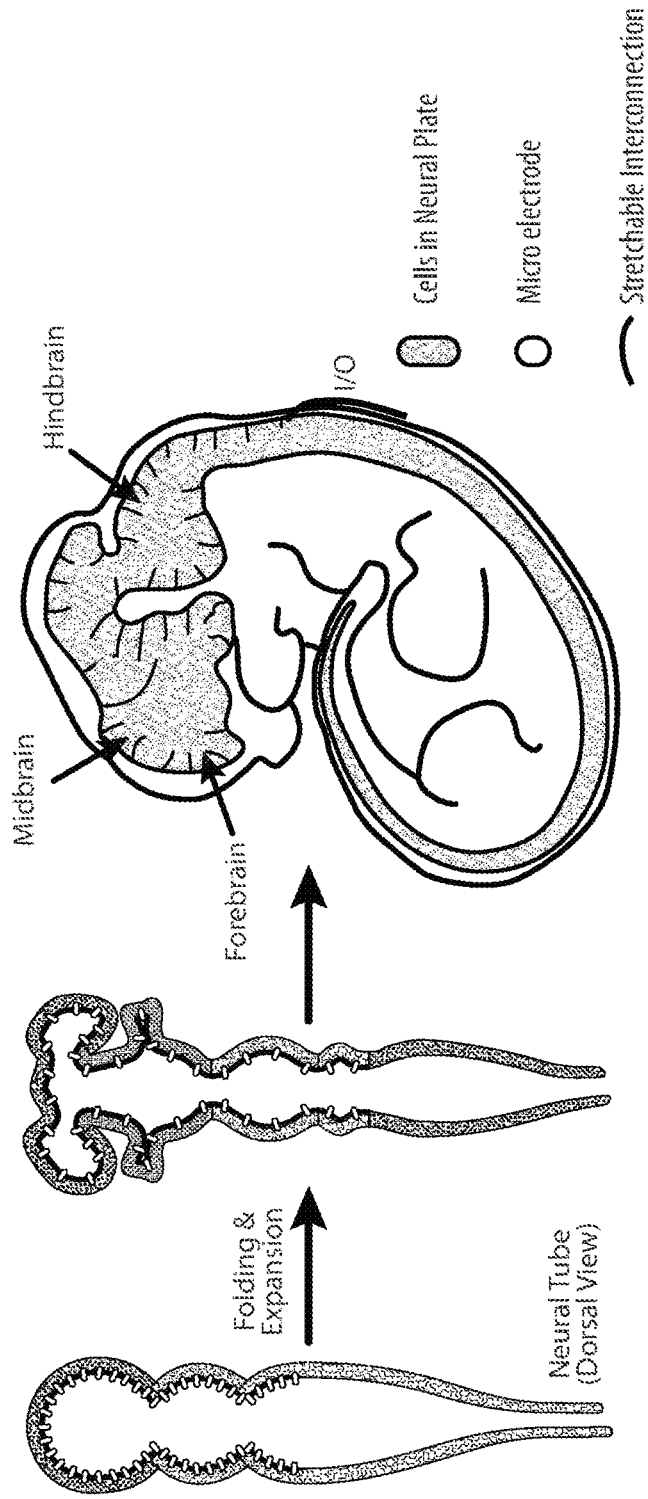

In some embodiments, the biological structure may be an organoid. An organoid, in some cases, is a miniaturized and simplified version of an organ produced in vitro. They can be derived from various sources, such as one or a few cells from a tissue, embryonic stem cells, induced pluripotent stem cells, or the like. In some cases, such cells are able to self-organize in three-dimensional culture, e.g., owing to their self-renewal and differentiation capacities. Thus, in certain embodiments, such cells may be added to a cell scaffold, and the cells may form an organoid that embeds the cell scaffold. In addition, in some cases, the biological structure may be an organism, i.e., an entire organism. The organism may be any suitable organism, including plants or animals, such as invertebrate or vertebrate organisms. The organism may be, for example, an invertebrate (e.g., a fruit fly), a fish (e.g., a zebrafish), an amphibian (e.g., a frog), a reptile, a bird, or a human or non-human mammal, such as a monkey, a cow, a sheep, a goat, a horse, a rabbit, a pig, a rodent such as a mouse or a rat, a dog, or a cat. In some cases, the cell scaffold may be added to a partially-formed biological structure, such as an embryo, which can grow into an organism. Non-limiting examples include plant cells, animal cells, or the like. For example, as the embryo develops into an organism, the growing cells may manipulate and embed the cell scaffold such that the cell scaffold becomes embedded, partially or completely, within the organism. See, e.g., FIGS. 10A-10C, illustrating the development and embedding of a cell scaffold within an embryo, in accordance with certain embodiments.

In addition, in one set of embodiments, a cell scaffold (with or without a biological structure) may be implanted into an organism. For example, an organoid or an organ containing a cell scaffold can be implanted within an organism. The organism may be a human or non-human mammal, such as a monkey, cow, sheep, goat, horse, rabbit, pig, mouse, rat, dog, or cat. The organoid or organ may be from the same or different species as the organism, and may be from the same individual or a different one.

Certain aspects of the present invention are generally directed to systems and methods for preparing cell scaffolds such as those described herein. The cell scaffolds can be fabricated, for example, using well-known lithographic techniques such as those discussed below.

In various embodiments, a cell scaffold is constructed by assembling various polymers, metals, and other components (for example, nanoscale wires) together on a substrate. For example, lithographic techniques such as e-beam lithography, photolithography, X-ray lithography, extreme ultraviolet lithography, ion projection lithography, etc. may be used to pattern polymers, metals, etc. on the substrate. After assembly, at least a portion of the substrate (e.g., a sacrificial material) may be removed, allowing the scaffold to be partially or completely removed from the substrate. Other materials may also be added to the scaffold, e.g., to help stabilize the structure, to add additional agents to enhance its biocompatibility, etc. The scaffold can be used in vivo, e.g., by implanting it in a subject, and/or in vitro, e.g., by seeding cells, etc. on the scaffold. In addition, in some cases, cells may initially be grown or cultured on the scaffold, e.g., to form a biological structure, such as tissues, organoids, organs, organisms, and the like. In some cases, as discussed, the cell scaffold may be sufficiently flexible such that the cell scaffold becomes embedded within the biological structures as it forms.

For example, in one set of embodiments, a cell scaffold may be constructed by providing a substrate, depositing a sacrificial layer on the substrate, then patterning a first photoresist on the sacrificial layer, a conductive pathway on the first photoresist, and a second photoresist on the conductive pathway, and removing the sacrificial layer to produce the cell scaffold. See, e.g., FIG. 5. The first and second photoresists may comprise the same or different materials. Optionally, other components can also be added to the cell scaffold, before or during formation, such as electrode components, nanoscale wires, connectors such as cables, or the like.

The substrate may be chosen to be one that can be used for lithographic techniques such as e-beam lithography or photolithography, or other lithographic techniques including those discussed herein. For example, the substrate may comprise or consist essentially of a semiconductor material such as silicon, although other substrate materials (e.g., a metal) can also be used. Typically, the substrate is one that is substantially planar, e.g., so that polymers, metals, and the like can be patterned on the substrate. In some cases, a portion of the substrate can be oxidized, e.g., forming $SiO_2$ and/or $Si_3N_4$ on a portion of the substrate, which may facilitate subsequent addition of materials (metals, polymers, etc.) to the substrate.

In certain embodiments, one or more polymers can also be deposited or otherwise formed prior to depositing the sacrificial material. In some cases, the polymers may be deposited or otherwise formed as a layer of material on the substrate. Deposition may be performed using any suitable technique, e.g., using lithographic techniques such as e-beam lithography, photolithography, X-ray lithography, extreme ultraviolet lithography, ion projection lithography, etc. In some cases, some or all of the polymers may be biocompatible and/or biodegradable. The polymers that are deposited may also comprise methyl methacrylate and/or poly(methyl methacrylate), in some embodiments.

Next, a sacrificial material may be deposited. The sacrificial material can be chosen to be one that can be removed without substantially altering other materials (e.g., polymers, other metals, nanoscale wires, etc.) deposited thereon. For example, in one embodiment, the sacrificial material may be a metal, e.g., one that is easily etchable. For instance, the sacrificial material can comprise germanium or nickel, which can be etched or otherwise removed, for example, using a peroxide (e.g., $H_2O_2$) or a nickel etchant (many of which are readily available commercially). In some cases, the sacrificial material may be deposited on oxidized portions or polymers previously deposited on the substrate. In some cases, the sacrificial material is deposited as a layer. The layer can have a thickness of less than about 5 micrometers, less than about 4 micrometers, less than about 3 micrometers, less than about 2 micrometers, less than about 1 micrometer, less than about 900 nm, less than about 800 nm, less than about 700 nm, less than about 600 nm, less than about 500 nm, less than about 400 nm, less than about 300 nm, less than about 200 nm, less than about 100 nm, etc.

In some embodiments, a first photoresist can be deposited, e.g., on the sacrificial material. The photoresist may include one or more polymers, which may be deposited as one or more layers. Examples of photoresist include, but are not limited to, SU-8, S1805, LOR 3A, poly(methyl methacrylate), poly(methyl glutarimide), phenol formaldehyde resin (diazonaphthoquinone/novolac), diazonaphthoquinone (DNQ), Hoechst AZ 4620, Hoechst AZ 4562, Shipley 1400-17, Shipley 1400-27, Shipley 1400-37, etc., as well as any others discussed herein.

The photoresist can be used to at least partially define a cell scaffold. In one set of embodiments, the photoresist may be deposited as a layer of material, such that portions of the photoresist may be subsequently removed. For example, the photoresist can be deposited using lithographic techniques such as e-beam lithography, photolithography, X-ray lithography, extreme ultraviolet lithography, ion projection lithography, etc., or using other techniques for removing polymer that are known to those of ordinary skill in the art. In some cases, more than one photoresist is used, e.g., deposited as more than one layer (e.g., sequentially), and each layer may independently have a thickness of less than about 5 micrometers, less than about 4 micrometers, less than about 3 micrometers, less than about 2 micrometers, less than about 1 micrometer, less than about 900 nm, less than about 800 nm, less than about 700 nm, less than about 600 nm, less than about 500 nm, less than about 400 nm, less than about 300 nm, less than about 200 nm, less than about 100 nm, etc. For example, in some embodiments, portions of the photoresist may be exposed to light (visible, UV, etc.), electrons, ions, X-rays, etc. (e.g., projected onto the photoresist), and the exposed portions can be etched away (e.g., using suitable etchants, plasma, etc.) to produce the pattern.

Accordingly, the photoresist may be formed into a particular pattern, e.g., in a grid or a mesh, e.g., as discussed herein. For instance, the pattern may include a mesh and interconnects that have a shape that allow the interconnects to be manipulated or distorted without disrupting their connections, e.g., during stretching, compression, folding, or the like. The pattern can be regular or irregular.

Next, a metal or other conductive material can be deposited e.g., on one of the previous materials, to form conductive pathways within the cell scaffold. More than one metal can be used, which may be deposited as one or more layers. For example, a first metal may be deposited, and a second metal may be deposited on at least a portion of the first metal. Optionally, more metals can be used, e.g., a third metal may be deposited on at least a portion of the second metal, and the third metal may be the same or different from the first metal. In some cases, each metal may independently have a thickness of less than about 5 micrometers, less than about 4 micrometers, less than about 3 micrometers, less than about 2 micrometers, less than about 1 micrometer, less than about 900 nm, less than about 800 nm, less than about 700 nm, less than about 600 nm, less than about 500 nm, less than about 400 nm, less than about 300 nm, less than about 200 nm, less than about 100 nm, less than about 80 nm, less than about 60 nm, less than about 40 nm, less than about 30 nm, less than about 20 nm, less than about 10 nm, less than about 8 nm, less than about 6 nm, less than about 4 nm, or less than about 2 nm, etc., and the layers may be of the same or different thicknesses.

Any suitable technique can be used for depositing metals, and if more than one metal is used, the techniques for depositing each of the metals may independently be the same or different. For example, in one set of embodiments, deposition techniques such as sputtering can be used. Other examples include, but are not limited to, physical vapor deposition, vacuum deposition, chemical vapor deposition, cathodic arc deposition, evaporative deposition, e-beam PVD, pulsed laser deposition, ion-beam sputtering, reactive sputtering, ion-assisted deposition, high-target-utilization sputtering, high-power impulse magnetron sputtering, gas flow sputtering, or the like.

The metals can be chosen in some cases such that the deposition process yields a pre-stressed arrangement, e.g., due to atomic lattice mismatch, which causes the subsequent metal leads to warp or bend, for example, once released from the substrate. Although such processes were typically undesired in the prior art, in certain embodiments of the present invention, such pre-stressed arrangements may be used to cause the resulting cell scaffold to form a 3-dimensional structure, in some cases spontaneously, upon release from the substrate. See, e.g., U.S. Pat. Apl. Pub. Nos. 2014/0073063, 2014/0074253, 2017/0069858, 2017/0072109, each of which is incorporated herein by reference in its entirety. However, it should be understood that in other embodiments, the metals may not necessary be deposited in a pre-stressed arrangement.

Figure 5:
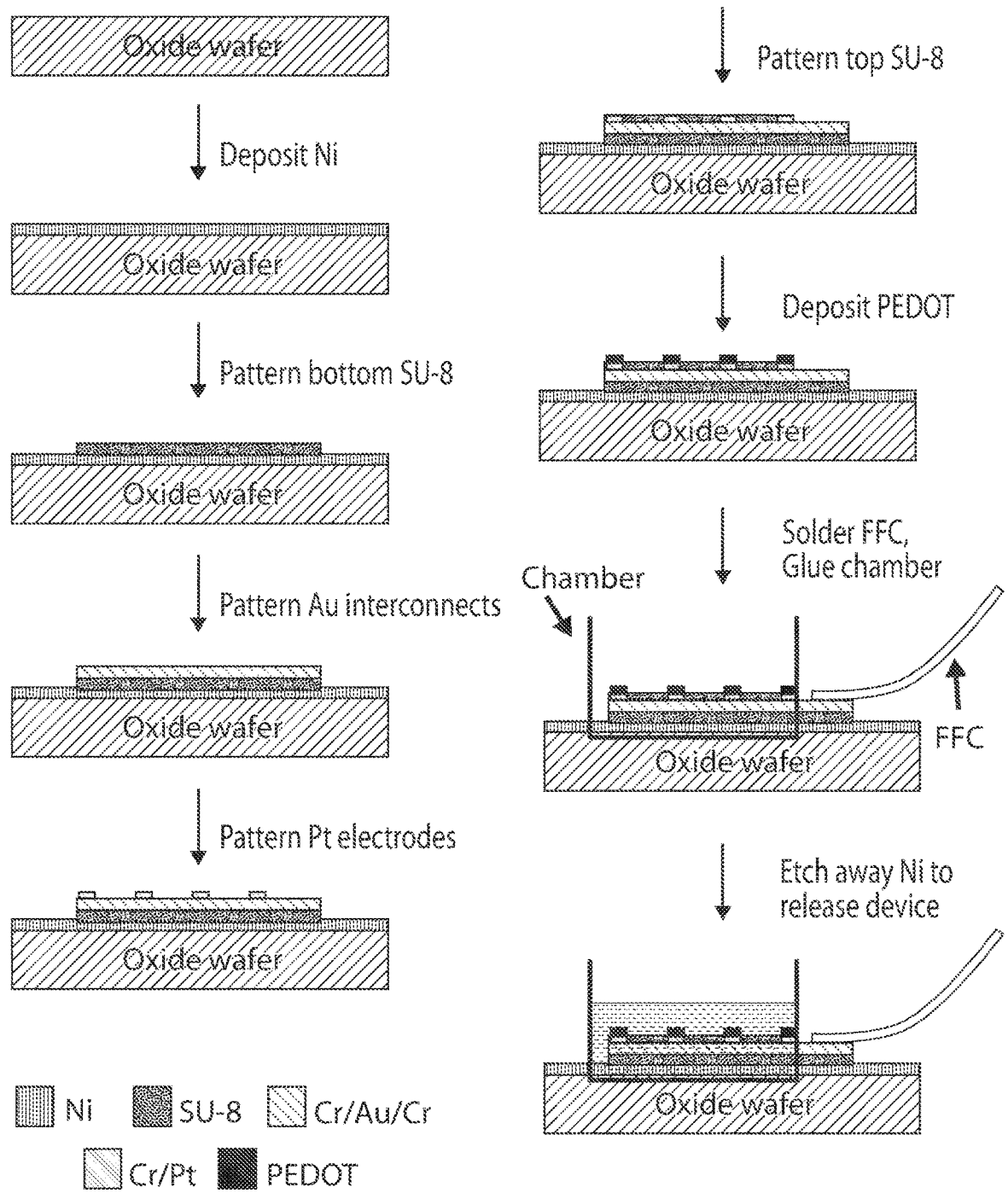
FIG. 5 illustrates a method of producing a cell scaffold in accordance with one embodiment of the invention.

Examples of metals that can be deposited (stressed or unstressed) include, but are not limited to, aluminum, gold, silver, copper, molybdenum, tantalum, titanium, nickel, tungsten, chromium, palladium, as well as any combinations of these and/or other metals. For example, a chromium/gold/chromium deposition process can be used, as is shown in FIG. 5.

In certain embodiments, a second photoresist can be deposited on the previous materials. The second photoresist may be the same or different from the first photoresist, and may include any of the photoresist materials discussed herein, including any of those described with reference to the first photoresist. The second photoresist may include one or more polymers, which may be deposited as one or more layers. In some embodiments, the second photoresist may be deposited on one or more portions of a substrate, e.g., as a layer of material such that portions of the second photoresist can be subsequently removed, e.g., using lithographic techniques such as e-beam lithography, photolithography, X-ray lithography, extreme ultraviolet lithography, ion projection lithography, etc., or using other techniques for removing photoresist that are known to those of ordinary skill in the art. In some cases, more than one photoresist may be used, e.g., deposited as more than one layer (e.g., sequentially), and each layer may independently have a thickness of less than about 5 micrometers, less than about 4 micrometers, less than about 3 micrometers, less than about 2 micrometers, less than about 1 micrometer, less than about 900 nm, less than about 800 nm, less than about 700 nm, less than about 600 nm, less than about 500 nm, less than about 400 nm, less than about 300 nm, less than about 200 nm, less than about 100 nm, etc.

After formation of the cell scaffold, some or all of the sacrificial material may then be removed in some cases. In one set of embodiments, for example, at least a portion of the sacrificial material is exposed to an etchant able to remove the sacrificial material. For example, if the sacrificial material is a metal such as nickel, a suitable etchant (for example, a metal etchant such as a nickel etchant, acetone, etc.) can be used to remove the sacrificial metal. Many such etchants may be readily obtained commercially. In addition, in some embodiments, the cell scaffold can also be dried, e.g., in air (e.g., passively), by using a heat source, by using a critical point dryer, etc.

Other materials may be also added to the cell scaffold, e.g., before or after it forms a 3-dimensional structure, for example, to help stabilize the structure, to add additional agents to enhance its biocompatibility (e.g., growth hormones, extracellular matrix protein, Matrigel™, etc.), to cause it to form a suitable 3-dimension structure, to control pore sizes, etc. Non-limiting examples of such materials have been previously discussed above, and include other polymers, growth hormones, extracellular matrix protein, specific metabolites or nutrients, additional scaffold materials, or the like.

In addition, in some cases, the cell scaffold is exposed to cells, which can be cultured or allowed to grow, e.g., to form a biological structure. In some cases, the cells are plated or seeded as individual cells, although in certain cases, larger cell assemblies (tissues, embryos, etc.) may be used. In one set embodiments, the cell scaffold may be exposed to cells in vitro, and/or the cell scaffold may be exposed or even submerged within a suitable cell growth medium. Such media are widely available commercially. In some embodiments, the cell scaffold can be subsequently implanted in vivo into a subject, e.g., upon the growth of tissue, an organ, an organoid, etc. However, it should be understood that implantation is not required in all embodiments, for example, in cases where an entire organism develops from the cells.

In addition, it should be understood that exposure to cells is not necessarily required in all embodiments. For instance, in one set of embodiments, the cell scaffold may be prepared without the presence of cells. For example, the cell scaffold may be sold as part of a kit, and the user may expose the cell scaffold to cells (or use it for other purposes).

In addition, the cell scaffold can be interfaced in some embodiments with one or more electronics, e.g., an external electrical system such as a computer or a transmitter (for instance, a radio transmitter, a wireless transmitter, etc.), e.g., as discussed herein. The interfacing may occur at any suitable time, e.g., before or after exposure to cells, before or after a biological structure (e.g., an organoid or an organism) has formed, before or after sale to a user, or the like.

For instance, in some cases, electronic testing of the cell scaffold may be performed. The cell scaffold, or a portion thereof, can be connected to an external electrical circuit, e.g., to electronically interrogate or otherwise determine the electronic state of the cell scaffold. For example, the cell scaffold may comprise one or more nanoscale wires, or other nanoelectronic components, that can be used as sensors. Such determinations may be performed quantitatively and/or qualitatively, depending on the application, and can involve all, or only a portion, of the cell scaffold, e.g., as discussed herein.

Thus, as mentioned, in some aspects, the cell scaffold can comprise one or more nanoscale wires. For instance, one or more nodes may contain nanoscale wires, and/or nanoscale wires may be contained within interconnects, or the like. In some cases, the cell scaffold within the organoids, organs, or organisms ay include one or more sensors or stimulators, interconnected with stretchable mesh interconnects, to form a network, e.g., as is shown in FIG. 1. The sensors or stimulators may, in some embodiments, comprise nanoscale wires, such as those described herein. Such sensors may be monitored, e.g., individually or collectively.

Non-limiting examples of suitable nanoscale wires include carbon nanotubes, nanorods, nanowires, organic and inorganic conductive and semiconducting polymers, metal nanoscale wires, semiconductor nanoscale wires (for example, formed from silicon), and the like. If carbon nanotubes are used, they may be single-walled and/or multi-walled, and may be metallic and/or semiconducting in nature. Other conductive or semiconducting elements that may not be nanoscale wires, but are of various small nanoscopic-scale dimension, also can be used within the cell scaffold.

In general, a "nanoscale wire" (also known herein as a "nanoscopic-scale wire" or "nanoscopic wire") generally is a wire or other nanoscale object, that at any point along its length, has at least one cross-sectional dimension and, in some embodiments, two orthogonal cross-sectional dimensions (e.g., a diameter) of less than 1 micrometer, less than about 500 nm, less than about 200 nm, less than about 150 nm, less than about 100 nm, less than about 70, less than about 50 nm, less than about 20 nm, less than about 10 nm, less than about 5 nm, than about 2 nm, or less than about 1 nm. In some embodiments, the nanoscale wire is generally cylindrical. In other embodiments, however, other shapes are possible; for example, the nanoscale wire can be faceted, i.e., the nanoscale wire may have a polygonal cross-section. The cross-section of a nanoscale wire can be of any arbitrary shape, including, but not limited to, circular, square, rectangular, annular, polygonal, or elliptical, and may be a regular or an irregular shape. The nanoscale wire can also be solid or hollow.

In some cases, the nanoscale wire has one dimension that is substantially longer than the other dimensions of the nanoscale wire. For example, the nanoscale wire may have a longest dimension that is at least about 1 micrometer, at least about 3 micrometers, at least about 5 micrometers, or at least about 10 micrometers or about 20 micrometers in length, and/or the nanoscale wire may have an aspect ratio (longest dimension to shortest orthogonal dimension) of greater than about 2:1, greater than about 3:1, greater than about 4:1, greater than about 5:1, greater than about 10:1, greater than about 25:1, greater than about 50:1, greater than about 75:1, greater than about 100:1, greater than about 150:1, greater than about 250:1, greater than about 500:1, greater than about 750:1, or greater than about 1000:1 or more in some cases.

In some embodiments, a nanoscale wire is substantially uniform, or the nanowire may have a variation in average diameter of the nanoscale wire of less than about 30%, less than about 25%, less than about 20%, less than about 15%, less than about 10%, or less than about 5%. For example, the nanoscale wires may be grown from substantially uniform nanoclusters or particles, e.g., colloid particles. See, e.g., U.S. Pat. No. 7,301,199, issued Nov. 27, 2007, entitled "Nanoscale Wires and Related Devices," by Lieber, et al., incorporated herein by reference in its entirety. In some cases, the nanoscale wire may be one of a population of nanoscale wires having an average variation in diameter, of the population of nanowires, of less than about 30%, less than about 25%, less than about 20%, less than about 15%, less than about 10%, or less than about 5%.

In some embodiments, a nanoscale wire has a conductivity of or of similar magnitude to any semiconductor or any metal. The nanoscale wire can be formed of suitable materials, e.g., semiconductors, metals, etc., as well as any suitable combinations thereof. In some cases, the nanoscale wire will have the ability to pass electrical charge, for example, being electrically conductive. For example, the nanoscale wire may have a relatively low resistivity, e.g., less than about $10^{-3}$ Ohm m, less than about $10^{-4}$ Ohm m, less than about $10^{-6}$ Ohm m, or less than about $10^{-7}$ Ohm m. The nanoscale wire can, in some embodiments, have a conductance of at least about 1 microsiemens, at least about 3 microsiemens, at least about 10 microsiemens, at least about 30 microsiemens, or at least about 100 microsiemens.

The nanoscale wire can be solid or hollow, in various embodiments. As used herein, a "nanotube" is a nanoscale wire that is hollow, or that has a hollowed-out core, including those nanotubes known to those of ordinary skill in the art. As another example, a nanotube may be created by creating a core/shell nanowire, then etching away at least a portion of the core to leave behind a hollow shell. Accordingly, in one set of embodiments, the nanoscale wire is a non-carbon nanotube. In contrast, a "nanowire" is a nanoscale wire that is typically solid (i.e., not hollow). Thus, in one set of embodiments, the nanoscale wire may be a semiconductor nanowire, such as a silicon nanowire.

For example, in one embodiment, a nanoscale wire may comprise or consist essentially of a metal. Non-limiting examples of potentially suitable metals include aluminum, gold, silver, copper, molybdenum, tantalum, titanium, nickel, tungsten, chromium, or palladium. In another set of embodiments, a nanoscale wire comprises or consists essentially of a semiconductor. Typically, a semiconductor is an element having semiconductive or semi-metallic properties (i.e., between metallic and non-metallic properties). An example of a semiconductor is silicon. Other non-limiting examples include elemental semiconductors, such as gallium, germanium, diamond (carbon), tin, selenium, tellurium, boron, or phosphorous. In other embodiments, more than one element may be present in the nanoscale wire as the semiconductor, for example, gallium arsenide, gallium nitride, indium phosphide, cadmium selenide, etc. Still other examples include a Group II-VI material (which includes at least one member from Group II of the Periodic Table and at least one member from Group VI, for example, ZnS, ZnSe, ZnSSe, ZnCdS, CdS, or CdSe), or a Group III-V material (which includes at least one member from Group III and at least one member from Group V, for example GaAs, GaP, GaAsP, InAs, InP, AlGaAs, or InAsP).

In certain embodiments, the semiconductor can be undoped or doped (e.g., p-type or n-type). For example, in one set of embodiments, a nanoscale wire may be a p-type semiconductor nanoscale wire or an n-type semiconductor nanoscale wire, and can be used as a component of a transistor such as a field effect transistor ("FET"). For instance, the nanoscale wire may act as the "gate" of a source-gate-drain arrangement of a FET, while metal leads or other conductive pathways (as discussed herein) are used as the source and drain electrodes.

In some embodiments, a dopant or a semiconductor may include mixtures of Group IV elements, for example, a mixture of silicon and carbon, or a mixture of silicon and germanium. In other embodiments, the dopant or the semiconductor may include a mixture of a Group III and a Group V element, for example, BN, BP, BAs, AN, AlP, AlAs, AlSb, GaN, GaP, GaAs, GaSb, InN, InP, InAs, or InSb. Mixtures of these may also be used, for example, a mixture of BN/BP/BAs, or BN/AlP. In other embodiments, the dopants may include alloys of Group III and Group V elements. For example, the alloys may include a mixture of AlGaN, GaPAs, InPAs, GaInN, AlGaInN, GaInAsP, or the like. In other embodiments, the dopants may also include a mixture of Group II and Group VI semiconductors. For example, the semiconductor may include ZnO, ZnS, ZnSe, ZnTe, CdS, CdSe, CdTe, HgS, HgSe, HgTe, BeS, BeSe, BeTe, MgS, MgSe, or the like. Alloys or mixtures of these dopants are also be possible, for example, (ZnCd)Se, or Zn(SSe), or the like. Additionally, alloys of different groups of semiconductors may also be possible, for example, a combination of a Group II-Group VI and a Group III-Group V semiconductor, for example, $(GaAs)_x(ZnS)_{1-x}$. Other examples of dopants may include combinations of Group IV and Group VI elements, such as GeS, GeSe, GeTe, SnS, SnSe, SnTe, PbO, PbS, PbSe, or PbTe. Other semiconductor mixtures may include a combination of a Group I and a Group VII, such as CuF, CuCl, CuBr, CuI, AgF, AgCl, AgBr, AgI, or the like. Other dopant compounds may include different mixtures of these elements, such as $BeSiN_2$, $CaCN_2$, $ZnGeP_2$, $CdSnAs_2$, $ZnSnSb_2$, $CuGeP_3$, $CuSi_2P_3$, $Si_3N_4$, $Ge_3N_4$, $Al_{23}$, $(Al, Ga, In)_2(S, Se, Te)_3$, $Al_2CO$, $(Cu, Ag)(Al, Ga, In, Tl, Fe)(S, Se, Te)_2$ and the like.

The doping of the semiconductor to produce a p-type or n-type semiconductor may be achieved via bulk-doping in certain embodiments, although in other embodiments, other doping techniques (such as ion implantation) can be used. Many such doping techniques that can be used will be familiar to those of ordinary skill in the art, including both bulk doping and surface doping techniques. A bulk-doped article (e.g. an article, or a section or region of an article) is an article for which a dopant is incorporated substantially throughout the crystalline lattice of the article, as opposed to an article in which a dopant is only incorporated in particular regions of the crystal lattice at the atomic scale, for example, only on the surface or exterior. For example, some articles are typically doped after the base material is grown, and thus the dopant only extends a finite distance from the surface or exterior into the interior of the crystalline lattice. It should be understood that "bulk-doped" does not define or reflect a concentration or amount of doping in a semiconductor, nor does it necessarily indicate that the doping is uniform. "Heavily doped" and "lightly doped" are terms the meanings of which are clearly understood by those of ordinary skill in the art. In some embodiments, one or more regions comprise a single monolayer of atoms ("delta-doping"). In certain cases, the region may be less than a single monolayer thick (for example, if some of the atoms within the monolayer are absent). As a specific example, the regions may be arranged in a layered structure within the nanoscale wire, and one or more of the regions can be delta-doped or partially delta-doped.

Accordingly, in one set of embodiments, the nanoscale wires may include a heterojunction, e.g., of two regions with dissimilar materials or elements, and/or the same materials or elements but at different ratios or concentrations. The regions of the nanoscale wire may be distinct from each other with minimal cross-contamination, or the composition of the nanoscale wire can vary gradually from one region to the next. The regions may be both longitudinally arranged relative to each other, or radially arranged (e.g., as in a core/shell arrangement) on the nanoscale wire. Each region may be of any size or shape within the wire. The junctions may be, for example, a p/n junction, a p/p junction, an n/n junction, a p/i junction (where i refers to an intrinsic semiconductor), an n/i junction, an i/i junction, or the like. The junction can also be a Schottky junction in some embodiments. The junction may also be, for example, a semiconductor/semiconductor junction, a semiconductor/metal junction, a semiconductor/insulator junction, a metal/metal junction, a metal/insulator junction, an insulator/insulator junction, or the like. The junction may also be a junction of two materials, a doped semiconductor to a doped or an undoped semiconductor, or a junction between regions having different dopant concentrations. The junction can also be a defected region to a perfect single crystal, an amorphous region to a crystal, a crystal to another crystal, an amorphous region to another amorphous region, a defected region to another defected region, an amorphous region to a defected region, or the like. More than two regions may be present, and these regions may have unique compositions or may comprise the same compositions. As one example, a wire can have a first region having a first composition, a second region having a second composition, and a third region having a third composition or the same composition as the first composition. Non-limiting examples of nanoscale wires comprising heterojunctions (including core/shell heterojunctions, longitudinal heterojunctions, etc., as well as combinations thereof) are discussed in U.S. Pat. No. 7,301,199, issued Nov. 27, 2007, entitled "Nanoscale Wires and Related Devices," by Lieber, et al., incorporated herein by reference in its entirety.

In some embodiments, a nanoscale wire is a bent or a kinked nanoscale wire. A kink is typically a relatively sharp transition or turning between a first substantially straight portion of a wire and a second substantially straight portion of a wire. For example, a nanoscale wire may have 1, 2, 3, 4, or 5 or more kinks. In some cases, the nanoscale wire is formed from a single crystal and/or comprises or consists essentially of a single crystallographic orientation, for example, a <110> crystallographic orientation, a <112> crystallographic orientation, or a <११$\bar{2}$0> crystallographic orientation. It should be noted that the kinked region need not have the same crystallographic orientation as the rest of the semiconductor nanoscale wire. In some embodiments, a kink in the semiconductor nanoscale wire may be at an angle of about 120° or a multiple thereof. The kinks can be intentionally positioned along the nanoscale wire in some cases. For example, a nanoscale wire may be grown from a catalyst particle by exposing the catalyst particle to various gaseous reactants to cause the formation of one or more kinks within the nanoscale wire. Non-limiting examples of kinked nanoscale wires, and suitable techniques for making such wires, are disclosed in International Patent Application No. PCT/US2010/050199, filed Sep. 24, 2010, entitled "Bent Nanowires and Related Probing of Species," by Tian, et al., published as WO 2011/038228 on Mar. 31, 2011, incorporated herein by reference in its entirety.

In one set of embodiments, the nanoscale wire is formed from a single crystal, for example, a single crystal nanoscale wire comprising a semiconductor. A single crystal item may be formed via covalent bonding, ionic bonding, or the like, and/or combinations thereof. While such a single crystal item may include defects in the crystal in some cases, the single crystal item is distinguished from an item that includes one or more crystals, not ionically or covalently bonded, but merely in close proximity to one another.

In some embodiments, the nanoscale wires used herein are individual or free-standing nanoscale wires. For example, an "individual" or a "free-standing" nanoscale wire may, at some point in its life, not be attached to another article, for example, with another nanoscale wire, or the free-standing nanoscale wire may be in solution. This is in contrast to nanoscale features etched onto the surface of a substrate, e.g., a silicon wafer, in which the nanoscale features are never removed from the surface of the substrate as a free-standing article. This is also in contrast to conductive portions of articles which differ from surrounding material only by having been altered chemically or physically, in situ, i.e., where a portion of a uniform article is made different from its surroundings by selective doping, etching, etc. An "individual" or a "free-standing" nanoscale wire is one that can be (but need not be) removed from the location where it is made, as an individual article, and transported to a different location and combined with different components to make a functional device such as those described herein and those that would be contemplated by those of ordinary skill in the art upon reading this disclosure.

In various embodiments, more than one nanoscale wire may be present within the cell scaffold. The nanoscale wires may each independently be the same or different. For example, the cell scaffold can comprise at least 5 nanoscale wires, at least about 10 nanoscale wires, at least about 30 nanoscale wires, at least about 50 nanoscale wires, at least about 100 nanoscale wires, at least about 300 nanoscale wires, at least about 1000 nanoscale wires, etc. The nanoscale wires may be distributed uniformly or non-uniformly throughout the cell scaffold. In some cases, the nanoscale wires may be distributed at an average density of at least about 10 nanoscale wires/mm$^3$, at least about 30 nanoscale wires/mm$^3$, at least about 50 nanoscale wires/mm$^3$, at least about 75 nanoscale wires/mm$^3$, or at least about 100 nanoscale wires/mm$^3$. In certain embodiments, the nanoscale wires are distributed within the cell scaffold such that the average separation between a nanoscale wire and its nearest neighboring nanoscale wire is less than about 2 mm, less than about 1 mm, less than about 500 micrometers, less than about 300 micrometers, less than about 100 micrometers, less than about 50 micrometers, less than about 30 micrometers, or less than about 10 micrometers.

Within the cell scaffold, some or all of the nanoscale wires may be individually electronically addressable. For instance, in some cases, at least about 10%, at least about 20%, at least about 30%, at least about 40%, at least about 50%, at least about 60%, at least about 70%, at least about 80%, at least about 90%, or substantially all of the nanoscale wires within the cell scaffold may be individually electronically addressable. In some embodiments, an electrical property of a nanoscale wire can be individually determinable (e.g., being partially or fully resolvable without also including the electrical properties of other nanoscale wires), and/or such that the electrical property of a nanoscale wire may be individually controlled (e.g., by applying a desired voltage or current to the nanoscale wire, for instance, without simultaneously applying the voltage or current to other nanoscale wires). In other embodiments, however, at least some of the nanoscale wires can be controlled within the same electronic circuit (e.g., by incorporating the nanoscale wires in series and/or in parallel), such that the nanoscale wires can still be electronically controlled and/or determined.

The nanoscale wire, in some embodiments, may be responsive to a property external of the nanoscale wire, e.g., a chemical property, an electrical property, a physical property, etc. Such determination may be qualitative and/or quantitative. For example, in one set of embodiments, the nanoscale wire may be responsive to voltage. For instance, the nanoscale wire may exhibits a voltage sensitivity of at least about 5 microsiemens/V; by determining the conductivity of a nanoscale wire, the voltage surrounding the nanoscale wire may thus be determined. In other embodiments, the voltage sensitivity can be at least about 10 microsiemens/V, at least about 30 microsiemens/V, at least about 50 microsiemens/V, or at least about 100 microsiemens/V. Other examples of electrical properties that can be determined include resistance, resistivity, conductance, conductivity, impendence, or the like.

As another example, a nanoscale wire may be responsive to a chemical property of the environment surrounding the nanoscale wire. For example, an electrical property of the nanoscale wire can be affected by a chemical environment surrounding the nanoscale wire, and the electrical property can be thereby determined to determine the chemical environment surrounding the nanoscale wire. As a specific non-limiting example, the nanoscale wires may be sensitive to pH or hydrogen ions. Further non-limiting examples of such nanoscale wires are discussed in U.S. Pat. No. 7,129,554, filed Oct. 31, 2006, entitled "Nanosensors," by Lieber et al., incorporated herein by reference in its entirety.

As an example, the nano scale wire may have the ability to bind to an analyte indicative of a chemical property of the environment surrounding the nanoscale wire (e.g., hydrogen ions for pH, or concentration for an analyte of interest), and/or the nanoscale wire may be partially or fully functionalized, i.e. comprising surface functional moieties, to which an analyte is able to bind, thereby causing a determinable property change to the nanoscale wire, e.g., a change to the resistivity or impedance of the nanoscale wire. The binding of the analyte can be specific or non-specific. Functional moieties may include simple groups, selected from the groups including, but not limited to, —OH, —CHO, —COOH, —SO$_3$H, —CN, —NH$_2$, —SH, —COSH, —COOR, halide; biomolecular entities including, but not limited to, amino acids, proteins, sugars, DNA, antibodies, antigens, and enzymes; grafted polymer chains with chain length less than the diameter of the nanowire core, selected from a group of polymers including, but not limited to, polyamide, polyester, polyimide, polyacrylic; a shell of material comprising, for example, metals, semiconductors, and insulators, which may be a metallic element, an oxide, an sulfide, a nitride, a selenide, a polymer and a polymer gel.

In some embodiments, a reaction entity may be bound to a surface of the nanoscale wire, and/or positioned in relation to the nanoscale wire such that the analyte can be determined by determining a change in a property of the nanoscale wire. The "determination" may be quantitative and/or qualitative, depending on the application. The term "reaction entity" refers to any entity that can interact with an analyte in such a manner to cause a detectable change in a property (such as an electrical property) of a nanoscale wire. The reaction entity may enhance the interaction between the nanowire and the analyte, or generate a new chemical species that has a higher affinity to the nanowire, or to enrich the analyte around the nanowire. The reaction entity can comprise a binding partner to which the analyte binds. The reaction entity, when a binding partner, can comprise a specific binding partner of the analyte. For example, the reaction entity may be a nucleic acid, an antibody, a sugar, a carbohydrate or a protein. Alternatively, the reaction entity may be a polymer, catalyst, or a quantum dot. A reaction entity that is a catalyst can catalyze a reaction involving the analyte, resulting in a product that causes a detectable change in the nanowire, e.g. via binding to an auxiliary binding partner of the product electrically coupled to the nanowire. Another exemplary reaction entity is a reactant that reacts with the analyte, producing a product that can cause a detectable change in the nanowire. The reaction entity can comprise a shell on the nanowire, e.g. a shell of a polymer that recognizes molecules in, e.g., a gaseous sample, causing a change in conductivity of the polymer which, in turn, causes a detectable change in the nanowire.

The term "binding partner" refers to a molecule that can undergo binding with a particular analyte, or "binding partner" thereof, and includes specific, semi-specific, and non-specific binding partners as known to those of ordinary skill in the art. The term "specifically binds," when referring to a binding partner (e.g., protein, nucleic acid, antibody, etc.), refers to a reaction that is determinative of the presence and/or identity of one or other member of the binding pair in a mixture of heterogeneous molecules (e.g., proteins and other biologics). Thus, for example, in the case of a receptor/ligand binding pair the ligand would specifically and/or preferentially select its receptor from a complex mixture of molecules, or vice versa. An enzyme would specifically bind to its substrate, a nucleic acid would specifically bind to its complement, an antibody would specifically bind to its antigen. Other examples include, nucleic acids that specifically bind (hybridize) to their complement, antibodies specifically bind to their antigen, and the like. The binding may be by one or more of a variety of mechanisms including, but not limited to ionic interactions, and/or covalent interactions, and/or hydrophobic interactions, and/or van der Waals interactions, etc.

Additionally, as discussed, a cell scaffold in some aspects may include a photoresist, such as a soft photoresist. For example, in some embodiments, the photoresist may comprise a polymer formed by photo-curing a fluorinated monomer including cross-linkable function groups using a photoinitiator. This may, for examlpe, facilitate stretchability of the cell scaffold. One example of such a polymer is perfluoropolyether dimethacrylate (PFPE-DMA). In addition, in some cases, the photoresist may be a photo-curable composition. In some embodiments, a photo-curable composition includes: a fluorinated monomer including cross-linkable functional groups; and a photoinitiator. Additional non-limiting examples of photoresist may be found in Int. Pat. Apl. Pub. No. WO 2019/084498, incorporated herein by reference in its entirety.

Some embodiments of this disclosure are directed to a photo-curable composition that can be cured to form an elastomer exhibiting high stretchability and that is chemically orthogonal to various development solvents used in photolithography and, hence, compatible with photolithography. Further, the elastomer can be patterned with fine feature resolution, and can be used as a photoresist for patterning various materials, including electrically (or electronically) active materials. Examples of applications of such photo-patternable composition include forming stretchable and transparent substrates, stretchable and transparent dielectric/passivation/encapsulation films or layers for elastic or stretchable microelectronics, and photoresists for patterning of materials, such as in the context of implantable medical devices, wearable electronic devices, and soft electronic devices; other biomedical devices; cosmetics; prosthetics; and other applications involving an interface with a human body, an animal body, or other biological tissue where matching of mechanical properties with the biological tissue is desired.

In some embodiments, a kit may be provided, e.g., comprising a cell scaffold as is discussed herein. Cells may or may not be provided with the kit. The kit may include a package or an assembly including the cell scaffold, and optionally other components associated with the cell scaffold, such as cells. Examples of other components include, but are not limited to, solvents, surfactants, diluents, salts, buffers, emulsifiers, chelating agents, fillers, antioxidants, binding agents, bulking agents, preservatives, drying agents, antimicrobials, needles, syringes, packaging materials, tubes, bottles, flasks, beakers, dishes, frits, filters, rings, clamps, wraps, patches, containers, and the like, for example, for using, administering, modifying, assembling, storing, packaging, preparing, mixing, diluting, and/or preserving the cell scaffold.

A kit may include instructions in any form that are provided in connection with the components of the kit in such a manner that one of ordinary skill in the art would recognize that the instructions are to be associated with those components. For instance, the instructions may include instructions for the use, modification, mixing, diluting, preserving, administering, assembly, storage, packaging, and/or preparation of the cell scaffold. The instructions may be provided in any form recognizable by one of ordinary skill in the art as a suitable vehicle for containing such instructions, for example, written or published, verbal, audible (e.g., telephonic), digital, optical, visual (e.g., videotape, DVD, etc.) or electronic communications (including Internet or web-based communications), provided in any manner.

The following documents are incorporated herein by reference in their entireties: U.S. Provisional Patent Application Ser. No. 62/865,648, filed Jun. 24, 2019, entitled "Organoids Containing Electronics, and Methods Thereof," by Liu, et al.; U.S. Provisional Patent Application Ser. No. 62/872,031, filed Jul. 9, 2019, entitled "Organoids Containing Electronics, and Methods Thereof," by Liu, et al.; U.S. Pat. No. 7,211,464, issued May 1, 2007, entitled "Doped Elongated Semiconductors, Growing Such Semiconductors, Devices Including Such Semiconductors, and Fabricating Such Devices," by Lieber, et al.; U.S. Pat. No. 7,301,199, issued Nov. 27, 2007, entitled "Nanoscale Wires and Related Devices," by Lieber, et al.; and International Patent Application No. PCT/US2010/050199, filed Sep. 24, 2010, entitled "Bent Nanowires and Related Probing of Species," by Tian, et al., published as WO 2011/038228 on Mar. 31, 2011. In addition, the following are each incorporated herein by reference in their entireties: U.S. Pat. Nos. 9,786,850 and 9,457,128; U.S. Pat. Apl. Pub. Nos. 2017/0069858, 2014/0073063, 2017/0072109, and 2014/0074253; and Int. Pat. Apl. Pub. No. WO 2019/084498.

The following examples are intended to illustrate certain embodiments of the present invention, but do not exemplify the full scope of the invention.

EXAMPLE 1

Inspired by the natural organogenesis, this example illustrates a new scheme to realize 3D implantation and distribution of nanoelectronics within organoids (FIG. 1A). The first stage includes transferring and laminating a mesh-like planar nanoelectronics together with its input/output (I/O) interconnects, onto a 2D sheet of stem cells (Stage I). Cell attraction forces between stem cells during cell aggregation, proliferation, and migration gradually shrink the cell-sheet into a cell-dense plate, which simultaneously compresses the nanoelectronics into a closely packed architecture and covers the nanoelectronics with stem cells (Stage II). This interwoven cell/nanoelectronic structure then contracts and curls as a result of organogenesis-induced self-folding, first into a bowl geometry (Stage III), and then into a 3D spherical morphology (Stage IV). During this process, the mesh device seamlessly reconfigures with the cell-plate due to its soft mechanics, while maintaining uniform spatial distributions throughout the tissue, leading to a fully-grown 3D organoid with an embedded sensors/stimulators array in a minimally invasive and globally distributed manner (Stage IV)—hence the name "cyborg organoid." Finally, the stem cells in the as-formed cyborg organoid can further differentiate into targeted types of functional cells such as cardiomyocytes, while their electrophysiological activities can be chronically monitored using the embedded nanoelectronics (Stage V).

Several important design characteristics of the nanoelectronics allowed seamless, whole-tissue-wide integrations (FIG. 1B). First, the device in this example used a serpentine mesh layout with an overall filling ratio of less than 11%, which lead to significantly improved in-plane stretchability up to 30% and compressibility up to several times of its initial volume due to out-of-plane buckling of the mesh network, thus capable of accommodating drastic volumetric changes (mostly compressive) during organogenesis. Second, two sets of mesh dimensions were implemented (ribbon width/thickness=20 micrometer/0.8 micrometer or 10 micrometer/2.8 micrometer), which resulted in a tiny device mass of less than 15 micrograms and effective bending stiffness of 0.090 n·Nm and 1.9 n·Nm, respectively, that were essentially imperceptible to the surrounding tissues. Third, sensors with low-impedance and an average diameter of 20 micrometers that approaches the typical size of an individual cell allowed non-invasive, localized, single-cell electrophysiological recordings. Detailed fabrication procedures can be found below and in FIG. 5.

Figure 1C:
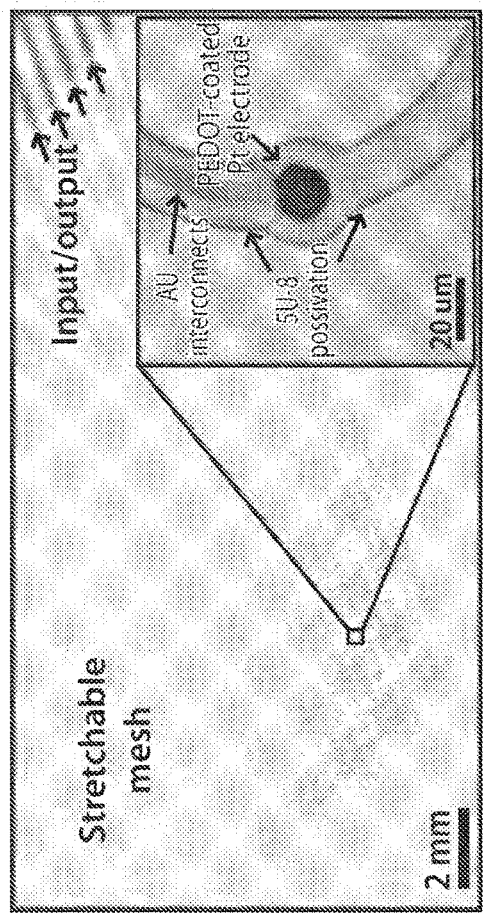
Figure 1E:
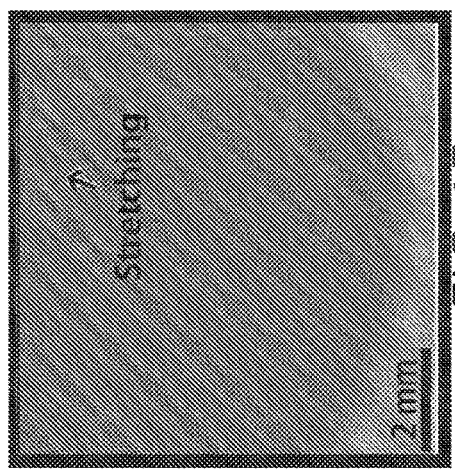
Figure 1D:
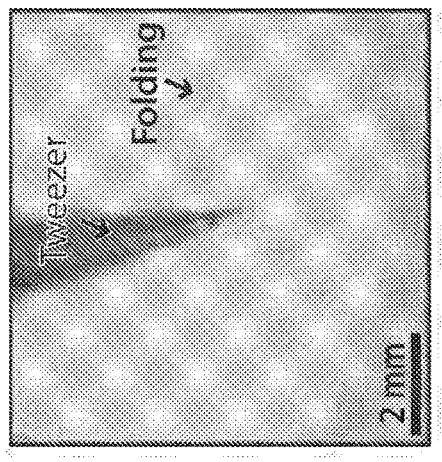
Figure 1H:
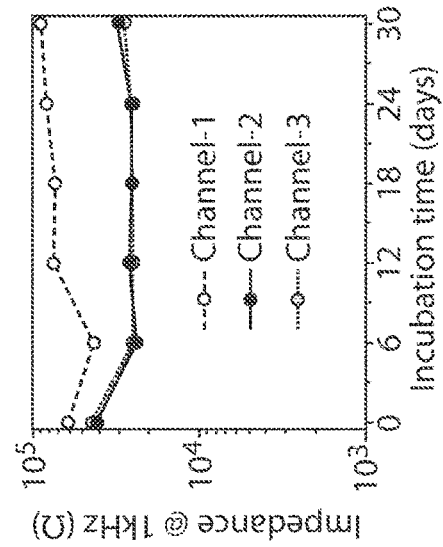
Figure 1G:
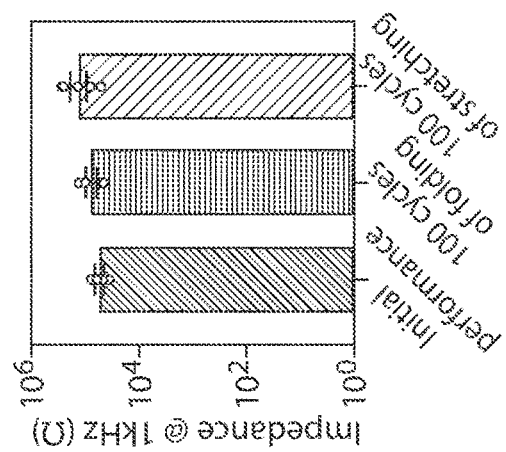
Figure 1F:
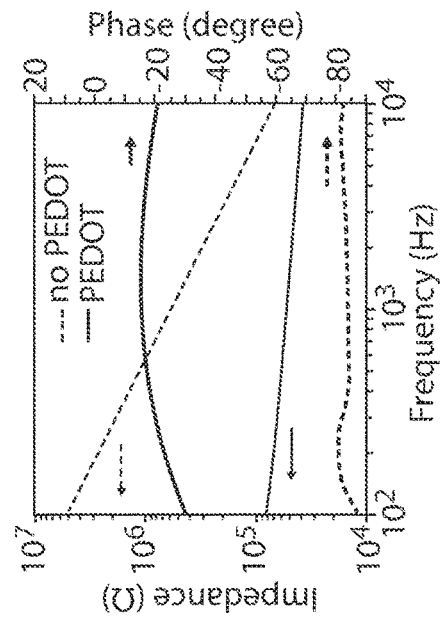

FIG. 1C shows mesh nanoelectronics immediately before release from the fabrication substrate, while the inset shows an individual platinum electrode electrochemically deposited with poly(3,4-ethylenedioxythiophene) (PEDOT) to further lower the interfacial impedance. Folding (up to 180°) and stretching (up to 30% biaxially) the released device in a chamber filled with water for 100 cycles (FIG. 1D-F) reveal neither visualizable damages (FIGS. 1D-E) nor significant changes in the impedance of electrodes (FIG. 1F). Impedance measurements also showed an >10 times reduction in impedance at 1 kHz and a shift of phase towards resistance-dominated behaviors after coating the electrodes with PEDOT. Furthermore, longevity of the device was tested using a soaking test in 1× phosphate-buffered saline (PBS) at 37° C., where impedance values of three random channels at 1 kHz remain steady over 30 days (FIG. 1H), showing the potential of such sensory platforms for chronic studies in physiological environments.

FIG. 1 shows the concept and design of the cyborg organoids of this particular example. FIG. 1A is a schematic illustrating the stepwise assembly of stretchable mesh electronics into organoids through organogenesis. Part (I) shows lamination of stretchable mesh electronics onto a continuous sheet of Matrigel® seeded with human induced pluripotent stem cells (hiPSCs) or hiPSCs-derived progenitor cells. Part (II) shows aggregation of the cell-sheet into a cell-dense plate through cell proliferations and migrations induced by cell-cell attractive forces, which embeds stretchable mesh electronics into the cell-plate and folds it into a closely packed structure. Part (III) shows that organogenetic 2D-to-3D self-organization folds the 2D cell-plate/nanoelectronics hybrid into a 3D structure. Part (IV) shows that organogenesis unfolds the closely packed nanoelectronics and distributes its structure across the entire 3D organoid. Part (V) shows that further development and differentiation of stem/progenitor cells into different cell types with their electrophysiological behaviors can be continuously monitored by 3D embedded nanoelectronics.

FIG. 1B shows an exploded view of stretchable mesh nanoelectronics design, with (from top to bottom) a 400 nm-thick top SU-8 encapsulation layer, a 50 nm-thick platinum (Pt) electrode layer coated with poly(3,4-ethylenedioxythiophene) (PEDOT), a 40 nm-thick gold (Au) interconnects layer, and a 400 nm-thick bottom SU-8 encapsulation layer. Note that other materials may be used besides SU-8, such as those described herein, and those in Int. Pat. Apl. Pub. No. WO 2019/084498, incorporated herein by reference. The inset shows the serpentine layout of the mesh. FIG. 1C shows an optical image of the mesh electronics before releasing from the fabrication substrate. The inset shows a zoom-in view of a single Pt electrode coated with PEDOT. FIGS. 1D and 1E are optical images of released stretchable mesh electronics in water, bent (FIG. 1D) and stretched (FIG. 1E) by tweezers. FIG. 1F shows the impedance and phase from 0.1 to 10 kHz of representative channels with and without PEDOT. FIG. 1G shows the average impedance (n=5) at 1 kHz for each channel in its original state, after 100 cycles of folding (to the degree as shown in FIG. 1D) and 100 cycles of stretching (to about 30% biaxially as shown in FIG. 1E). FIG. 1H shows the impedance at 1 kHz as a function of incubation time in PBS at 37° C. for three representative channels. FIG. 5 is a schematics showing the entire fabrication flow of stretchable mesh nanoelectronics.

EXAMPLE 2

In this example, the stretchable mesh nanoelectronics described in Example 1 were integrated with human mesenchymal stem cells (hMSCs) co-cultured hiPSC or hiPSC-derived cardiac progenitor cells (hiPSC-CPCs) (FIG. 2). The initial flat cell-sheet sandwiching the nanoelectronics with Matrigel® (FIG. 2A, I) shrank into a cell-plate via hMSCs-driven condensation, spontaneously packaging the nanoelectronics into a highly compressed structure (FIG. 2A, II). Further 3D re-organization transformed the cell-plate into a 3D organoid (FIG. 2A, III) in ~72 hours. Phase images illustrate initial compression (FIG. 2C, I to II) and subsequent folding (FIG. 2C, III) of the nanoelectronics together with cell-sheet/plate at each step. With further growth and expansion, the cyborg organoid fully unfolded and distributed the nanoelectronics throughout the entire organoid. Phase and false color images after ~480 hours of organogenesis showed uniform distribution of the device over and within the entire organoid as it grew and expanded (FIG. 2D). Importantly, the same morphology from hMSCs/hiPSCs and hMSCs/hiPSC-CPCs assembled nanoelectronics further demonstrated the generality of this method for different types of cyborg organoids (FIGS. 2A-2C).

Imaging results showed that during organogenesis, up to ~50% compressive and ~20% tensile effective strains, defined as the relative changes in distance between adjacent nodal points of the mesh, were applied to the nanoelectronics. Simulations by finite element analysis (FEA, see below for more details) showed that the large deformations were accommodated by out-of-plane buckling of the mesh ribbons, leading to a maximum nominal strain under 1.2%, which is below the fracture limit of both SU-8 and gold (FIGS. 2F-G, 6A-6B, and 7A-7C), indicating the robustness of this nanoelectronic structure design. Notably, buckling modes in compression and stretching observed in experiments could be qualitatively reproduced by simulations. In addition, simulations showed that the end-to-end force required to deform nanoelectronics is comparable to the forces required to deform cells at the same scale, indeed indicating a minimally invasive implantation process (FIGS. 2H and 8).

FIG. 2 shows 3D implantation and distribution of stretchable mesh nanoelectronics by organogenesis. In FIG. 2A, optical images show representative steps of assembly of stretchable mesh nanoelectronics by organoids development corresponding to schematics in FIG. 1A, including lamination of stretchable mesh nanoelectronics on the stem cell cell-sheet on Matrigel® (I), cell-dense cell-plate (II) and 3D re-organized cell-plate (III). hiPSCs-CPCs and hMSCs were co-cultured. Dashed-line circles highlight boundaries of cell-plates at different stages. In FIG. 2B, zoom-in phase images show the deformation of stretchable mesh nanoelectronics by the mechanical forces from organogenesis at different steps from the dashed-box highlighted regions in FIG. 2A. In FIG. 2C, further zoom-in phase images highlight the cell-nanoelectronics interaction at different steps from the dashed-box highlighted regions in FIG. 2B. The SU-8 ribbons from nanoelectronics and stem cells are shown. White arrows highlight the regions where the ribbons are embedded within the cells. FIG. 2D is a bright-field phase image of a representative fully assembled cyborg organoid with stretchable mesh nanoelectronics unfolded and integrated across the entire organoid.

Figure 2A:
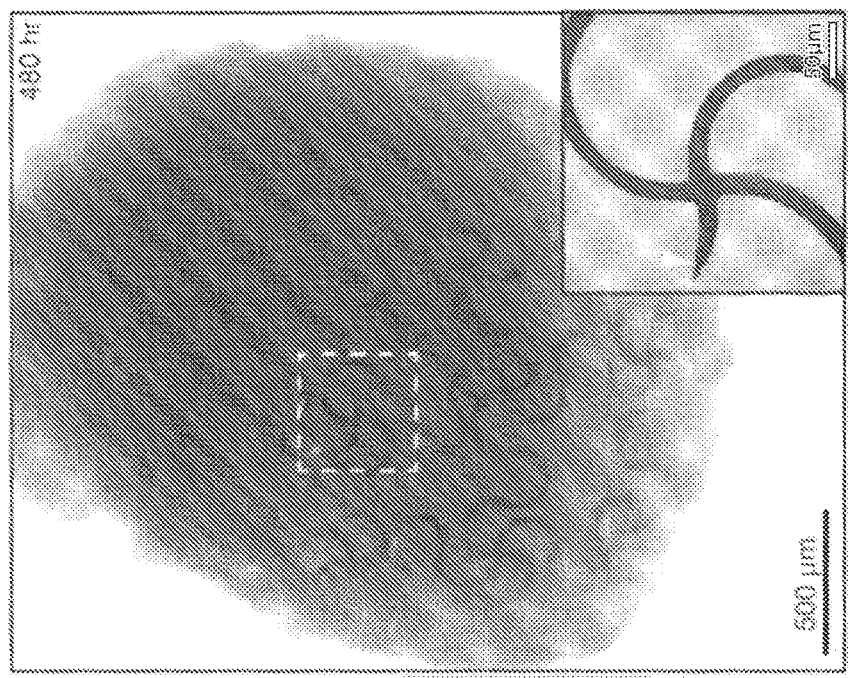
FIGS. 2A-2H illustrate the implantation and distribution of cell scaffolds within organoids during organogenesis, in certain embodiments of the invention.
Figure 2B:
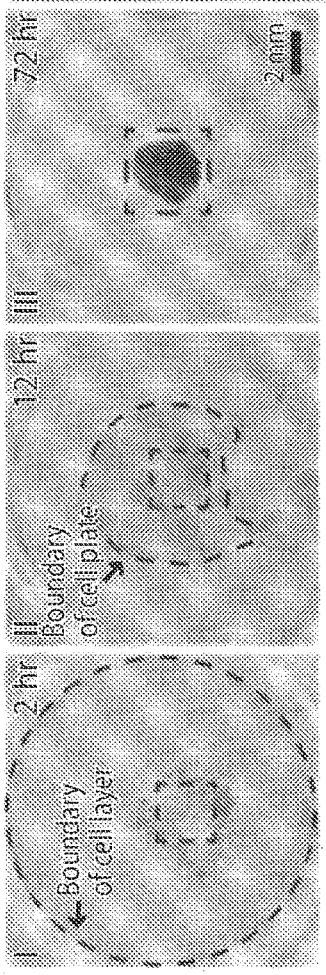
Figure 2C:
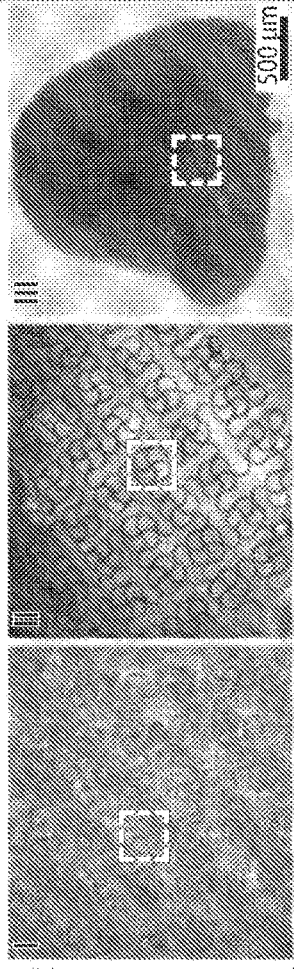
Figure 2D:
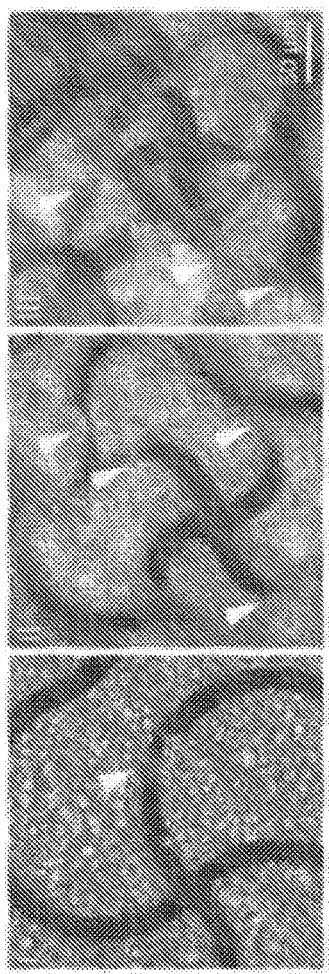
Figure 2F:
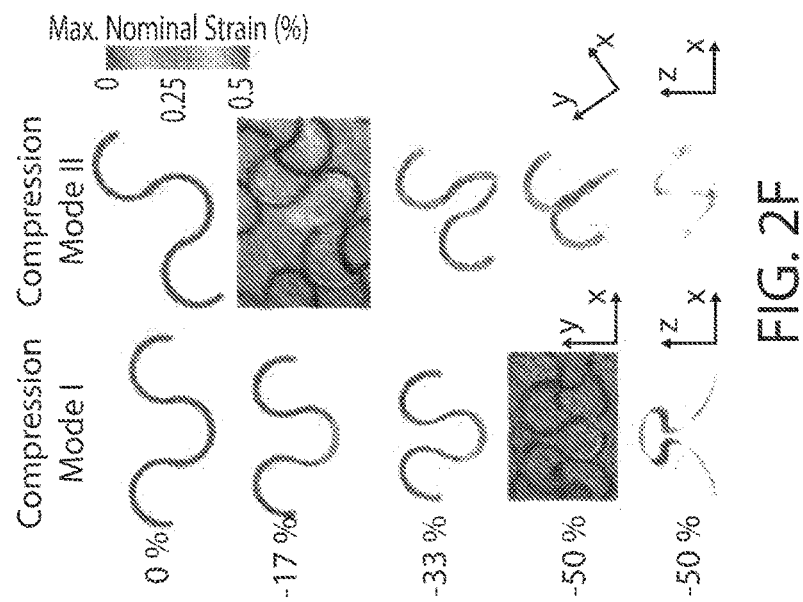
Figure 2E:
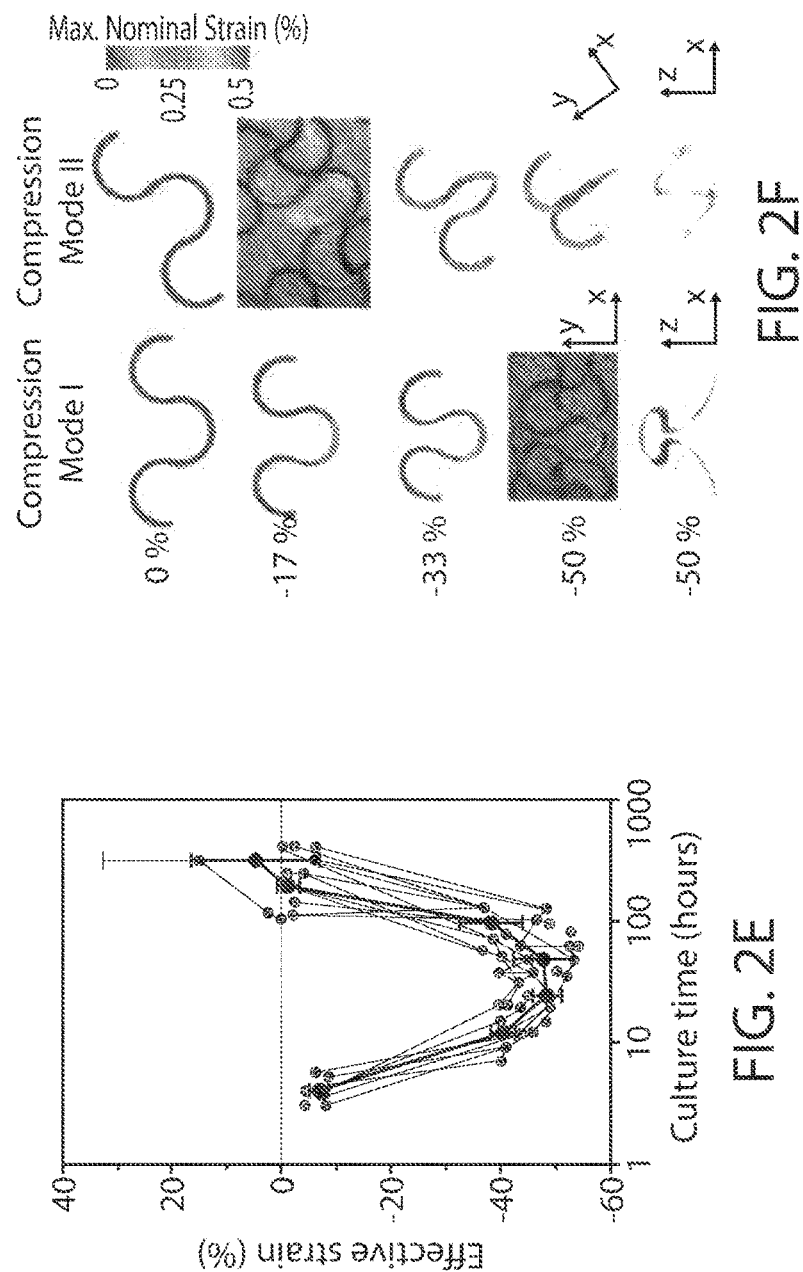
Figure 2H:
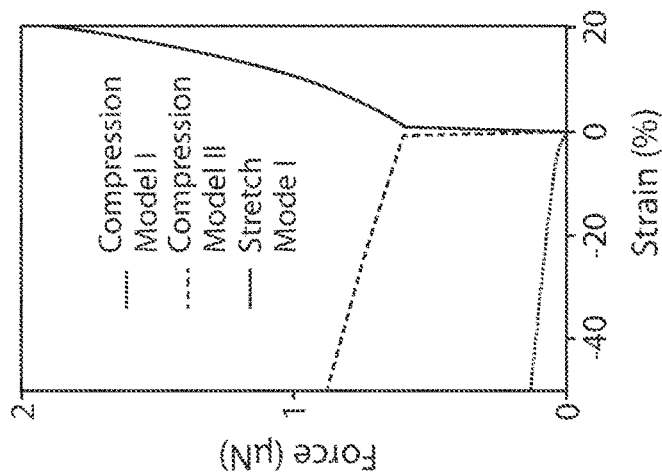
Figure 2G:
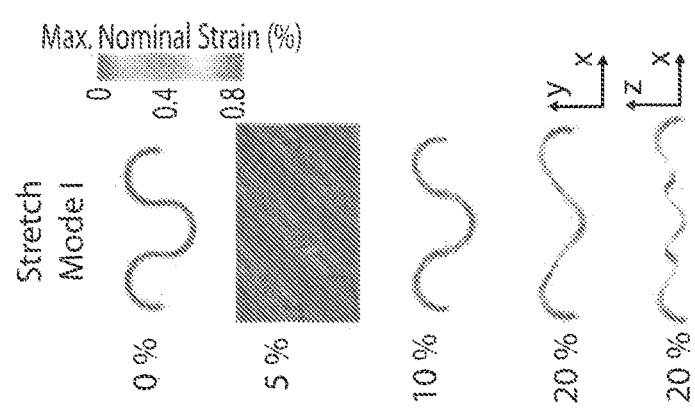

Inset shows zoom-in phase image from the dashed box highlight region in FIG. 2C). FIG. 2E is a representative effective strains of the device calculated through phase images as a function of culture time. Gray dots and lines show the individual data points, while black dots and lines show the averaged results. (Value=mean+/−s.e.m., n=10.) FIG. 2F shows two compression modes of a repetitive unit in the mesh electronics obtained from finite element analysis (FEA). Merged simulation and optical images show the representative modes in real samples. The scale indicates nominal strain in the unit. FIG. 2G shows a stretch mode of a repetitive unit in the mesh electronics obtained from FEA. Merged simulation and optical images show the representative modes in real samples. The grayscale indicates nominal strain in the unit. FIG. 2H shows the magnitude of force as a function of strain for the three deformation modes in FIGS. 2F and 2G obtained from FEA.

Figure 6A:
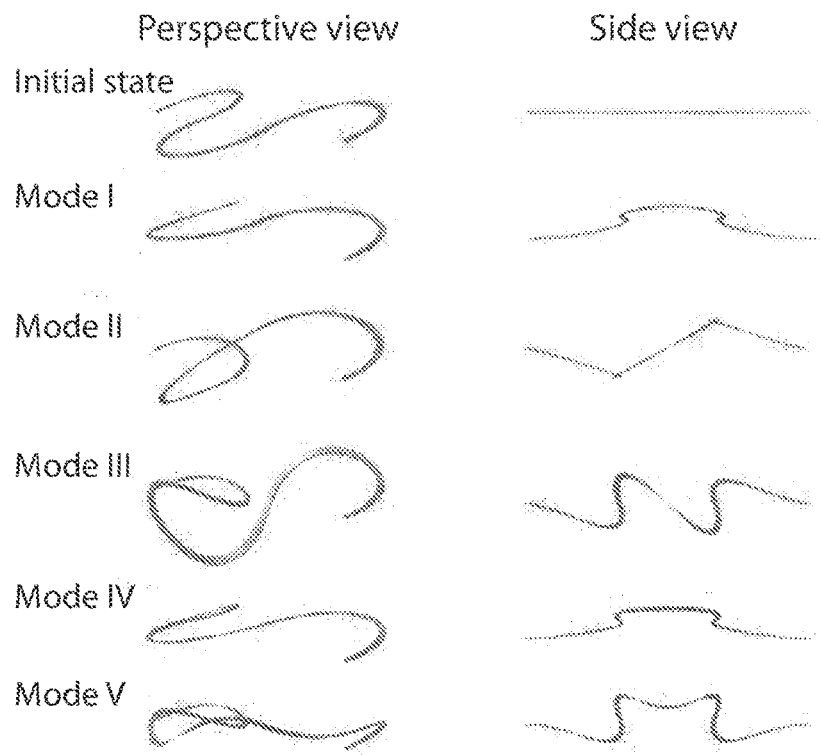
FIGS. 6A-6B illustrate various buckling modes of interconnects in a cell scaffold, in certain embodiments of the invention.
Figure 6B:
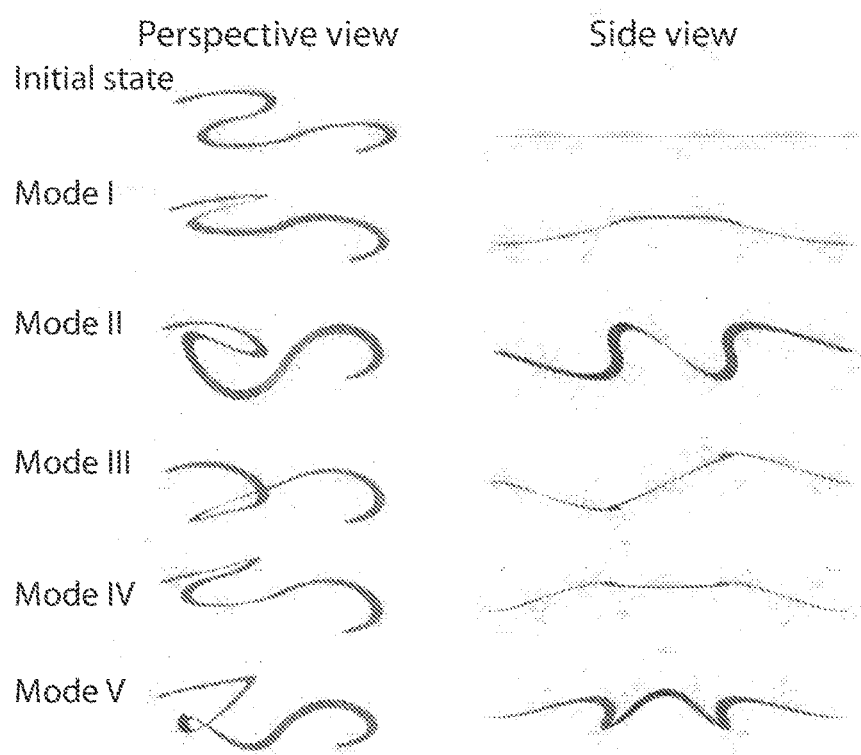

FIGS. 6A and 6B show linear perturbation analysis shows buckling modes of a unit ribbon in compression. Deformation in the Z direction is magnified 50 times for convenience. In FIG. 6A, W/H=10 micrometer/2.8 micrometer and in FIG. 6B, W/H=20 micrometer/0.8 micrometer.

Figure 7B:
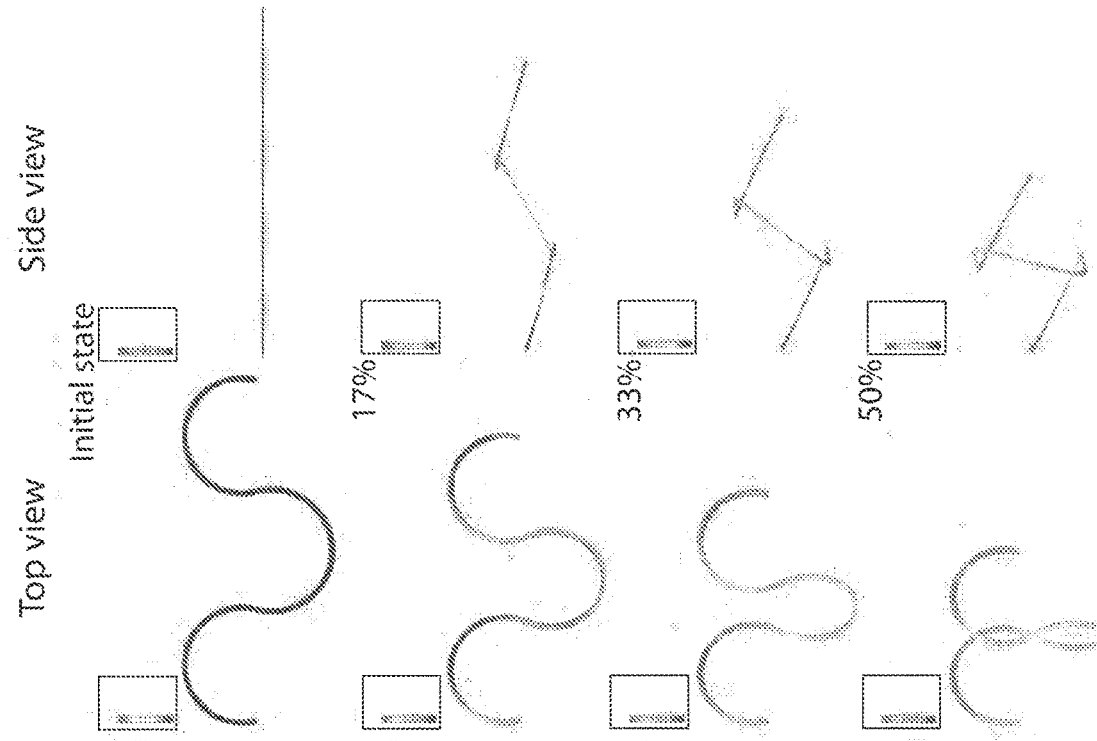
FIGS. 7A-7C illustrate various strain distributions of interconnects in a cell scaffold, in certain embodiments of the invention.
Figure 7A:
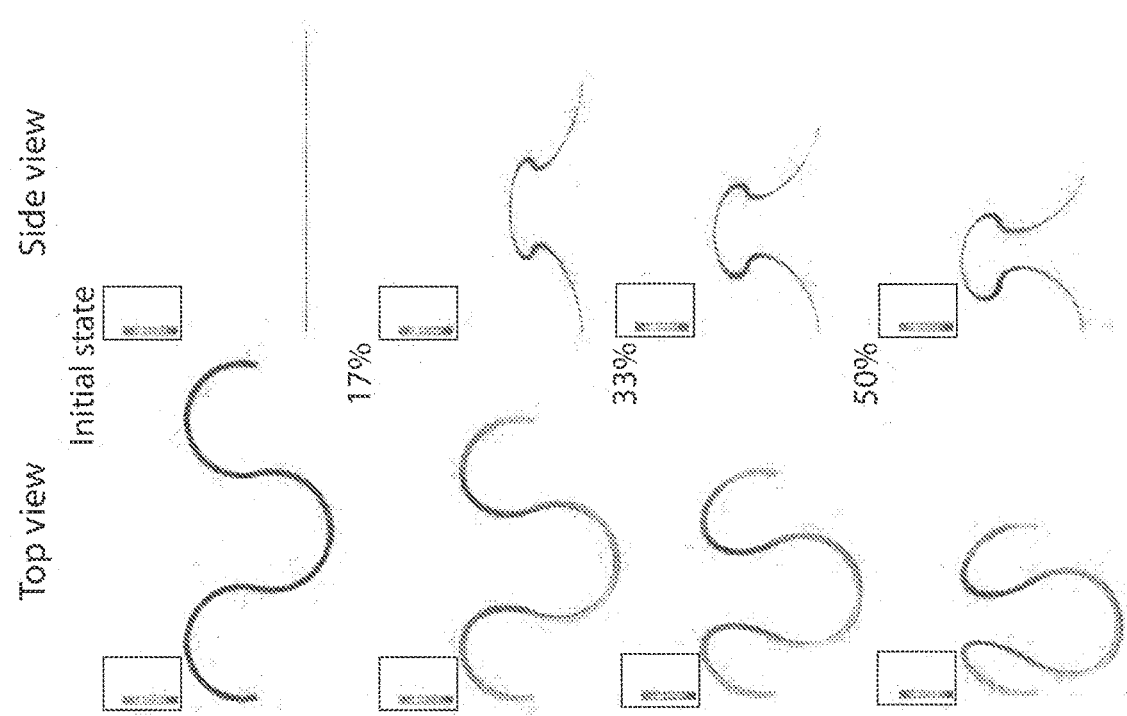
Figure 8:
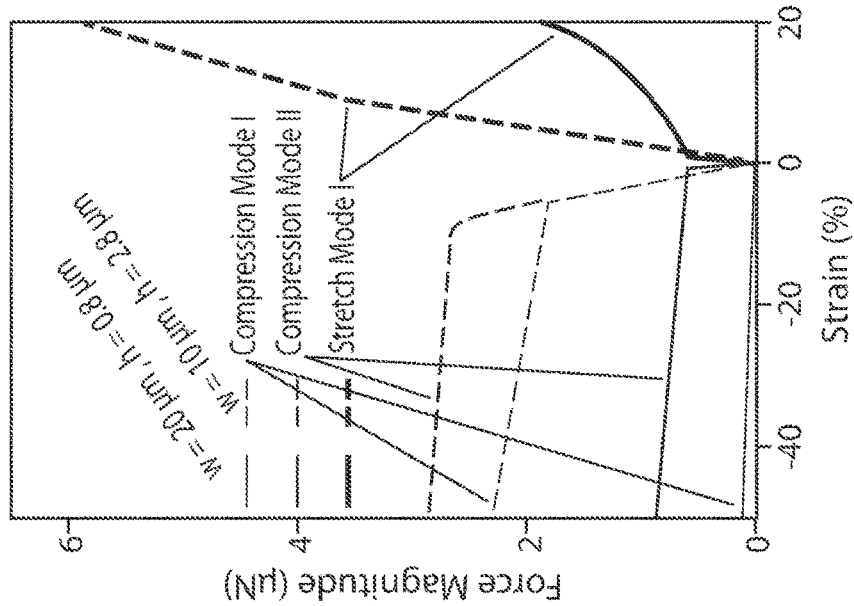
FIG. 8 illustrates reaction forces on an interconnect, in still another embodiment of the invention.
Figure 7C:
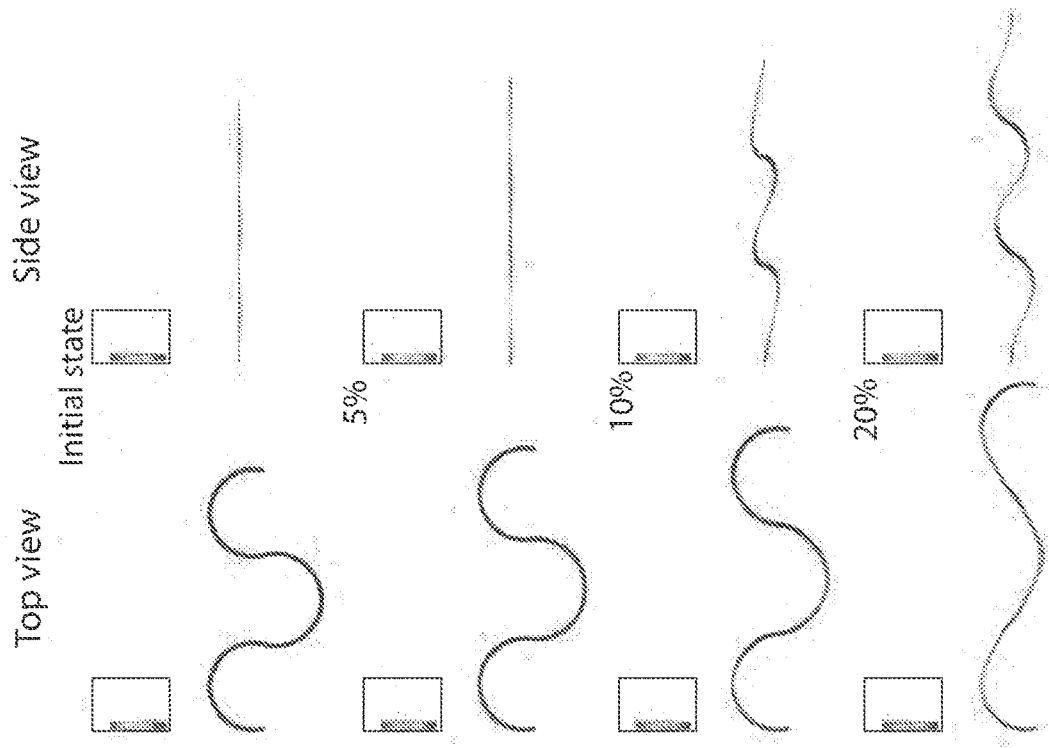

In FIGS. 7A-7C, FEA shows maximum principal nominal strain distribution during buckling for a ribbon. FIG. 7A shows compression, Mode I, for W/H=10 micrometer/2.8 micrometer, for an effective compressive strain from 0 to 50%. FIG. 7B shows compression, Mode II, for W/H=10 micrometer/2.8 micrometer, for an effective compressive strain from 0 to 50%. FIG. 7C shows stretching, Mode I, for W/H=10 micrometer/2.8 micrometer, for an effective tensile strain from 0 to 20%.

FIG. 8 is a simulated result showing the magnitude of the end-to-end reaction force on a unit ribbon as a function of the applied effective in-plane strain. The force magnitude is higher for the thicker device, as expected. The bend in each curve corresponds to the onset of buckling in the simulations.

Figure 3B:
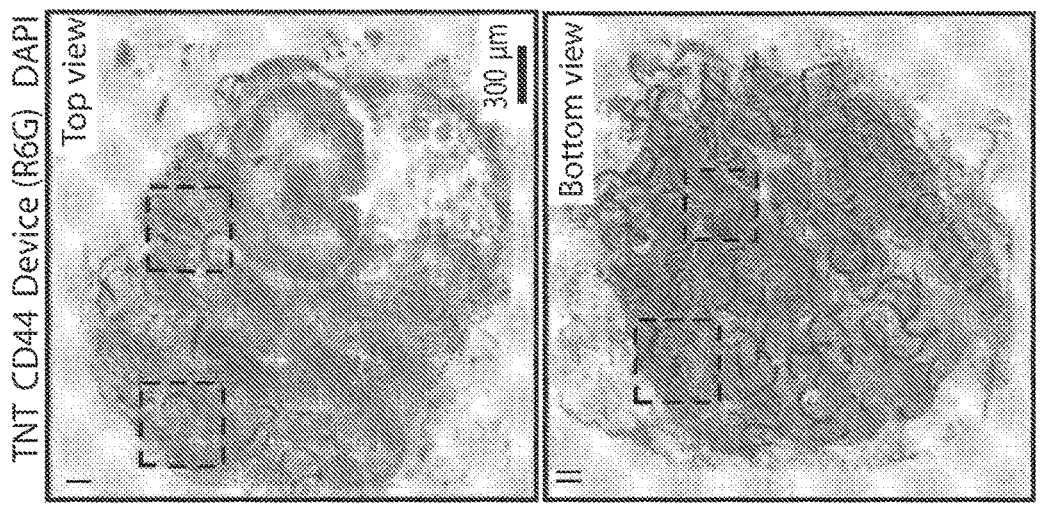
FIGS. 3A-3N illustrate human cardiac organoids containing cell scaffolds, in yet other embodiments of the invention.
Figure 3A:
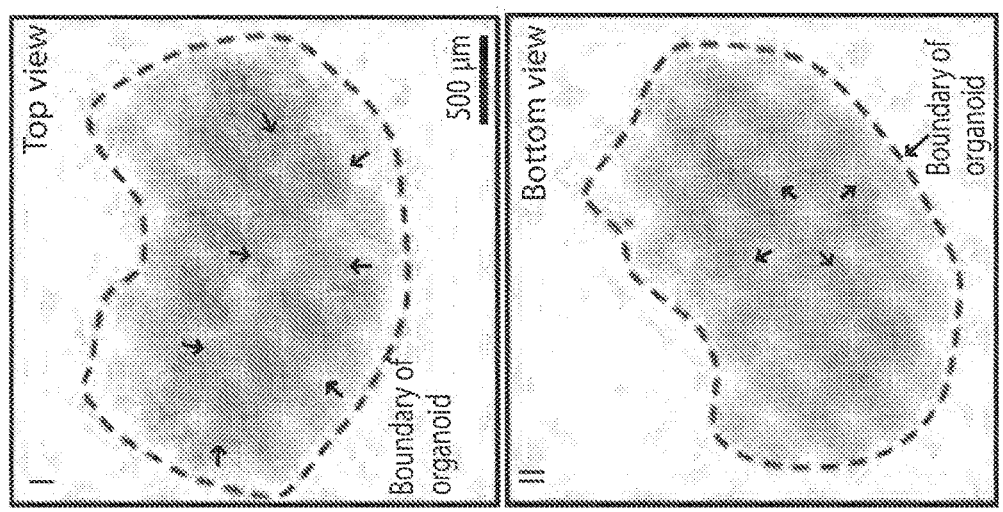
Figure 3C:
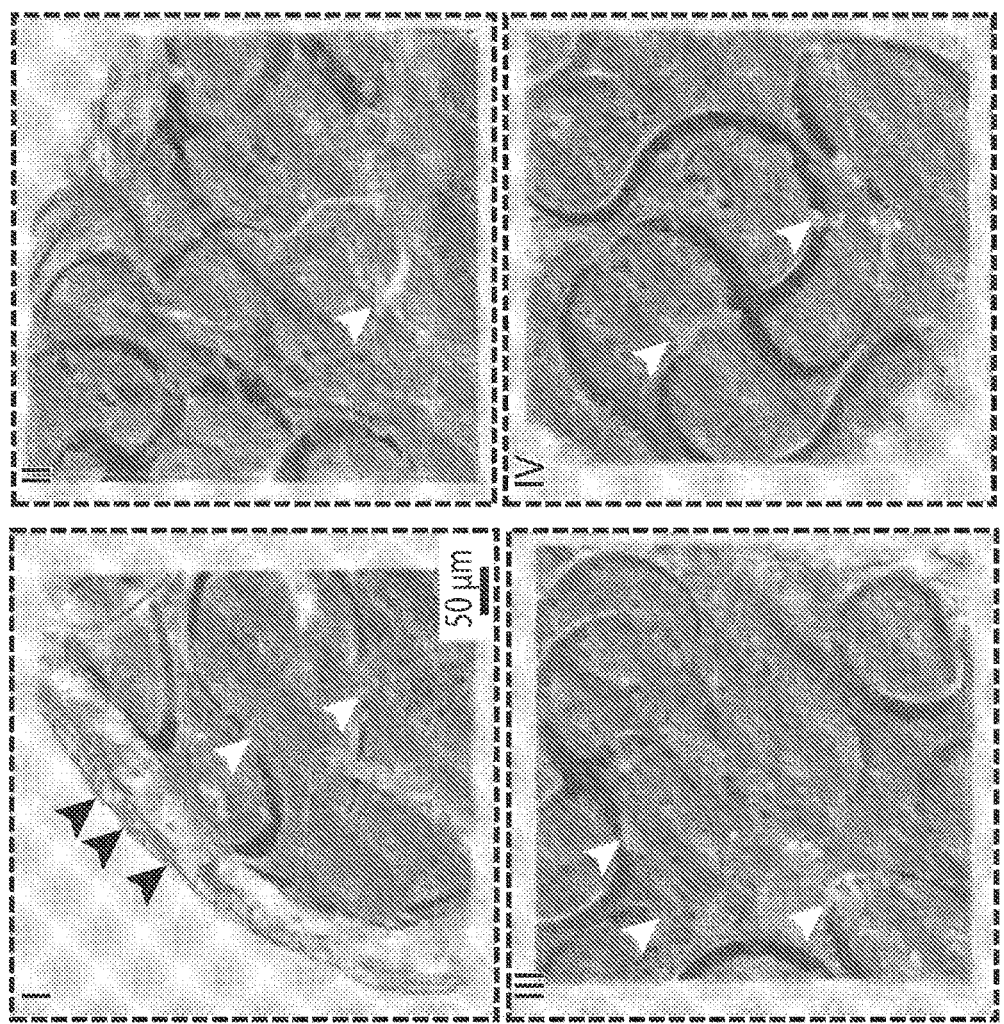

At day 40 of tissue development and differentiation, optical images show that the nanoelectronics have been completely implanted into organoids, covering the entire tissue area with unfolded mesh ribbons (FIG. 3A). Flexibility and stretchability of the completely embedded nanoelectronics allow them to adapt to the contraction of the cardiac organoids. To further reveal the embedding of nanoelectronics within the 3D organoid, cyborg cardiac organoids at day 40 of differentiation were cleared. 3D reconstructed fluorescence images showed the 3D interwoven nanoelectronics/cellular structures (FIG. 3B) across the entire organoids. Zoom-in views further revealed that the nanoelectronics were sandwiched between the outer layers of the organoid having migrated hMSCs (FIG. 3C, I) and the core of the organoid with matured cardiomyocytes. Importantly, as planar nanoelectronics developed together with the 2D cell-plate, images showed an intimate coupling between differentiated cardiomyocytes with nanoelectronics (FIG. 3C) throughout the entire organoid, which is rarely observed from other implantation methods for the post-matured living organoids and organs.

Figure 3D:
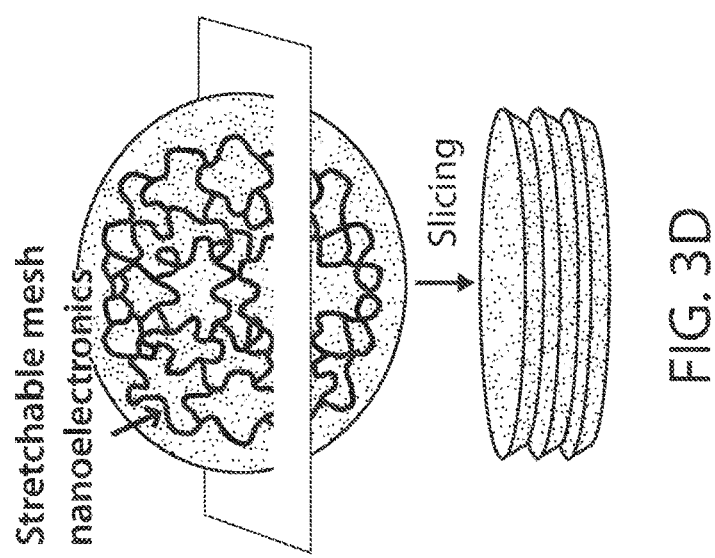
Figure 3G:
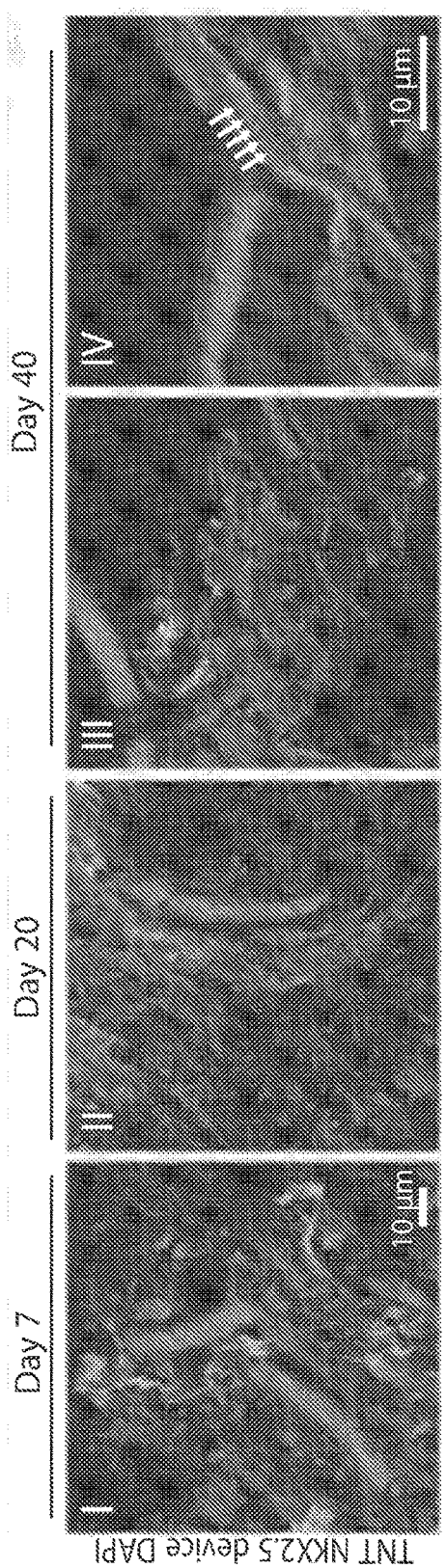
Figure 3H:
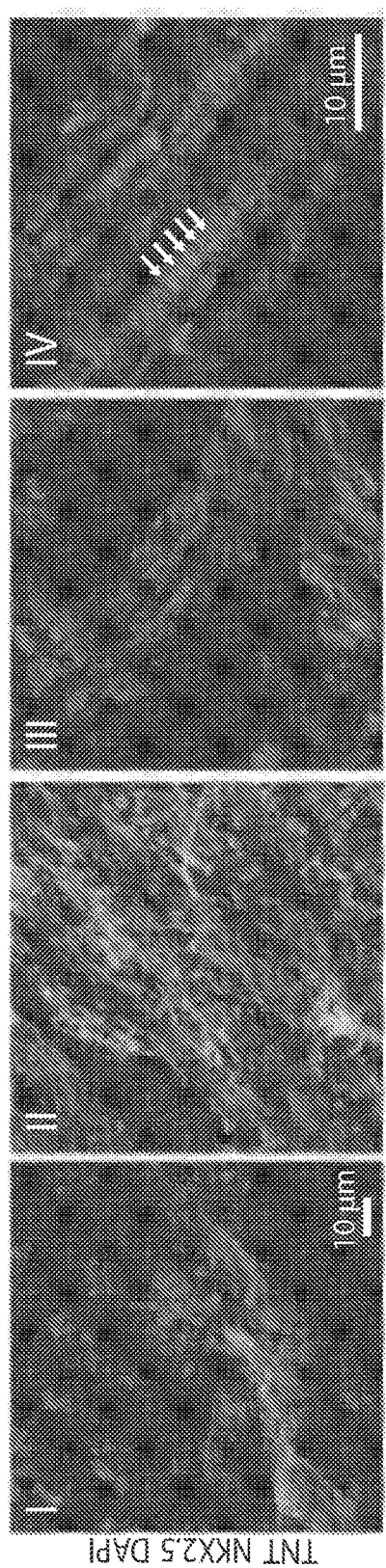
Figure 3I:
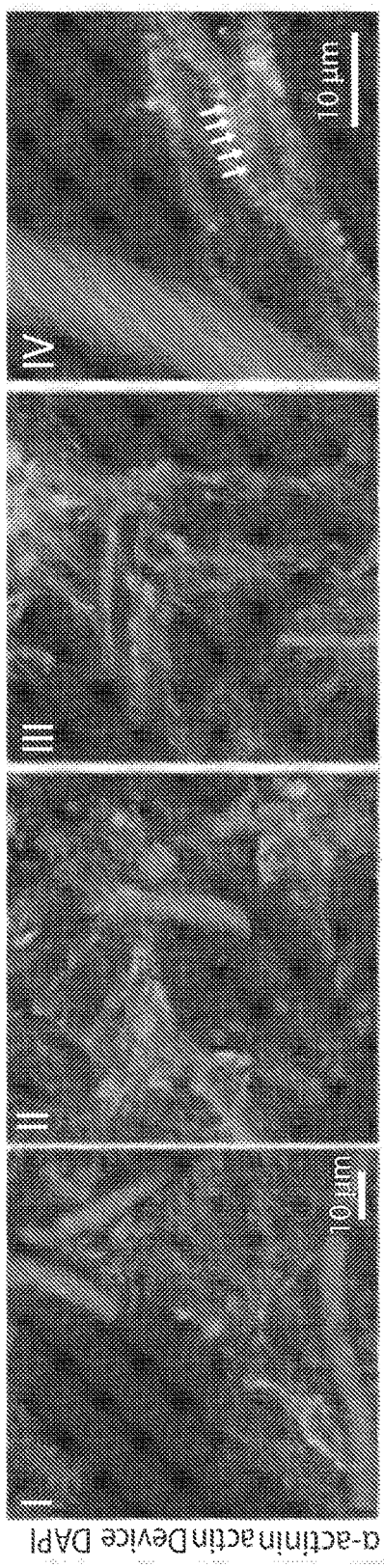
Figure 3J:
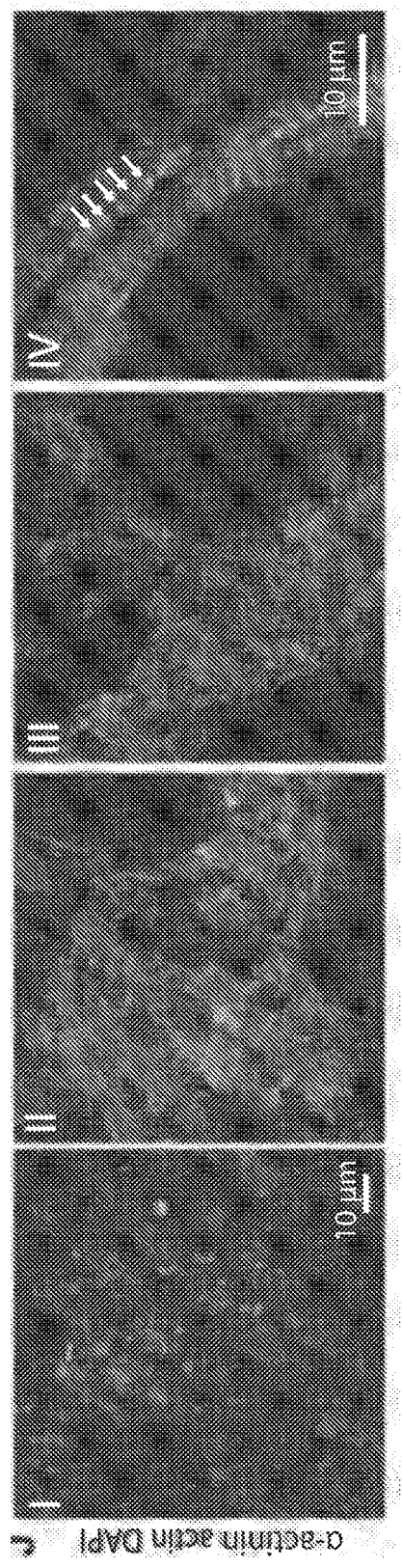
Figure 3L:
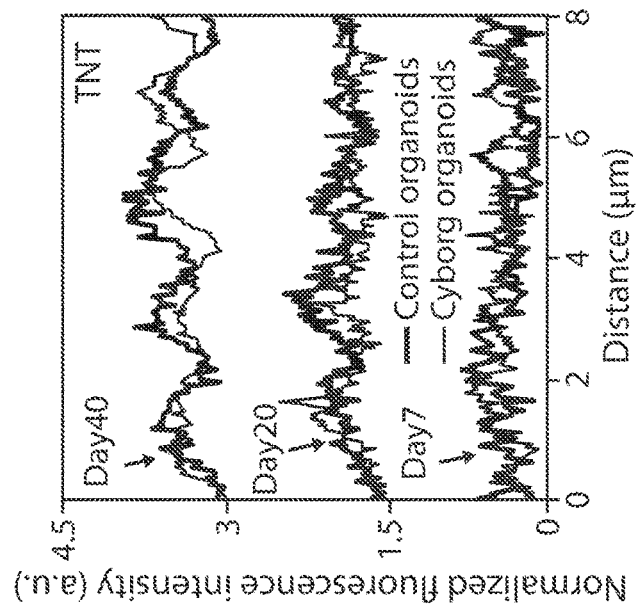
Figure 3K:
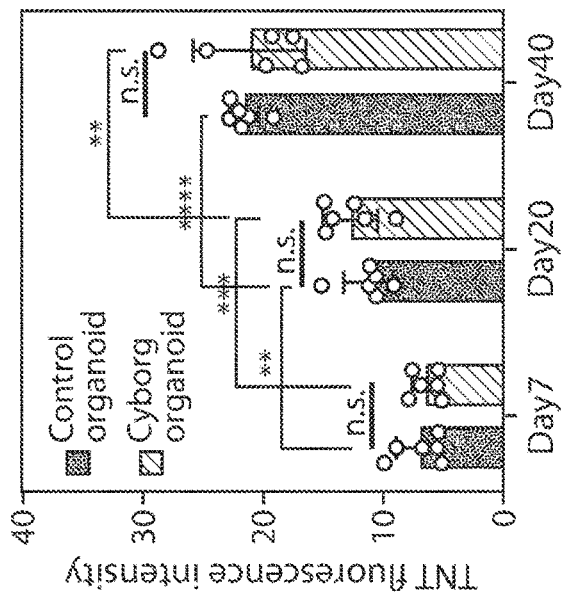
Figure 3N:
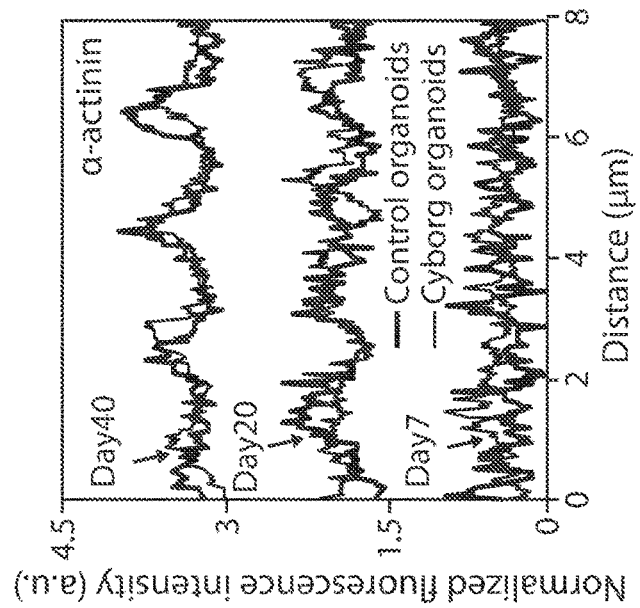
Figure 3M:
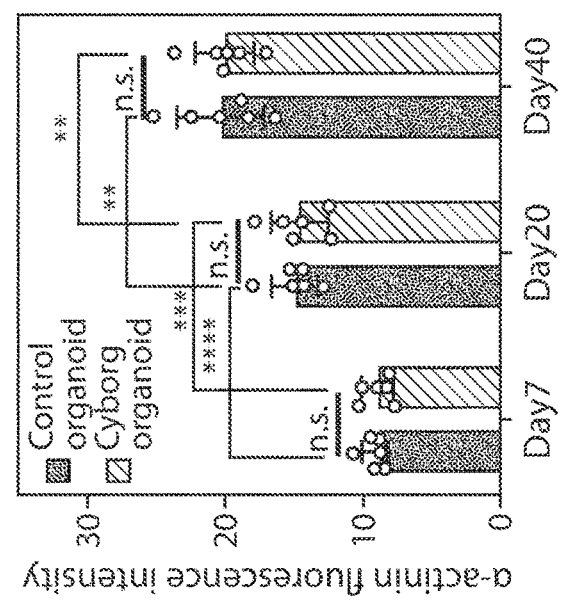

To investigate the effect of integrated nanoelectronics on the differentiation of organoids, hiPSC-CPCs/hMSCs cardiac cyborg organoids at different stages (day 7, 20 and 40 of differentiation) were fixed, sectioned, and immunostained for stage-specific marker expressions (FIG. 3D-3F), which are compared with those from control cardiac organoids. Protein markers including TNT, alpha-actinin and actin were imaged to quantify the maturation of cardiomyocytes while NKX2.5 was imaged for hiPSC-CPCs (FIG. 3G-3J). Averaged fluorescence intensity over culture time showed significantly increased fluorescence intensity of TNT and alpha-actinin (FIGS. 3K and 3M), while no statistically significant difference among cyborg and control organoids at all stages could be found. In addition, the fluorescence intensity plot along the axis of individual cells within the organoids showed the same level of increased sarcomere alignments in cyborg and control organoids from day 7 to day 40 of differentiation (FIG. 3L and 3N). These results substantially demonstrate that integrated nanoelectronics did not interrupt the 3D differentiation of iPSC-derived cardiac organoids.

FIG. 3 shows the development of human cardiac cyborg organoids in this example. FIG. 3A has top (I) and bottom (II) views of the cardiac cyborg organoid at day 40 of differentiation. Arrows highlight folding and stretching of stretchable mesh device by 3D re-organization of the cell-plate. FIG. 3B has top (I) and bottom (II) views of the 3D reconstructed fluorescence imaging of a cleared, immunostained cardiac cyborg organoid at day 40 of differentiation. Different shadings correspond to TNT, CD44, and DAPI. SU-8 in device was labeled by R6G for imaging in this and the following panels. In FIG. 3C, zoom-in views from the dark dashed boxes highlighted region in FIG. 3B show that migrated hMSCs forming the outer layer of the organoid (I) and intimate coupling between iPSCs-derived cardiomyocytes with nanoelectronics (white arrows) were observed (I-IV). FIG. 3D shows schematics of slicing cardiac cyborg organoids for characterization at different stages of organogenesis. FIGS. 3E and 3F show the projection of 3D reconstructed confocal microscopic fluorescence images of the 30-micrometer-thick cyborg organoid (FIG. 3E) and control organoid (FIG. 3F). Shadings correspond to TNT, device, and DAPI, respectively, and are denoted at the top of the image panel in this and subsequent images. In FIGS. 3G-3N, immunostaining and fluorescence imaging characterize the maturation of cardiomyocyte in the organoid at day 7 (I), 20 (II) and 40 (III-IV) of differentiation. TNT and NKX2.5 (FIGS. 3G-3H), and alpha-actinin and actin (FIGS. 3I-3J) were used to characterize the level of maturation of organoids with and without nanoelectronics embedding. Zoom-in views (IV) further showed subcellular localization of TNT and alpha-actinin at day 40 of differentiation. Averaged fluorescence intensity of TNT (FIG. 3K) and alpha-actinin (FIG. 3M) over culture time. (Value=mean+/−s.e.m., n=6. , $P<0.01$; *, $P<0.001$; ***, $P<0.0001$, two-tailed, unpaired t-test.) Fluorescence intensity plot showed the sarcomere alignment (FIG. 3L) and alpha-actinin alignment (FIG. 3N) in control and cyborg organoids at day 7, 20, and 40 of differentiation.

EXAMPLE 3

Figure 4A:
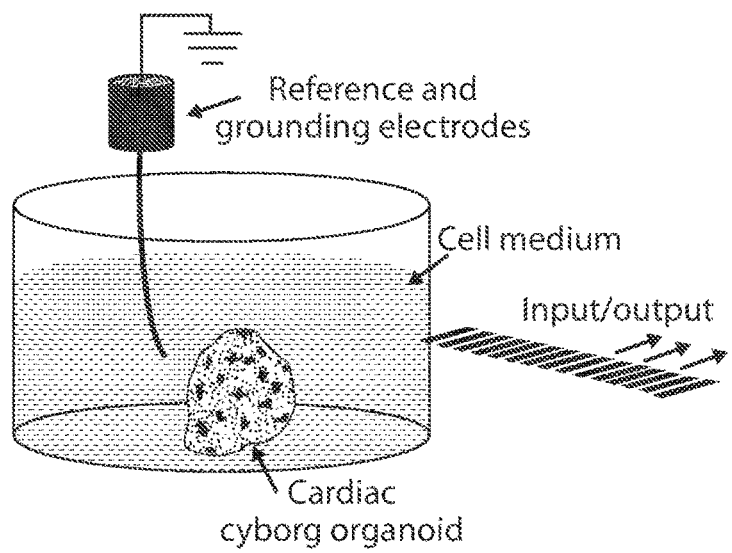
FIGS. 4A-4I illustrate electrophysiological mapping of an organoid, in another embodiment of the invention.
Figure 4B:
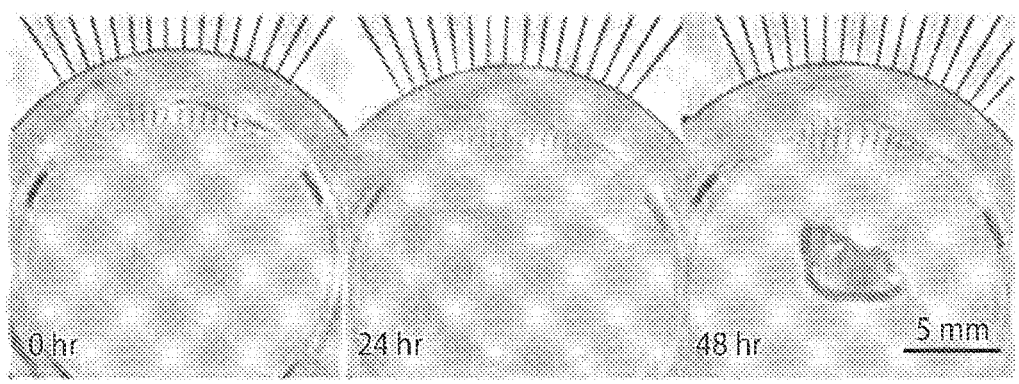
Figure 4C:
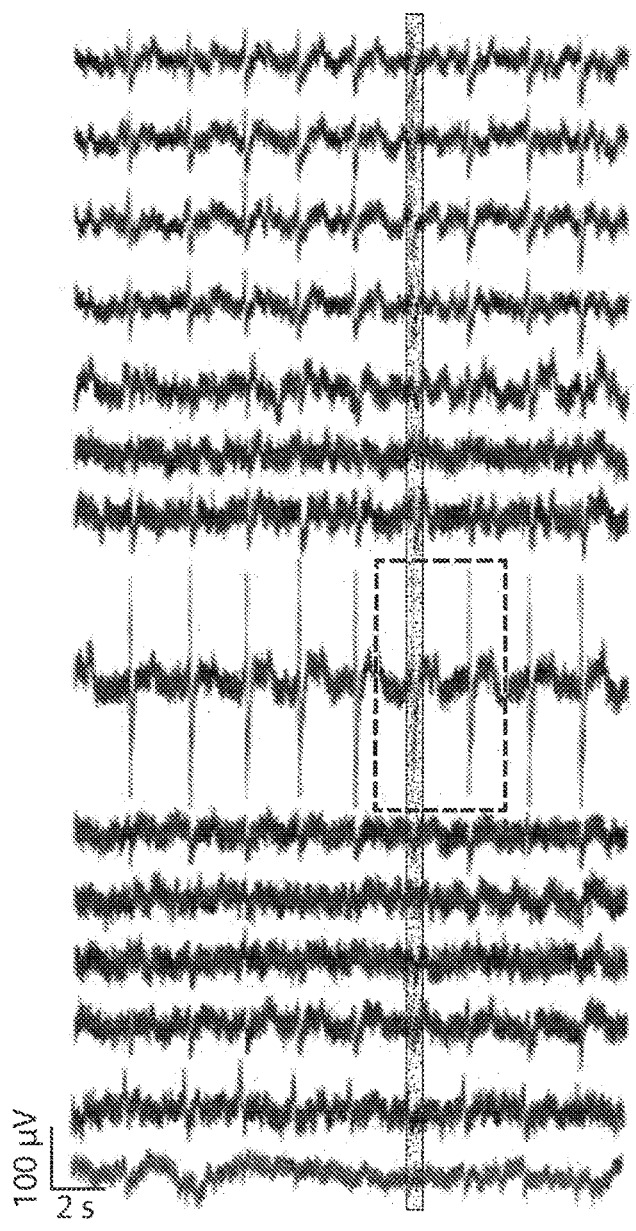
Figure 4D:
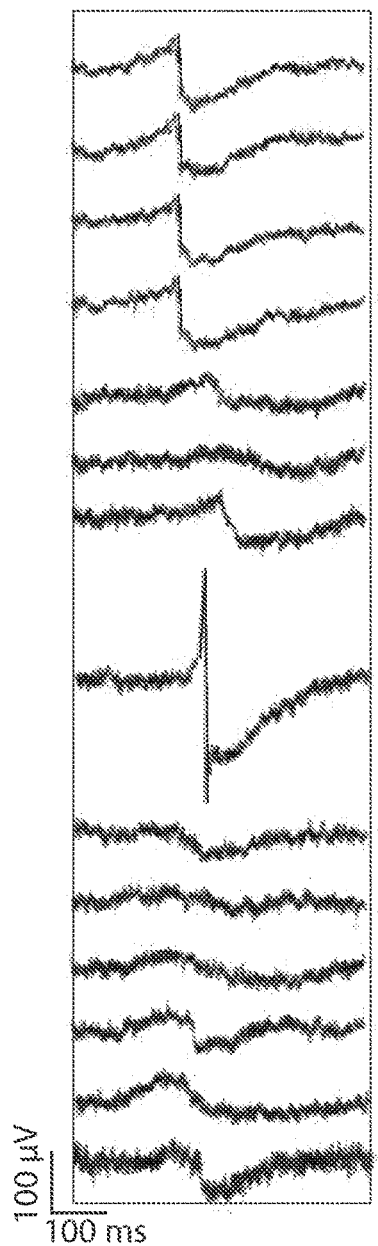
Figure 4E:
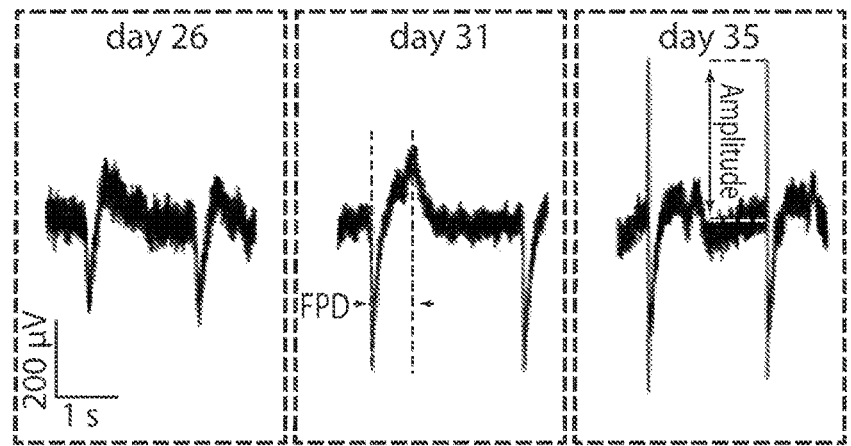
Figure 4F:
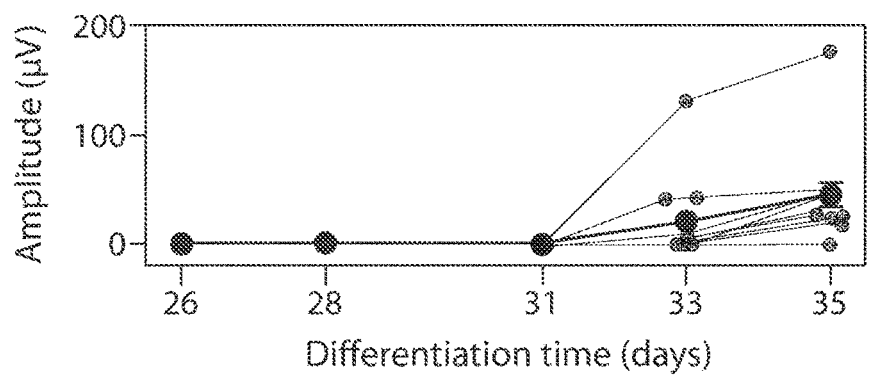
Figure 4G:
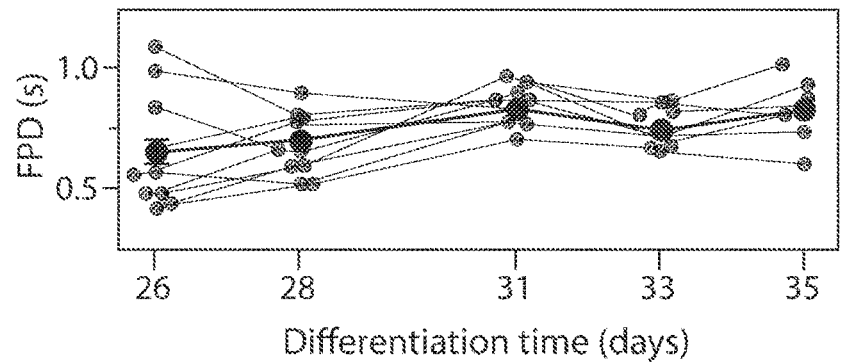
Figure 4H:
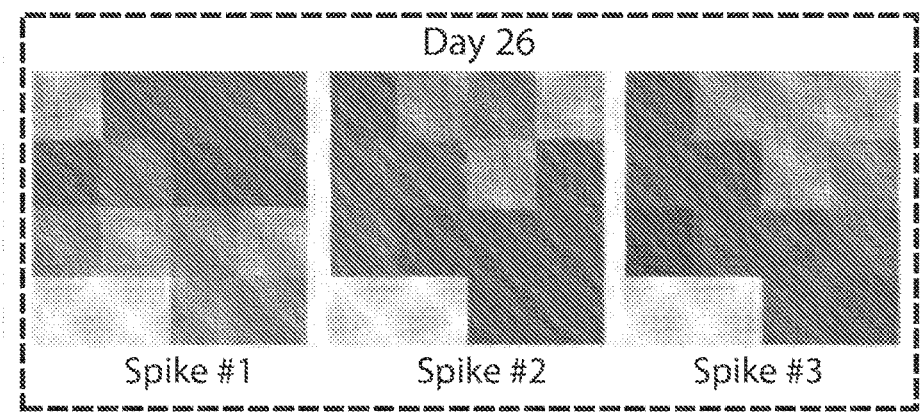
Figure 4I:
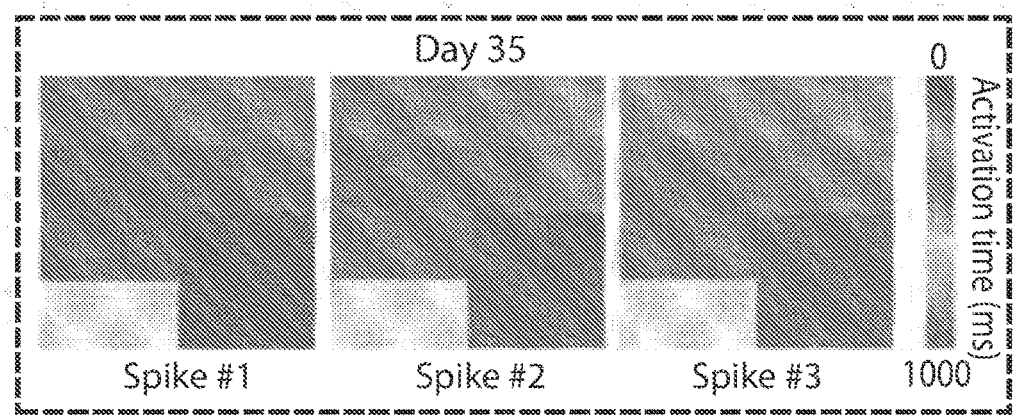

The strong coupling between stem/progenitor cells and nanoelectronics offers a unique opportunity to map the evolution of cellular electrophysiology during organogenesis. In this example, electrophysiological recordings were performed on cardiac cyborg organoids, which typically formed in ~48 hours (FIGS. 4A-4B). FIG. 4C shows the voltage trace of 14-channel (out of 16 channels) electrophysiological recording on cardiac cyborg organoid at day 35 of differentiation. The zoom-in plot of single spikes (FIG. 4D) showed non-uniform electrophysiological behaviors of the cells distributed across the organoid, as well as a time latency revealing tissue-wide propagation of local field potentials (LFP). Chronic tracing of LFP at millisecond temporal resolution during organogenesis (FIG. 4E) revealed changes in the spike dynamics from initially slow waveform through the emergence of repolarization to fast depolarization. The averaged amplitude of the fast component associated with depolarization remains undetectable until day 31 of differentiation, and then increased monotonically (FIG. 4F). The field potential duration (FPD) was found to remain relatively steady between 0.7 and 0.8 s (FIG. 4G) with a slight increase. The activation mapping confirmed the gradually synchronized LFP propagation across the cardiac organoid from day 26 to day 35 of differentiation (FIGS. 4H, 4I, and 9). These recording data suggested that the functional maturation of a cardiac organoid was marked by the synchronization of the bursting phase, instead of bursting frequency or FPD.

In summary, these examples show the creation of a human cardiac cyborg organoid via organogenetic 2D-to-3D tissue reconfiguration and studied the evolution of electrophysiological patterns during organogenesis. These can be scaled for integrating a larger number of sensors fabricated by photo- or electron beam-lithography. Cardiac cyborg organoids can be used to study cardiac development, diseases, and therapeutics. Further development and generalization of cyborg organoids could serve as a paradigm-shifting platform for spatially resolved, high-fidelity and chronic electrophysiological recordings for many other types of organoids and animal embryos as well as for monitoring and controlling of organoid-enabled cellular therapeutics.

FIG. 4 shows chronic, multiplex, tissue-wide electrophysiological mapping of cardiac organoid during organogenesis. FIG. 4A is a schematic that shows the set-up that connects cyborg cardiac organoids to external recording equipment for multiplexing electrophysiology during organoid development. In FIG. 4B, optical images show representative processes (0, 24, and 48 hours) of 3D organization of cardiac cyborg organoids in culture chamber connected for electrophysiological recording. In FIG. 4C, 14-channel voltage traces recorded from the cardiac cyborg organoid at day 35 of differentiation. In FIG. 4D, zoom-in views of the box highlights in FIG. 4C show single-spiked field potential recording. FIG. 4E shows zoom-in views of the dashed box highlighted channel in FIG. 4C on three different culturing days (day 26, 31, and 35 of differentiation). FIGS. 4F-4I show amplitude of fast peak (FIG. 4F) and field potential duration (FIG. 4G) defined in FIG. 4E as a function of differentiation time. Gray lines show individual channels. Black line shows the averaged results from 14 channels. (Value=mean+/−s.e.m., n=14.) In FIGS. 4H and 4I, isochronal mappings at day 26 (FIG. 4H) and day 35 (FIG. 4I) of differentiation show delays of activation time (max.−dV/dt) for three consecutive spiking events labeled in FIGS. 9A-9B.

Figures 9A, 9B:
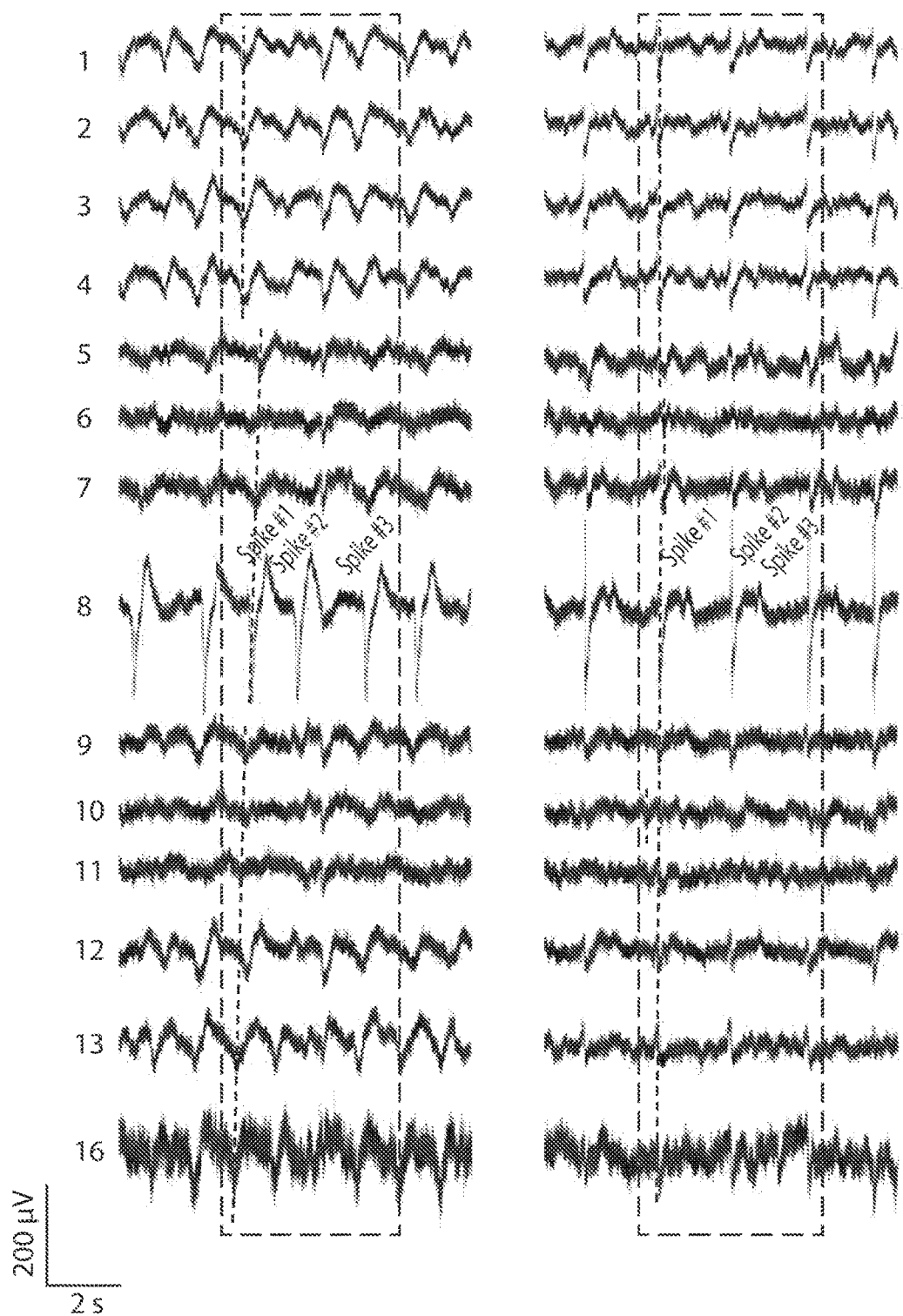
FIGS. 9A-9B illustrate electrophysiology data for cardiac organoids containing cell scaffold, in yet another embodiment of the invention.

FIG. 9 shows electrophysiology data for 14 channels during day 26 (FIG. 9A) and 35 (FIG. 9B) of culture shows transition from irregular activity patterns to synchronous beating. This dataset was used to build the activation maps in FIG. 4H, for three consecutive spiking events inside the dashed red rectangles. Dashed segments at day 26 represent the activation time for spike #1 for each channel.

EXAMPLE 4

Following are various materials and method used in the above examples. Fabrications of soft, stretchable mesh nanoelectronics. Important steps in the fabrication of the ultra-thin, stretchable mesh nanoelectronics, illustrated in FIG. 5, included:
  (1) Cleaning a silicon wafer grown with thermal oxide (500-nm thickness) with acetone, isopropyl alcohol, and water.
  (2) Depositing 100-nm-thick nickel (Ni) using electron-beam evaporator as a sacrificial layer.
  (3) Spin-coating SU-8 precursor (SU-8 2000.5, MicroChem) at 4000 rpm, which was pre-baked at (65° C., 95° C.) for 2 min each, exposed to 365 nm ultra-violet (UV) for 200 mJ/cm$^2$, post-baked at (65° C., 95° C.) for 2 min each, developed using SU-8 developer (MicroChem) for 60 s, and hard-baked at 180° C. for 40 min to define mesh SU-8 patterns (400-nm thickness) for bottom encapsulation. For fluorescence imaging, 0.004 wt % of Rhodamin 6G powder (Sigma-Aldrich) was added into SU-8 precursor. Note that other materials may be used besides SU-8, including those described herein, and those in Int. Pat. Apl. Pub. No. WO 2019/084498, incorporated herein by reference in its entirety.
  (4) Spin-coating LOR3A photoresist (MicroChem) at 4000 rpm, followed by pre-baking at 180° C. for 5 min; spin-coating S1805 photoresist (MicroChem) at 4000 rpm, followed by pre-backing at 115° C. for 1 min; the sample was then exposed to 405 nm UV for 40 mJ/cm$^2$, and developed using CD-26 developer (Micropost) for 70 s to define interconnects patterns.
  (5) Depositing 5/40/5-nm-thick chromium/gold/chromium (Cr/Au/Cr) by electron-beam evaporator, followed by a standard lift-off procedure in remover PG (MicroChem) overnight to define the Au interconnects.
  (6) Repeating Step (4) to define electrode array patterns in LOR3A/S1805 bilayer photoresists;
  (7) Depositing 5/50-nm-thick chromium/platinum (Cr/Pt) by electron-beam evaporator, followed by a standard lift-off procedure in remover PG (MicroChem) for 10 min to define the electrode array;
  (8) Repeating Step (3) for top SU-8 encapsulation (400-nm thickness).
  (9) Electrochemically polymerizing poly(3,4-ethylenedioxythiophene) (PEDOT) on the Pt electrode array using a precursor consisting of 14 mM 3,4-ethylenedioxythiophene (EDOT, Sigma-Aldrich) in 1x phosphate-buffered saline (PBS) solution. The precursor was drop-casted onto the device, followed by passage of a 1 V DC voltage (Dr. Meter DC power supply PS-305DM) for 200 s using device electrodes as the anode and an external Pt wire as the cathode. The device was then rinsed with DI water for 30 s and dried.
  (10) Soldering a 16-channel flexible flat cable (Molex) onto the input/output pads using a flip-chip bonder (Finetech Fineplacer).
  (11) Gluing a chamber onto the substrate wafer to completely enclose the mesh part of the device using a bio-compatible adhesive (Kwik-Sil, WPI).
  (12) Treating surface of the device with light oxygen plasma (Anatech 106 oxygen plasma barrel asher), followed by adding 3 mL of Ni etchant (type TFB, Transene) into the chamber for 2 to 4 hours to completely release the mesh electronics from the substrate wafer. The device was then ready for subsequent sterilization steps before cell culture.

Organoid culture. Materials for cell culture. Human induced pluripotent stem cells hiPSCs-(IMR90)-1 were purchased from WiCell Research Institute (Madison, Wis., USA). Authentication and test for the free of mycoplasma were performed by WiCell Research Institute. A cell bank was established after the cells were received. For experiments, each aliquot from the cell bank was used for less than 5 additional passages. Human mesenchymal stem cells (hMSCs; PT-2501) were obtained from Lonza (Walkersville, Md., USA) and used for less than 5 additional passages. Reagents and their supplies: Essential 8™ (E8) medium (cat. no. A1517001, Life Technologies); MSCGM BulletKit (cat. no. PT-3238 & PT-4105, Lonza); RPMI 1640 Medium (cat. no. 11875093, life technologies); B-27 Supplement (cat. no. 17504044, life technologies); B-27™ Supplement, minus insulin (cat. no. A1895601, Life Technologies); CHIR 99021, (cat. no. 44-231-0, Tocris Bioscienc™); IWR-1 (cat. no. CAYM-13659-5, Cayman Chemical); Normal donkey serum (cat. no. 017-000-121, Jackson ImmunoResearch); Accutase (cat. no. A1110501, Life Technologies); Trypsin-EDTA 0.05% (cat. no. 25-300-054, Invitrogen); EDTA 0.5M pH 8.0 (cat. no. AM9260G, Invitrogen); Y-27632 (cat. no. 129830-38-2, Sigma); Matrigel (cat. no. 08-774-552, Corning); DAPI (cat. no. D9542, Sigma). Phalloidin-iFluor 647 (cat. no. ab176759, Abcam); poly-D-lysine hydrobromide (cat. no. P7280-5MG, Sigma); photoinitiator 2,20-azobis[2-(2-imidazolin-2-yl) propane] dihydrochloride (cat. no. VA-044, Wako Chemicals). Antibodies used in these examples: Nanog (Santa Cruz, 1:100); CD44 (Abcam, 1:100); Cardiac troponin T (TNT) (Invitrogen, 1:100); a-actinin (Sigma, 1:100); NKX2.5 (Abcam, 1:100); Alexa 594 donkey anti-mouse (Jackson ImmunoResearch, 1:500); Alexa 647 Donkey anti-rabbit (Invitrogen, 1:500).

Two dimensional (2D) cells culture. hiPSCs-(IMR90)-1 were maintained in 6-well plate coated with Matrigel in Essential 8™ medium. Steps were as follows:
(1) 6-well plate was coated with Matrigel at 37° C. at least one hour.
(2) Matrigel from the well was aspirated and replaced with 2 mL E8 medium.
(3) hiPSCs were incubated with 0.5 mM EDTA at room temperature for 5 minutes.
(4) EDTA solution was aspirated and replaced with 1 mL E8 medium. Cells were pipetted into clusters.
(5) 100-200 microliters cells were seeded in the Matrigel coated 6 well-plate.
(6) Medium was changed daily. Cells were passaged every 4 days.

hMSCs were cultured in T-75 flasks in MSCGM medium. Steps were as follows:
(1) 5000-6000 cells per $cm^2$ were seeded in T-75 flask with about 30 ml MSCGM medium.
(2) Medium was changed every 3-4 days.
(3) When hMSCs reached ~90% confluence, cells were dissociated with Trypsin-EDTA 0.05%. The cells were used by passage 5.

2D hiPSC-derived cardiomyocytes differentiation. Cardiomyocytes differentiation steps were as follows:
(1) hiPSCs were cultured in 6-well plate with E8 medium for 3-4 days.
(2) E8 medium was removed. RPMI 1640 medium plus 1% B27-insulin and 12 micromolar CHIR99021 were added for differentiation. This day was defined as Day 0.
(3) On day 1, the medium was changed to RPMI 1640 medium plus 1% B27-insulin.
(4) On day 3, the medium was changed to RPMI 1640 medium plus 1% B27-insulin and 5 micromolar IWR1.
(5) On day 5, the medium was changed to RPMI 1640 medium plus 1% B27-insulin.
(6) On day 7, the medium was changed to RPMI 1640 medium plus 1% B27.
(7) The medium was then replaced with fresh RPMI 1640 medium plus 1% B27 every other day. The cells started beating from day 8 or day 10.

3D culture of cyborg organoids. The integration of stretchable mesh nanoelectronics with cells to create cyborg organoids followed immediately from fabrications and release of the device in the chamber, which involved the following steps:
(1) The released device was sterilized by 1) DI water rinse for three times, and 2) 70% ethanol for at least 15 minutes.
(2) The device was washed with PBS three times followed by incubating with Poly-D-lysine hydrobromide (0.01% w/v) overnight.
(3) Poly-D-lysine hydrobromide solution was removed, and 300 microliters liquid Matrigel (10 mg/mL) was added to the chamber from the device-free side on ice. The device was incubated for at least 30 minutes at 37° C. to solidify the Matrigel layer.
(4) hiPSCs or hiPSC-derived cardiac progenitor cells (hiPSC-CPCs) ($2-3 \times 10^6$ cells) and hMSCs ($2-4 \times 10^5$ cells) were suspended in a mixture of E8 or RPMI 1640 (supplemented with 1% B27-insulin or 1% B27) and MSCGM medium, and then transferred onto the cured Matrigel in the chamber and cultured at 37° C., 5% $CO_2$.
(5) For electrophysiological measurement, hiPSC-CPCs at day 24 and hMSCs mixture were transferred onto the Matrigel and cultured at 37° C., 5% $CO_2$. hiPSCs-derived cyborg cardiac organoid was formed within 48-72 hours. Electrical activity from the organoid was recorded from 48 hours of its formation, which corresponded to day 26 of cardiac differentiation in FIG. 4. Characterization was performed as follows.

Organoids clearing, section, immunostaining and imaging. For whole organoids imaging, procedures were adapted from tissue clearing techniques CLARITY and passive clarity technique (PACT). The organoids were fixed with 4% PFA at 4° C. overnight and incubated with hydrogel solution (0.25% (w/v) VA-044 and 4% (w/v) acrylamide in PBS) at 4° C. for 24 hours. The samples were placed in X-CLARITY hydrogel polymerization device for 3-4 hours at 37° C. with -90 kPa vacuum, followed by wash in PBS overnight before electrophoretic lipid extraction for 24 hours in the X-CLARITY electrophoretic tissue clearing (ETC) chamber. Then immunostaining was performed by staining the primary antibodies for 3-5 days and the secondary antibodies for 2-4 days, respectively. The samples were submerged in optical clearing solution overnight and embedded in 2% agarose gel before imaging using Zeiss 2-photon time-lapse confocal microscopy at Harvard Center for Biological Imaging (HCBI). For characterization of cyborg cardiac organoids, the organoids at different stages were fixed with 4% PFA at 4° C. overnight and immersed in 30% sucrose for at least 12 hours. Then the samples were embedded in optimal cutting temperature (OCT) compound and cryostat section of 30 micrometer-thick slices. Cardiac organoids without device integrating were used as control. For staining, the first antibodies were incubated at 4° C. overnight and the secondary antibodies were stained at RT for 3-4 hours. For 2D culture, cells were fixed with 4% paraformaldehyde (PFA) at room temperature (RT) for 15 minutes. Cells were incubated with primary antibodies at 4° C. overnight and the secondary antibodies were stained at RT for 1-2 hours. Finally, 4',6-diamidino-2-phenylindole (DAPI) were stained for 10 minutes. Cells were washed with PBS three times before imaging. All samples were imaged by Zeiss 880 confocal microscopy at HCBI. Imaging was analysis by Zen (Blue edition) and Fiji. Fluorescence intensity was calculated by Fiji. Data analysis and statistical tests were performed by Graphpad Prism.

Device impedance characterization. A three-electrodes setup was used to measure the electrochemical impedance spectrum of the electrodes from each device. Platinum wire (300 micrometers in diameter, 1.5 cm in length immersed) and a standard silver/silver chloride electrode were used as counter electrode and reference electrode, respectively. The device was immersed in 1×PBS solution during measurement. The SP-150 potentiostat (Bio-logic) along with its commercial software EC-lab was used to perform the measurements. For each measurement, at least three frequency sweeps were measured from 1 MHz down to 1Hz to obtain statistical results. A sinusoidal voltage of 100 mV peak-to-peak was applied. For each data point, the response to 10 consecutive sinusoids (spaced out by 10% of the period duration) was accumulated and averaged.

Electrophysiological measurement and data analysis. The Blackrock CerePlex Direct voltage amplifier along with a 32 channels Blackrock µ (mu) digital headstage connected to the device was used to record electrical activity from organoids. The headstage-to-device connector (16 channels only) was homemade. The organoid culture media was grounded to earth and a reference electrode was also inserted in the media, far from the device (distance above 1 cm). Platinum wires were used as ground and reference electrodes. A sampling rate of 2000 samples per second was used. A 0.3 to 1000 Hz band-pass filter (Butterworth, 4th order) was applied to reduce high frequency noise. Matlab codes provided by Blackrock were used to convert raw data files into accessible format. Data were then transferred to Graphpad Prism for post-processing.

Numerical mechanical simulations. Abaqus 6.12 was used to perform mechanical analysis of the structure. The goal of the simulations was to evaluate strain and stress concentration, as well as the effective stiffness of a unit ribbon while buckling. FIG. 2E shows that the mesh undergoes a maximum compression of about 50% of its initial dimensions during the organoid development, as well as a maximum stretch up to 20%. Buckling of the ribbon structure is also observed experimentally.

The buckling modes in compression of the unit ribbon were analyzed using the "linear perturbation, Buckle" module of Abaqus for the two geometries of device (width/thickness=10/2.8 or 20/0.8 micrometer). The first five modes of buckling are shown in FIGS. 6A and 6B. One end of the ribbon is subjected to an encastre boundary condition while the second end is subjected to an in-plane displacement (rotation is constrained). As Mode I and Mode II in compression are the most widely observed in the optical images recorded, these modes were only simulated in large deformation. Similarly, the Mode I was simulated during stretching of the device. To do so, a "static, general" step was run to apply an end-to-end compression of 50% or a stretch of 20%. Small concentrated forces are applied (magnitude $\sim 10^{-6}$-$10^{-7}$ micronewtons) to induce preferred buckling modes. To check convergence, the seeding size of the mesh (hexagonal elements) was varied from 0.5 to 1 micrometer.

As expected, the strain is higher in the thicker device (10-micrometer width, 2.8-micrometer thickness). Still, the maximum principal nominal strain is below 1.2% in both the SU-8 and gold layers for the compression mode I (FIGS. 2F and 7A) and mode II (FIGS. 2F and 7B) and the stretching mode I (FIGS. 2G and 7C) that is well below the fracture limit of both materials. This result confirms that the device in this example could resist both compression and stretch during organogenesis.

FIGS. 6A-6B show linear perturbation analysis shows buckling modes of a unit ribbon in compression. Deformation in the Z direction is magnified 50 times for convenience. In FIG. 6A, W/H=10 micrometer/2.8 micrometer, and in FIG. 6B, W/H=20 micrometer/0.8 micrometer.

FIGS. 7A-7C illustrate FEA showing the maximum principal nominal strain distribution during buckling for a ribbon (W/H=10 micrometer/2.8 micrometer). FIG. 7A shows compression, Mode I, for an effective compressive strain from 0 to 50%. FIG. 7B shows compression, Mode II, for an effective compressive strain from 0 to 50%. FIG. 7C shows stretching, Mode I, for an effective tensile strain from 0 to 20%.

FIG. 8 shows a simulated result shows magnitude of the end-to-end reaction force on a unit ribbon as a function of the applied effective in-plane strain. The force magnitude is higher for the thicker device as expected. The bend in each curve corresponds to the onset of buckling in the simulations.

FIGS. 9A-9B show electrophysiology data for 14 channels during day 26 (FIG. 9A) and 35 (FIG. 9B) of culture, showing a transition from irregular activity patterns to synchronous beating. This dataset was used to build the activation maps in FIG. 4H, for three consecutive spiking events inside the dashed rectangles. Dashed segments at day 26 represent the activation time for spike no. 1 for each channel.

EXAMPLE 5

This example illustrates the implantation and distribution of soft nanoelectronics through embryogenesis for brain-wide electrophysiology mapping during animal development.

Real-time recording of brain-wide cellular activities with single-cell-single-spike spatiotemporal resolution in behaving animals is important to understand brain functions, in which local cellular activities should be studied in conjunction with the behaviors occurring throughout the entire brain and environment as a whole. To date, several technologies have been developed to enable in vivo brain-wide imaging. For example, functional magnetic resonance imaging (fMRI) can image the entire brain activity, yet it is limited by its low spatiotemporal resolution. Combining microscopic imaging with genetically-encoded reporters can enable tissue-wide, cell-specific imaging, but the tissue scattering and slow three-dimensional (3D) volumetric scanning limit the fast-optical access to cells from multiple and deep brain regions of non-transparent living species. Electrophysiological tools, especially implanted microelectrodes, can allow fast single-cell activity interrogation within the 3D tissue. The state-of-the-art multielectrode array driven by transistor-enabled multiplexing circuits can probe 100-1000 cells in the brain with a promise for a significant increase in the near future through the incorporation of advanced circuits. However, current technologies cannot distribute and integrate those individually addressable microscale electrodes, in a minimally invasive manner, to simultaneously address neurons across the entire, 3D living brain of behaving animals. Importantly, high-resolution imaging results illustrated that cells in a matured brain are innervated at nanometer-scale. Increasing the number of electrodes implanted into the brain of adult animals will substantially increase tissue damage. Thus, it is important to develop new bio-integration methods capable of implanting and distributing a large number of microelectrodes across the entire brain for brain-wide electrophysiology mapping with high spatiotemporal resolution.

In this example, micrometer-thin, tissue-level-soft, mesh-like electronics (termed "tissue-like electronics") that fully mimic the structure of tissue scaffolds can form chronically stable, seamless integration with neural networks for a single-cell, 3D electrophysiology mapping in both in vitro and in vivo states are used, which opens up opportunities for the following bio-integration methods.

From the perspective of developmental biology (FIG. 10A), the brain's 3D structure is differentiated from a single cell layer on the ectoderm layer (named neural plate) in embryo via cellular division, proliferation and neurulation (folding process). This unique 2D to 3D cellular structure transition during the brain development is leveraged by integrating a layer of fully stretchable mesh electronics on the neural plate of the animal embryo (FIG. 10B), allowing the expansion and folding process of organogenesis to fully distribute and seamlessly integrate the interconnected electrodes array across the entire mature brain in the adult animal.

In this example, electrode arrays containing 100 microelectrodes are densely packed and individually addressed by microfabricated interconnects into a mesh-like network. These interconnects contain hierarchical and highly stretchable (>1000% stretchability) microstructures with the feature size comparable to that of single cells. These tissue-like electronics can be 3D reorganized by developing brain tissues to allow non-invasive implantation of electrodes (FIG. 10C) across the entire 3D structure of the brain in the final adult animal to build a "cyborg animal" for multiplexing electrophysiology mapping. The initial testing of this technique has been successfully demonstrated in brain organoids cultured in vitro.

In one example, the frog (*Xenopus laevis*) embryo is used. Their developmental processes are exposed to the solution. Before the neural plate begins to fold, the input/output (I/O) region of the electronics is first fixed on the substrate to make sure it will not be folded into the interior of the embryo and then detached from the substrate to be mounted on the surface of the embryo. After the electronics grow into the embryo, the post-bonding methods are used to connect the I/O of electronics with the external measurement set-up for the neuron activity recording.

Brain tissues at different developmental stages are harvested, sliced, cleared and stained to test the impact from electronics to the brain development. The position of sensors is imaged by micro-CT as well as photocurrent imaging techniques showing their spatial correlation with cells. Single-cell RNA sequencing, immunostaining, pharmacology and classic electrophysiology are used to assess the cell differentiation, neuron connectivity and viability of neuron signals. The behavior of "cyborg animals" is used to evaluate the impact of implanted electronics on the functionality of the central nervous system after the development.

Brain-wide single-cell electrophysiology mapping. Using the multiple electrodes array implanted across the entire brain of the cyborg animal, multiplexing electrophysiology mapping across multiple brain regions with single-cell-single-spike spatiotemporal resolution is achieved. The evolution of action potentials from the multiple neurons distributed in different brain regions of behaving animals during their entire brain developmental and aging process can be traced and mapped.

These experiments provide new methods that implants microelectrodes across the entire brain in behaving animals for brain-wide neuron activity interrogations at single-cell-single-spike basis. This method, using multiplexing circuits, are scalable of implanting a large number of microelectrodes that is statistically significant to the number of neurons in the animal's brain. Although *Xenopus* is described here, this can be applied to other aquatic animals and rodents. This method is analogous to the method of the transgenic animal, where contrast to approaches such as viral injection techniques at confined regions of tissues for the gene expression, allows for a tissue-wide gene expression across the entire organ. This will provide unprecedented opportunities for high resolution access and control of brain-wide activities, which will have a great impact not only on neuroscience but also on extended/enhanced sensing and cognition.

FIG. 10 shows a schematic of the "cyborg animal" for a brain-wide electrophysiology mapping. FIG. 10A shows that brain in vertebrate animals is developed from folding and expansion of a 2D cell layer named the neural plate. FIG. 10B shows that stretchable mesh electronics may be integrated with the neural plate in embryo. The folding of the neural plate may deliver the functional electrodes array into the neural tube with interconnects, and I/O remaining on the outside epidermal tissue layer. FIG. 10C shows that the neural tube reorganizes into the final 3D brain structure with microelectrodes fully distributed and seamlessly integrated across the entire brain of the behaving animal for the electrophysiological interrogation.

FIG. 11 shows a demonstration of stretchable mesh electronics 3D folding through in vitro brain organoid development for tissue-wide bioelectrical interfaces. FIG. 11A shows schematic illustrations showing the stepwise incorporation of stretchable mesh electronics with the sensors/stimulators array integrated and distributed across the entire 3D living tissue during the organogenesis: I: lamination of a 2D stretchable mesh electronics onto the 2D stem cell plate. Proliferation of stem cells embeds the stretchable mesh electronics. II: Self-organized 2D to 3D transition of stem cell plate during its further organoid development simultaneously folds 2D stretchable mesh electronics into a 3D structure; III: Final organoids with differentiated different types of cells. Stretchable mesh electronics have been completely folded and merged into the organoid with sensors and stimulators fully distributed across the entire 3D organoids. FIG. 11B shows optical photographic images of different steps corresponding to schematics in FIG. 11A. FIG. 11C are bright-field microscopic images of the dashed box highlighted regions in FIGS. 11B and 11D, showing that the closely packed stretchable mesh electronics (I) was folded by organogenesis (II) and completely expand distributing sensors/stimulators across the entire 3D organoids (III). FIG. 11D shows bright-field microscopic image shows representative tissue-wide electronics innervated brain organoid.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
   a biological structure at least partially embedding a stretchable cell scaffold therein, the cell scaffold defining at least a portion of an electrical circuit,
   wherein the biological structure is an embryo or an organoid.

2. The article of claim 1, wherein the cell scaffold is stretchable by at least 10% in a linear direction.

3. The article of claim 1, wherein the cell scaffold is foldable by at least 90°.

4. The article of claim 1, wherein the stretchable cell scaffold has a first filling ratio of less than 40% in the absence of the biological structure.

5. The article of claim 4, wherein the cell scaffold has a second filling ratio of less than 10% when embedded within the biological structure.

6. The article of claim 1, wherein the cell scaffold contains at least 30 vol % of the biological structure.

7. The article of claim 1, wherein at least 30 vol % of the biological structure is no more than 10 micrometers from the cell scaffold embedded therein.

8. The article of claim 1, wherein the biological structure completely embeds the cell scaffold.

9. The article of claim 1, wherein at least a portion of the electrical circuit of the cell scaffold is electrically connected to an electrical device external of the biological structure.

10. The article of claim 1, wherein the cell scaffold comprises a mesh comprising a plurality of nodes, at least some of which nodes are connected by interconnects to form the mesh.

11. The article of claim 10, wherein the mesh is a rectangular mesh or an irregular mesh.

12. The article of claim 10, wherein at least some of the interconnects are serpentine and/or stretchable.

13. The article of claim 12, wherein the interconnects comprise electronically conductive pathways.

14. The article of claim 10, wherein at least some of the interconnects comprise at least one inflection point.

15. The article of claim 10, wherein at least some of the interconnects have a maximum cross-sectional dimension of less than 50 micrometers.

16. The article of claim 1, wherein the cell scaffold comprises a photoresist.

17. The article of claim 16, wherein the photoresist comprises SU-8, a polymer formed by photo-curing a fluorinated monomer including cross-linkable function groups using a photoinitiator, and/or a hydrogel.

18. The article of claim 16, wherein the photoresist comprises perfluoropolyether dimethacrylate (PFPE-DMA).

19. The article of claim 1, wherein the cell scaffold comprises metal pathways.

20. The article of claim 19, wherein a least some of the metal pathways comprise gold or chromium.

21. The article of claim 19, wherein a least some of the metal pathways are flexible.

22. The article of claim 1, wherein the cell scaffold comprises a onductive polymer.

23. The article of claim 1, wherein the cell scaffold comprises a nanoscale wire.

24. The article of claim 23, wherein the nanoscale wire is responsive to an electrical property external to the nanoscale wire.

25. An article, comprising:
a cell scaffold defining at least a portion of an electrical circuit, wherein the cell scaffold is stretchable by at least 20% in a linear direction under a force of no more than 1 micronewton,
wherein the biological structure is an embryo or an organoid.

26. A method, comprising:
exposing cells to a stretchable cell scaffold defining at least a portion of an electrical circuit; and
growing the cells to form a biological structure at least partially embedding the cell scaffold therein,
wherein the biological structure is an embryo or an organoid.

* * * * *

UNITED STATES PATENT AND TRADEMARK OFFICE
CERTIFICATE OF CORRECTION

PATENT NO. : 12,441,973 B2
APPLICATION NO. : 17/612187
DATED : October 14, 2025
INVENTOR(S) : Jia Liu et al.

Page 1 of 1

It is certified that error appears in the above-identified patent and that said Letters Patent is hereby corrected as shown below:

In the Claims

In Claim 20, at Column 40, Line 64, the text:
"The article of claim 19, wherein a least some of the"
Should be replaced with:
-- The article of claim 19, wherein at least some of the --.

In Claim 21, at Column 40, Line 66, the text:
"The article of claim 19, wherein a least some of the"
Should be replaced with:
-- The article of claim 19, wherein at least some of the --.

In Claim 22, at Column 41, Line 2, the text:
"comprises a onductive polymer."
Should be replaced with:
-- comprises a conductive polymer. --.

Signed and Sealed this
Second Day of December, 2025

John A. Squires
*Director of the United States Patent and Trademark Office*